United States Patent [19]
Taniguchi et al.

[11] Patent Number: 5,375,092
[45] Date of Patent: Dec. 20, 1994

[54] FIRST-IN FIRST-OUT MEMORY DEVICE

[75] Inventors: Masaharu Taniguchi; Tsuyoshi Etoh; Manabu Miura, all of Itami, Japan

[73] Assignee: Mitsubishi Denki Kabushiki Kaisha, Tokyo, Japan

[21] Appl. No.: 73,302

[22] Filed: Jun. 8, 1993

[30] Foreign Application Priority Data

Jun. 26, 1992 [JP] Japan .................. 4-169359
Oct. 6, 1992 [JP] Japan .................. 4-267121

[51] Int. Cl.$^5$ .............................................. G11C 7/00
[52] U.S. Cl. .................................. 365/221; 365/233; 365/236
[58] Field of Search .......... 365/219, 221, 236, 233, 365/78

[56] References Cited
U.S. PATENT DOCUMENTS 4,864,543 9/1989 Ward et al. .................. 365/221
4,985,867 1/1991 Ishii et al. .................... 365/221

Primary Examiner—Joseph A. Popek
Attorney, Agent, or Firm—Oblon, Spivak, McClelland, Maier, & Neustadt

[57] ABSTRACT

In order to enable enlargement/reduction of data with a simple structure in a first-in first-out memory device thereby reducing the circuit scale of this device, output terminals ($Q_0$ to $Q_3$) of a read clock counter (16) are shifted to low order digits and connected to input terminals ($A_0$ to $A_2$) of a read address decoder (18). The read clock counter (16) and a read data sense amplifier (19) operate in response to read clocks (RK2). Enlarged read data (RD) are outputted from the read data sense amplifier (19). It is possible to implement enlargement/reduction of data by changing connection between the read clock counter (16) and the read address decoder (18), thereby remarkably simplifying the circuit structure of the first-in first-out memory device having an enlargement/reduction function.

38 Claims, 62 Drawing Sheets

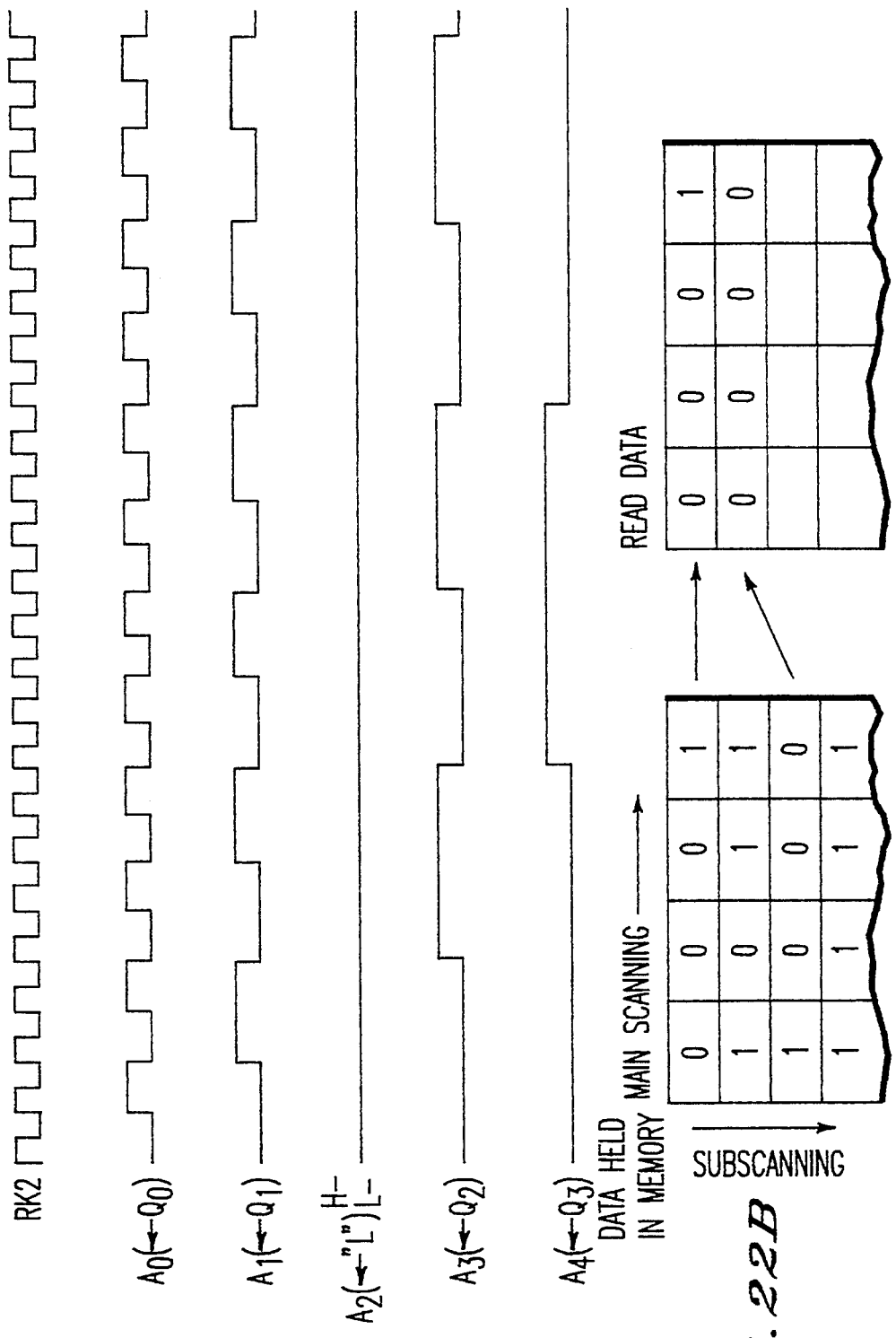

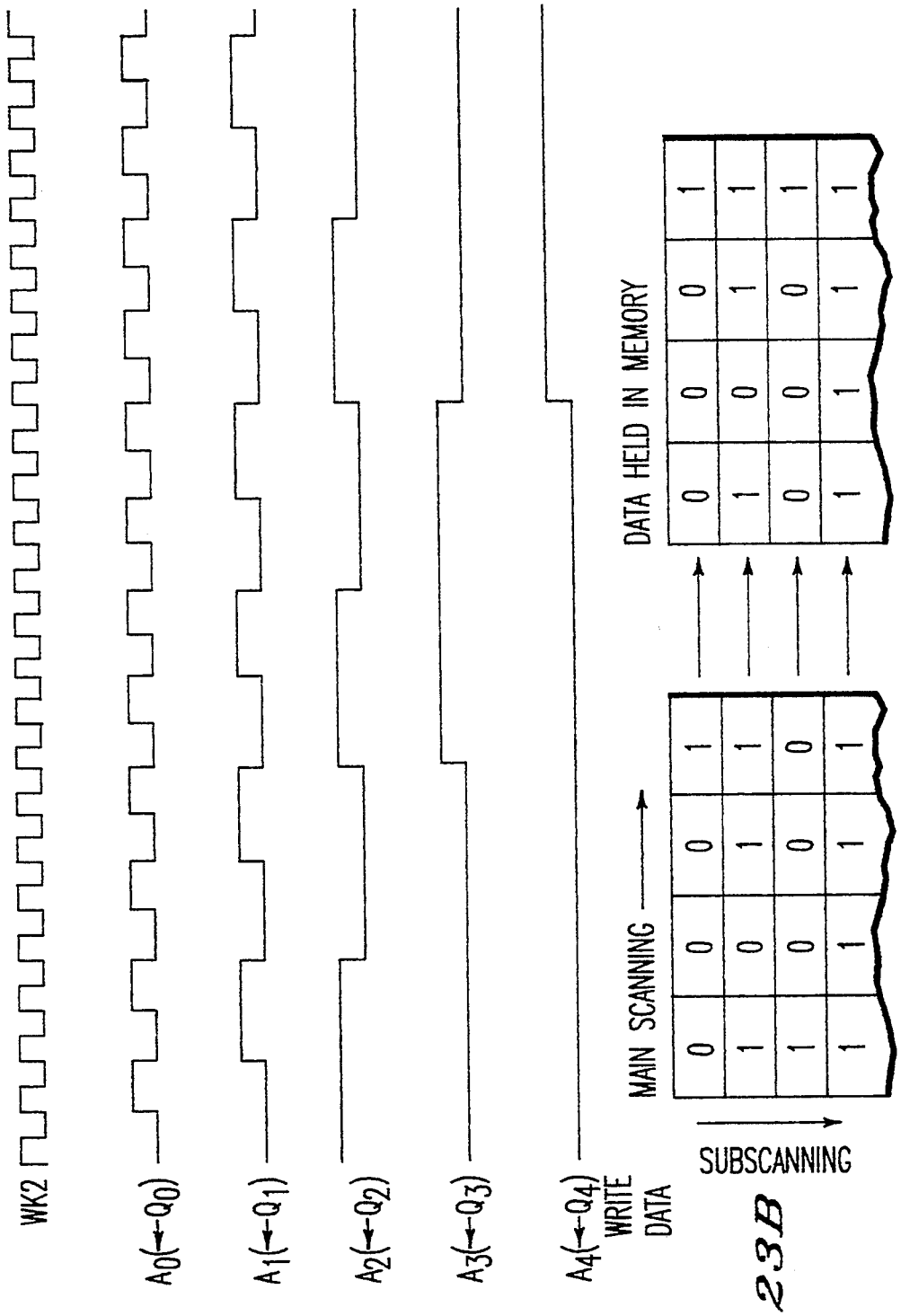

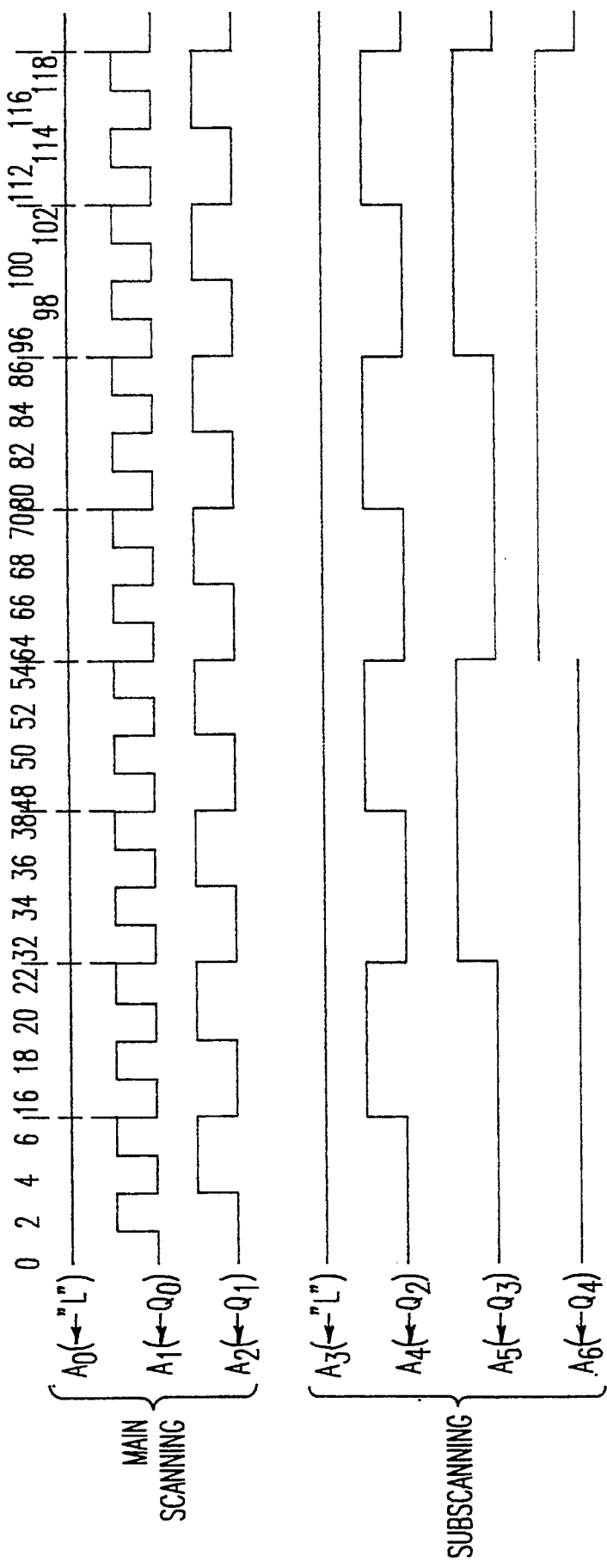

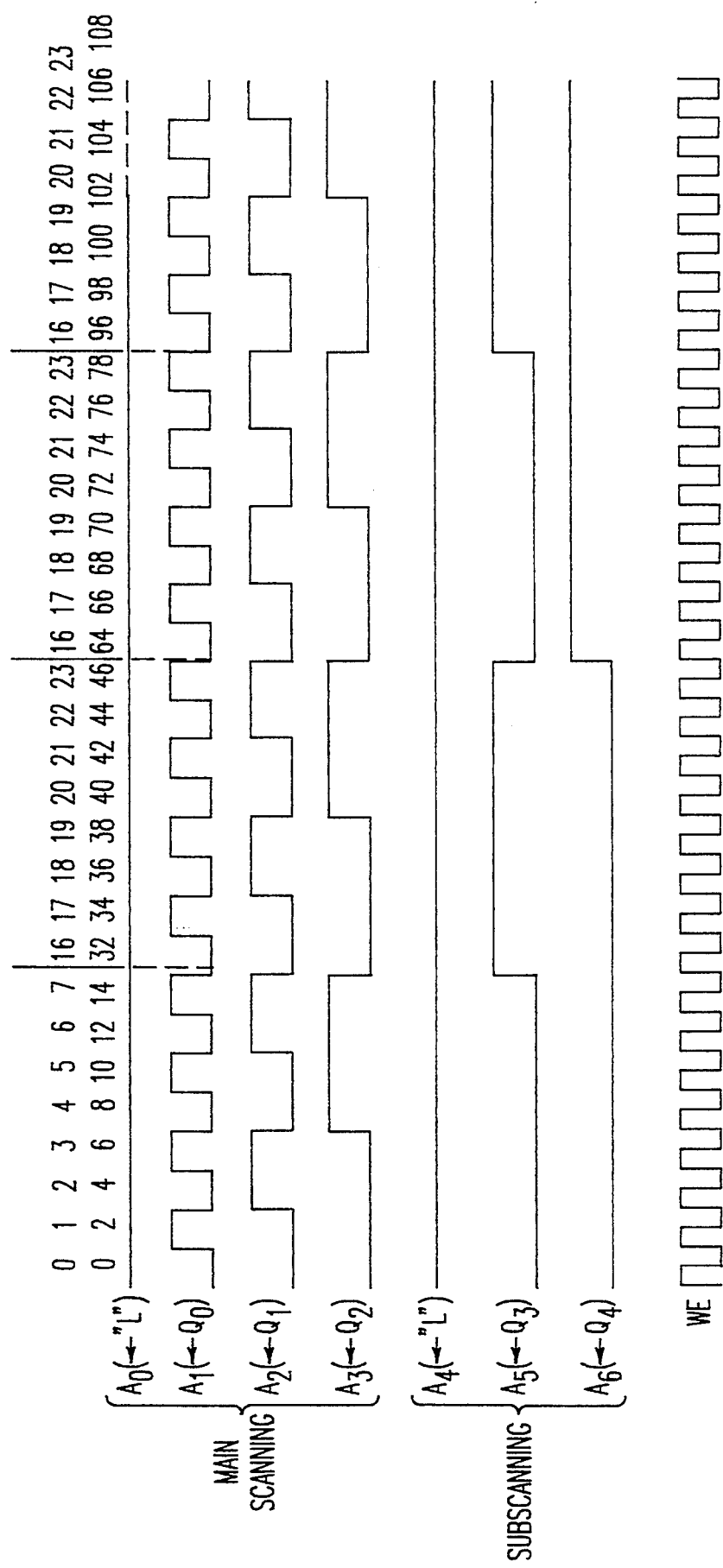

FIRST-IN FIRST-OUT MEMORY DEVICE

BACKGROUND OF THE INVENTION

1. Field of the Invention

The present invention relates to a first-in first-out memory device (hereinafter referred to as "FIFO memory device"), and more particularly, it relates to an FIFO memory device having data enlargement and reduction functions.

2. Description of the Background Art

FIG. 58 is a block diagram showing the structure of a conventional FIFO memory device having a data enlargement/reduction function. Referring to this figure, numeral 21 denotes an FIFO memory part which is capable of writing/reading data, numeral 22 denotes a write data reduction control circuit for reducing write data WD written in the FIFO memory part 21, and numeral 23 denotes a read data enlargement control circuit for enlarging read data RD read from the FIFO memory part 21. The FIFO memory part 21, the write data reduction control circuit 22 and the read data enlargement control circuit 23 form the FIFO memory device, which is capable of enlarging/reducing data.

In the FIFO memory part 21, numeral 12 denotes a memory cell matrix which is formed by a plurality of memory cells for storing data, numeral 13 denotes a write clock counter for counting write clocks WK1 received therein, numeral 14 denotes a write address decoder which receives count values outputted from the write clock counter 13 for specifying addresses of the memory cell matrix 12 for writing data with the count values serving as address data, and numeral 15 denotes a write data driver which writes data WD received through the write data reduction control circuit 22 in the memory cell matrix 12. Further, numeral 16 denotes a read clock counter for counting read clocks RK1 inputted therein, numeral 18 denotes a read address decoder which receives count values outputted from the read clock counter 16 for specifying addresses of data to be read from those held in the memory cell matrix 12 with the count values serving as address data, and numeral 19 denotes a read data sense amplifier for reading data from the memory cell matrix 12 and converting the same to digital signals.

Operations of the FIFO memory device are now described. In the case of data reduction, data, which is assumed to be "00011011", for example, inputted from an input terminal SVDI of the FIFO memory device is incorporated in the data reduction control circuit 22 in synchronization with a clock SCLK which is inputted in the write data reduction control circuit 22. Assuming that the data reduction ratio is 0.5 (only data inputted in odd times are employed as write data), the data "00011011" inputted in the write data control circuit 22 is reduced to "0011" as write data WD and outputted. The write data driver 15 writes the as-received write data WD in the memory cell matrix 12 in response to a write clock WK1. Further, the write clock WK1 outputted from the write data reduction control circuit 22 is inputted in the write clock counter 13, and the write address decoder 14 decodes the count value outputted from the write clock counter 13 and outputs the decode output to the memory cell matrix 12. The memory cell matrix 12 selects a corresponding 1-bit memory cell every such decode input, so that the write data driver 15 writes the write data WD in the selected memory cell.

A case of data enlargement is now described in relation to enlargement of the data "00011011" held in the memory cell matrix 12 in a data enlargement ratio of 2, for example. A read clock RK1 outputted from the read data enlargement control circuit 23 is inputted in the read clock counter 16. The read address decoder 18 decodes the count value of the read clock RK1 outputted from the read clock counter 16, and outputs the decode output to the memory cell matrix 12. The memory cell matrix 12 selects a corresponding 1-bit memory cell every such decode input, so that the read data sense amplifier 19 reads out the data held in the selected memory cell in response to the read clock RK1. The read data sense amplifier 19 converts the read data to a digital signal and outputs read data RD, such as "00011011", for example, to the read data enlargement control circuit 23. The read data enlargement control circuit 23 enlarges the as-received read data RD "00011011", to output enlarged data "0000001111001111" from an output terminal RVDO of the FIFO memory device in synchronization with a clock TCLK received in the read enlargement control circuit 23.

FIGS. 59(a) and 59(b) are timing charts showing operations of the write data reduction control circuit 22 and the read data enlargement control circuit 23 shown in FIG. 58 respectively. In response to the write clock WK1, the write data reduction control circuit 22 outputs only odd data among those received from the input terminal SVD1 in response to the clock SCLK as shown in FIG. 59(a), thereby reducing the data. On the other hand, the read data enlargement control circuit 23 outputs as-received 1-bit read data RD from the output terminal RVDO twice by the clock TCLK in response to the read clock RK1 as shown in FIG. 59(b), thereby enlarging the data to twice.

In general, data are reduced by the write data reduction control circuit 22 when the same are written in the FIFO memory part 21, while the data are enlarged by the read data enlargement control circuit 23 when the same are read from the FIFO memory part 21, as hereinabove described.

With reference to FIG. 60, description is now made on enlargement/reduction of data in a memory device storing digitalized data which are obtained by converting data of images etc. to a series of digital data using two scanning directions of main and subscanning directions in order to process the data of images or the like. FIG. 60 is a block diagram showing the structure of a conventional memory device having a data enlargement/reduction function. Referring to FIG. 60, numeral 24 denotes a memory part capable of writing/reading data, and numeral 25 denotes a subscanning direction enlargement/reduction control circuit which enlarges/reduces data in the subscanning direction. This circuit forms a memory device having a subscanning direction enlargement/reduction function with the memory part 24. The memory part 24 comprises a memory cell matrix 12 which is formed by a plurality of memory cells for recording data, a write address decoder 14 which decodes address data Ad0 to Ad1 received from the exterior of the memory part 24 and specifies addresses of the memory cell matrix 12 for writing write data WD, a write data driver 15 which writes the write data WD in the memory cell matrix 12 in response to a clock WK1, a read address decoder 18 which decodes address data Ad0 to Ad1 outputted from the subscanning direction enlargement/reduction control circuit 25 and specifies positions of prescribed memory cells on the memory cell matrix 12 for reading data held in the memory cells, and a read data sense amplifier 19 for converting data read from the memory cell matrix 12 to a digital signal.

Operations of the memory device shown in FIG. 60 are now described with reference to FIGS. 61(a) and 61(b). In order to simplify the description, it is assumed that this memory devices enlarges/reduces data in data reading, and the memory cell matrix 12 holds 4-bit data in the main scanning direction. It is also assumed that the memory cell matrix 12 already holds "0001", "1011", "1000" and "1111" as data from addresses 0 to 15. This state is shown in FIG. 61(b). In order to read data in equal-scale magnification, the subscanning direction enlargement/reduction control circuit 25 outputs the address data Ad0 to Ad1 to the read address decoder 18 to successively increment the addresses one by one from the address 0. The read data sense amplifier 19 reads the data successively from the address 0 in response to a read clock RK1 along the addresses specified by the read address decoder 18. The read sense amplifier 19 outputs "0001", "1011", "1000" and "1111" as read data RD. This state is shown as "magnification:×1" in FIGS. 61(a) and 61(b).

In the case of enlargement magnification of 2, the subscanning direction enlargement/reduction control circuit 25 outputs the address data AD0 to AD1 to repeat the 4-bit data in the main scanning direction twice for successively specifying addresses 0 to 3, then repeatedly successively specifying the addresses 0 to 3, then successively specifying the addresses 4 to 7, and then repeatedly successively specifying the addresses 4 to 7. The read data sense amplifier 19 successively reads the 4-bit data in the main scanning direction from the memory cell matrix 12 repeatedly from the address 0 in response to the read clock RK1 along the addresses specified by the read address decoder 18. Then, the read data sense amplifier 19 outputs "0001", "0001", "1011", "1011", . . . as the read data RD.

In the case of reduction magnification of 0.5, on the other hand, the subscanning direction enlargement/reduction control circuit 25 outputs the address data Ad0 to Ad1 to the read address decoder 18 to successively specify the addresses every other set of 4-bit data in the main scanning direction for specifying the addresses 0 to 3, then specifying the addresses 8 to 11 and then specifying the addresses 16 to 19. The read data sense amplifier 19 reads the addresses from the memory cell matrix 12 every other set of 4-bit data in the main scanning direction in response to the read clock RK1 along the addresses specified by the read address decoder 18 successively from the address 1 or 4. Then, the read data sense amplifier 19 outputs "0001", "1000" or "1011", "1111" as the read data RD.

In the conventional FIFO memory device having the aforementioned structure, the write data reduction control circuit 22 reduces data when the same are written in the FIFO memory part 21 while the read data enlargement control circuit 23 enlarges the data when the same are read from the FIFO memory part 21. Therefore, a data enlargement/reduction control circuit which is provided in the exterior of the FIFO memory part 21 is disadvantageously increased and complicated in logical scale depending on set conditions and the like, although the FIFO memory part 21 is simple in structure.

In the conventional memory device for enlarging/reducing data in two directions of main and subscanning directions having the aforementioned structure, further, an enlargement/reduction control circuit for controlling enlargement/reduction in the main or subscanning direction is disadvantageously increased in scale and complicated in circuit structure since the same must generate memory addresses responsive to situations depending on set magnification, conditions etc. for enlargement/reduction.

SUMMARY OF THE INVENTION

According to a first aspect of the present invention, a first-in first-out memory device comprises a memory cell array which is formed by a plurality of memory cells for storing inputted data by write operations responsive to clocks and outputting the stored data by read operations responsive to the clocks, a clock counter having a plurality of output terminals for outputting signals indicating values of respective digits of count values of the clocks in response to the inputted clocks from the output terminals respectively, an address decoder having a plurality of input terminals corresponding to the plurality of output terminals of the clock counter for specifying addresses indicating positions of the memory cells on the memory cell array in accordance with the count values of the clock counter, and a clock counter output shift circuit for shifting the signals of respective digits received from the plurality of output terminals of the clock counter to high or low order digits and outputting the same to the input terminals of the address decoder on the basis of an inputted control signal, thereby changing timing of the address decoder for specifying the addresses.

Preferably, the clock counter output shift circuit comprises a plurality of switching circuits having input ends which connected to prescribed ones of the output terminals of the clock counter and output ends which are connected to prescribed ones of the input terminals of the address decoder respectively for connecting or disconnecting the output terminals of the clock counter with or from the input terminals of the address decoder in accordance with the control signal.

Preferably, the clocks include read clocks for synchronizing the read operations, and the clock counter includes a read clock counter which is responsive to the read clocks, and the address decoder includes a read address decoder for receiving count values of the read clock counter through the clock counter output shift circuit and decoding the count values thereby specifying read addresses indicating positions of the memory cells to be subjected to the read operations on the memory cell array, while the first-in first-out memory device further comprises a read data sense amplifier for detecting and reading the data from the memory cells which are specified by the read addresses in response to the read clocks.

Preferably, the clock counter output shift circuit includes a clock counter output shift circuit for shifting signals of respective digits received from the plurality of output terminals of the clock counter to high or low order digits and outputting the same to the input terminals of the address decoder on the basis of an inputted control signal and outputting prescribed values to the input terminals of the read address decoder corresponding to the output terminals outputting low order digits of the count values counted by the read clock counter in response to the control signal thereby changing timing of the address decoder for specifying the addresses.

Preferably, the first-in first-out memory device further comprises read clock conversion means for receiving the read clocks and changing the periods of the read clocks so that the memory cells in which the data are written in a prescribed time by the write operations in the memory cell array are coincident in number with the memory cells from which the data are read in the prescribed time by the read operations from the memory cell array and outputting the read clocks to the read data sense amplifier.

Preferably, the first-in first-out memory device further comprises an enlargement/reduction control circuit which is connected to the clock counter output shift circuit for outputting the control signal for controlling the clock counter output shift circuit and setting magnification of enlargement/reduction of the data.

Preferably, the clocks include write clocks for synchronizing the write operations, the clock counter includes a write clock counter which is responsive to the write clocks, and the address decoder includes a write address decoder for receiving count values of the write clock counter through the clock counter output shift circuit and decoding the count values thereby specifying write addresses indicating the memory cells which are subjected to the write operations on the memory cell array, while the first-in first-out memory device further comprises a write data driver for writing the inputted data in the memory cells which are specified by the write address decoder in response to the write clocks.

Preferably, the write data driver includes a write data driver for receiving a write enable signal as a control signal and being supplied with inhibition or allowance of writing by the write enable signal for writing the inputted data in the memory cells which are specified by the write address decoder in response to the write clocks when allowed by the write enable signal.

Preferably, the first-in first-out memory device further comprises write clock conversion means for receiving the write clocks and changing the: periods of the write clocks so that the memory cells in which the data are written in a prescribed time by write operations in the memory cell array are coincident in number with the memory cells from which the data are read in the prescribed time by the read operations from the memory cell array and outputting the write clocks to the write data driver.

Preferably, the write address decoder includes a write address decoder for receiving the count values inputted from the write clock counter through the clock counter output shift circuit, receiving a magnification control signal specifying enlarging magnification for the data and decoding the count values with the magnification control signal thereby simultaneously specifying write addresses indicating positions of a plurality of memory cells which are subjected to the write operations on the memory cell array.

Preferably, the first-in first-out memory device further comprises an enlargement/reduction control circuit which is connected to the write address decoder as-well as the clock counter output shift circuit for outputting the magnification control signal to the write address decoder for setting magnification of enlargement or reduction for the data to the write address decoder and outputting the control signal for controlling the clock counter output shift circuit to the clock counter output shift circuit.

Preferably, the write data driver receives outputs of the write clock counter for controlling the write operations of writing the data in the memory cell array using the outputs of the write clock counter.

Preferably, the write data driver comprises at least one logical product circuit for receiving at least one of outputs which are outputted from the output terminals of the write clock counter in its input end while receiving the write clocks in another input end for taking the logical product of inverted or non-inverted logics of the outputs of the write clock counter and the write clocks, the write data driver uses an output of the logical product circuit as a write enable signal and being supplied with inhibition or allowance of writing by the write enable signal for writing inputted data in the memory cells which are specified by the write address decoder in response to the write clocks when allowed by the write enable signal.

Preferably, the first-in first-out memory device is provided with a plurality of logical product circuits, and the write data driver further comprises a selector for receiving outputs of a plurality of logical product circuits, receiving a magnification setting signal for setting reduction magnification, and selectively outputting outputs of the logical product circuits in response to the magnification setting signal.

Preferably, the data include those of successively arranged data groups of main scanning which are successively stored in the memory cell array along order of subscanning in the write operations, and the clock counter output shift circuit includes a clock counter output shift circuit for shifting signals of prescribed digits specifying the order of subscanning of the data groups of main scanning among the count values which are outputted from the read clock counter in the read operations to high or low order digits.

Preferably, the data include those of successively arranged data groups of main scanning which are successively stored in the memory cell array along order of subscanning in the write operations, and the clock counter output shift circuit shifts signals of prescribed digits specifying order of the data groups of main scanning in the read operations among the count values outputted from the read clock counter to high or low order digits.

Preferably, the data received in the write data driver include those of successively arranged data groups of main scanning which are successively inputted along order of subscanning, and the clock counter output shift circuit shifts signals of prescribed digits specifying the order of subscanning among the count values outputted by the write clock counter to high or low order digits.

Preferably, the data received in the write data driver include those of successively arranged data groups of main scanning which are successively inputted along order of subscanning, and the clock counter output shift circuit shifts signals of prescribed digits specifying order of main scanning among the count values outputted from the write clock counter to high or low order digits.

In the first-in first-out memory device according to the first aspect of the present invention, the clock counter output shift circuit shifts the signals indicating the values of the respective digits of the count values outputted from the plurality of output terminals of the clock counter to high or low order digits, and supplies the same to the input terminals of the address decoder. In the address decoder, therefore, the periods for outputting the decode outputs are lengthened or shortened as compared with those before shifting of the values of the respective digits of the count values. Therefore, it is possible to change the timing for address specification by the address decoder, thereby enlarging/reducing the data.

In the first-in first-out memory device according to the first aspect of the present invention, further, the clock counter output shift circuit shifts the signals indicating the values of the respective digits of the count values outputted from the plurality of output terminals of the read clock counter respectively to high or low order digits and supplies the same to the input terminals of the read address decoder. In the read address decoder, therefore, the periods for outputting the decode outputs are lengthened or shortened as compared with those before shifting the values of the respective digits of the count values, whereby it is possible to enlarge/reduce the data by making it different from the timing in the read data sense amplifier for reading out the data.

In the first-in first-out memory device according to the first aspect of the present invention, further, the clock counter output shift circuit shifts the signals indicating the values of the respective digits of the count values outputted from the plurality of output terminals of the write clock counter respectively to high or low order digits and supplies the same to the input terminals of the write address decoder. In the write address decoder therefore, the periods for outputting the decode outputs are lengthened or shortened as compared with those before shifting the values of the respective digits of the count values, whereby it is possible to change the timing for address specification by the write address decoder and enlarge/reduce the data by making the same different from that in the write data driver for writing the data.

In the first-in first-out memory device according to the first aspect of the present invention, further, the write data driver can control data writing in the memory cell array and specify the data to be written in data reduction using the outputs of the write clock counter.

In the first-in first-out memory device according to the first aspect of the present invention, further, the clock counter output shift circuit shifts the count values of digits exceeding prescribed digits specifying the order of subscanning among the signals indicating the values of the respective digits of the count values outputted from the plurality of output terminals of the read clock counter respectively to high or low order digits and supplies the same to the input terminals of the read address decoder. Thus, it is possible to make the decode output periods of outputting a set of data in the main scanning direction different from periods for the read data sense amplifier reading a set of data in the main scanning direction, thereby enlarging/reducing the data in the subscanning direction.

In the first-in first-out memory device according to the first aspect of the present invention, further, the clock counter output shift circuit shifts the count values of digits lower than prescribed digits specifying the order of main scanning among the signals indicating the values of the respective digits of the count values outputted from the plurality of output terminals of the read clock counter respectively to high or low order digits and supplies the same to the input terminals of the read address decoder. In the read address decoder, therefore, the periods for decode-outputting the data in the main scanning direction are lengthened or shortened as compared with those before shifting the count values, whereby it is possible to change the timing for the read address decoder specifying the addresses of the data in the main scanning direction and enlarge/reduce the data in the main scanning direction by making the same different from that for the read data sense amplifier reading the data.

In the first-in first-out memory device according to the first aspect of the present invention, further, the clock counter output shift circuit shifts the, count values of digits exceeding the prescribed digits specifying the order of subscanning among the signals indicating the values of the respective digits of the count values outputted from the plurality of output terminals of the write clock counter respectively to high or low order digits and supplies the same to the input terminals of the write address decoder. In the write address decoder, therefore, it is possible to make decode output periods for outputting a set of data in the main scanning direction from those for the write data driver writing a set of data in the main scanning direction, thereby enlarging/reducing the data in the subscanning direction.

In the first-in first-out memory device according to the first aspect of the present invention, further, the clock counter output shift circuit shifts the count values of digits lower than the prescribed digits for specifying the order of main scanning among the signals indicating the values of the respective digits of the count values outputted from the plurality of output terminals of the write clock counter respectively to high or low order digits and supplies the same to the input terminals of the write address decoder. In the write address decoder, therefore, the periods for decode-outputting the data in the main scanning direction are lengthened or shortened as compared with those before shifting the count values, whereby it is possible to change the timing for address specification by the write address decoder as to the data in the main scanning direction and enlarge/reduce the data in the main scanning direction by making the same different from that for the write data driver writing the data.

As hereinabove described, the first-in first-out memory device according to the first aspect of the present invention comprises the clock counter shift circuit which shifts the signals of the respective digits received from the plurality of output terminals of the clock counter on the basis of the received control signal to high or low order digits and outputs the same to the input terminals of the address decoder thereby changing the timing for address specification by the address decoder, whereby the data can be enlarged/reduced in a simple structure with addition of such a clock counter output shift circuit, and it is possible to simplify the circuit structure of the first-in first-out memory device having a data enlargement/reduction function and reduce the circuit scale.

In the first-in first-out memory device according to the first aspect of the present invention, further, the clock counter which is connected with the clock counter output shift circuit includes the read clock counter being responsive to the read clocks and the address decoder includes the read address decoder for specifying the read addresses of the memory cell array subjected to the read operations while the device comprises the read data sense amplifier for detecting and reading the data from the memory cells specified by the read addresses in response to the read clocks, whereby the data can be enlarged/reduced only on the read side and it is possible to simplify the circuit structure of the first-in first-out memory device having a data enlargement/reduction function and reduce the circuit scale.

In the first-in first-out memory device according to the first aspect of the present invention, further, the clock counter which is connected with the clock counter output shift circuit includes the write clock counter being responsive to the write clocks and the address decoder includes the write address decoder for specifying the write addresses of the memory cell array subjected to the write operations while the device comprises the write data driver for writing the received data in the memory cells specified by the write address decoder in response to the write clocks, whereby the data can be enlarged/reduced only on the write side and it is possible to simplify the circuit structure of the first-in first-out memory device having a data enlargement/reduction function and reduce the circuit scale.

In the first-in first-out memory device according to the first aspect of the present invention, further, the write data driver receives the outputs of the write clock counter and controls the write operations for writing the data in the memory cell array using the outputs of the write clock counter, whereby a function of specifying the data to be reduced among the write data can be implemented with a simple structure and it is possible to simplify the circuit structure of the first-in first-out memory device having a data enlargement/reduction function and reduce the circuit structure.

In the first-in first-out memory device according to the first aspect of the present invention, further, the clock counter output shift circuit shifts the signals of the prescribed digits specifying the order of subscanning of the data groups of the main scanning among the count values outputted by the read clock counter in the read operations to high or low order digits, whereby the data in the subscanning direction can be enlarged/reduced only on the read side by making the clock counter output shift circuit act on the signals of the digits specifying the order of subscanning on the read side and it is possible to simplify the circuit structure of the first-in first-out memory device having a data enlargement/reduction function with respect to the subscanning direction and reduce the circuit structure.

In the first-in first-out memory device according to the first aspect of the present invention, the clock counter output shift circuit shifts the signals of the prescribed digits specifying the order of the data groups of main scanning in the read operations among the count values outputted from the read clock counter to high or low order digits, whereby the data in the main scanning direction can be enlarged/reduced only on the read side by making the clock counter output shift circuit act on the signals of the digits specifying the order of main scanning and it is possible to simplify the circuit structure of the first-in first-out memory device having a data enlargement/reduction function with respect to the main scanning direction and reduce the circuit scale.

In the first-in first-out memory device according to the first aspect of the present invention, further, the clock counter output shift circuit shifts the signals of the prescribed digits specifying the order of subscanning among the count values outputted from the write clock counter to high or low order digits, whereby the data in the subscanning direction can be enlarged/reduced only on the write side by making the clock counter output shift circuit act on the signals specifying the order of subscanning and it is possible to simplify the circuit structure of the first-in first-out memory device having a data enlargement/reduction function with respect to the subscanning direction and reduce the circuit scale. In the first-in first-out memory device according to the first aspect of the present invention, further, the clock counter output shift circuit shifts the signals of the prescribed digits specifying the order of main scanning among the count values outputted by the write clock counter to high or low order digits, whereby the data in the main scanning direction can be simply enlarged/reduced only on the write side by making the clock counter output shift circuit act on the signals of the digits specifying the order of main scanning and it is possible to simplify the circuit structure of the first-in first-out memory device having a data enlargement/reduction function with respect to the main scanning direction and reduce the circuit scale.

According to a second aspect of the present invention, a first-in first-out memory device comprises a memory cell array which is formed by a plurality of memory cells for storing received data by write operations and outputting the stored data by read operations, a clock counter having a plurality of output terminals for outputting signals indicating values of respective digits of count values of inputted clocks in response to the clocks, and an address decoder having a plurality of input terminals corresponding to the plurality of output terminals of the clock counter for specifying addresses indicating positions of the memory cells on the memory cell array in accordance with values of the clock counter. The signals indicating the respective digits of the count values outputted from the respective output terminals of the counter are outputted to the input terminals of the address decoder corresponding to high or low order digits thereof, thereby changing timing of the address decoder for specifying the addresses.

Preferably, the clocks include read clocks for synchronizing the read operations, the clock counter includes a read clock counter which is responsive to the read clocks, and the address decoder includes a read address decoder having a plurality of input terminals corresponding to the plurality of output terminals of the clock counter for receiving the signals indicating respective digits of the count values which are outputted from the output terminals of the read clock counter in the input terminals of the read address decoder corresponding to high or low order digits thereof and decoding the count values of the read clock counter thereby specifying read addresses indicating positions of the memory cells which are subjected to the read operations on the memory cell array, while the first-in first-out memory device further comprises a read data sense amplifier for detecting and reading the data from the memory cells which are specified by the read addresses in response to the read clocks.

Preferably, the signals indicating respective digits of count values which are outputted from the output terminals of the read clock counter are outputted to the input terminals of the read address decoder corresponding to low order digits thereby lengthening intervals of address specification by the read address decoder.

Preferably, the data include those of successively arranged data groups of main scanning which are successively stored in the memory cell array along order of subscanning in the write operations, and signals of prescribed digits specifying the order of subscanning of the data groups of main scanning among the count values outputted from the output terminals of the read clock counter are outputted to the input terminals of the read address decoder corresponding to low order digits respectively thereby lengthening intervals for the read address decoder changing specification of the order of subscanning.

Preferably, the data include those of successively arranged data groups of main scanning which are successively stored in the memory cell array along order of subscanning in the write operations, and signals of prescribed digits specifying order of the data groups of main scanning among the count values outputted from the output terminals of the read clock counter are outputted to the input terminals of the read address decoder corresponding to low order digits respectively thereby lengthening intervals of address specification by the read address decoder.

Preferably, the signals indicating respective digits of the count values which are outputted from the output terminals of the read clock counter are outputted to the input terminals of the read address decoder corresponding to high order digits respectively thereby shortening intervals of address specification by the read address decoder.

Preferably, the data include those of successively arranged data groups of main scanning which are successively stored in the memory cell array along order of subscanning in the write operations, and signals of at least prescribed digits specifying the order of subscanning of the data groups of main scanning among the count values outputted from the output terminals of the read clock counter are outputted to the input terminals of the read address decoder corresponding to high order digits respectively thereby shortening intervals for the read address decoder changing specification of the order of subscanning.

Preferably, the data include those of successively arranged data groups of main scanning which are successively stored in the memory cell array in order of subscanning in the write operations, and signals of at least prescribed digits specifying order of the data groups of main scanning among the count values outputted from the output terminals of the read clock counter are outputted to the input terminals of the read address decoder corresponding to high order digits respectively thereby shortening intervals of address specification by the read address decoder.

Preferably, the clocks include write clocks synchronizing the write operations, the clock counter includes a write clock counter which is responsive to the write clocks, and the address decoder includes a write address decoder having a plurality of input terminals corresponding to the plurality of output terminals of the clock counter for inputting the signals indicating respective digits of the count values which are outputted from the output terminals of the write clock counter in the input terminals of the write address decoder corresponding to high or low order digits thereof and decoding the count values of the write clock counter thereby specifying write addresses indicating positions of the memory cells which are subjected to the write operations on the memory cell array, while the first-in first-out memory device further comprises a write data driver for writing inputted data in the memory cells which are specified by the write address decoder in response to the write clocks.

Preferably, the write address decoder inputs the signals indicating respective digits of the count values which are outputted from the output terminals of the write clock counter in the input terminals of the write address decoder corresponding to high order digits thereof respectively and decodes the count values of the write clock counter, thereby shortening intervals for specifying write addresses indicating positions of the memory cells which are subjected to the write operations on the memory cell array.

Preferably, the data inputted in the write data driver include those of successively arranged data groups of main scanning which are successively inputted along order of subscanning, and the write address decoder inputs signals of at least prescribed digits specifying the order of subscanning among the count values outputted from the output terminals of the write clock counter in the input terminals of the write address decoder for decoding the count values of the write clock counter, thereby shortening intervals for changing specification of the order of subscanning indicating positions of the memory cells which are subjected to the write operations on the memory cell.

Preferably, the data inputted in the write data driver include those of successively arranged data groups of main scanning which are successively inputted along order of subscanning, and the write address decoder inputs signals signals of at least prescribed digits specifying order of the main scanning among the count values outputted from the output terminals of the write clock counter in the input terminals of the write address decoder corresponding to high order digits thereof respectively for decoding the count values of the write clock counter, thereby shortening intervals for specifying write addresses indicating positions of the memory cells which are subjected to the write operations on the memory cell array.

Preferably, the write address decoder inputs the signals indicating respective digits of the count values outputted from the output terminals of the write clock counter in the input terminals of the write address decoder corresponding to low order digits thereof respectively and decodes the count values of the write clock counter thereby lengthening intervals for specifying write addresses indicating positions of the memory cells which are subjected to the write operations on the memory cell array.

Preferably, the data inputted in the write data driver include those of successively arranged data groups of main scanning which are successively inputted along order of subscanning, and the write address decoder inputs signals of at least prescribed digits specifying the order of subscanning among the count values outputted from the output terminals of the write clock counter in the input terminals of the write address decoder corresponding to low order digits thereof respectively for decoding the count values of the write clock counter, thereby lengthening intervals for changing specification of the order of subscanning indicating positions of the memory cells which are subjected to the write operations on the memory cell array.

Preferably, the data inputted in the write data driver include those of successively arranged data groups of main scanning which are successively inputted along order of subscanning, and the write address decoder inputs signals of at least prescribed digits specifying order of the main scanning among the count values outputted from the output terminals of the write clock counter in the input terminals of the write address decoder corresponding to low order digits thereof respectively for decoding the count values of the write clock counter, thereby lengthening intervals for specifying write addressees indicating positions of the memory cells which are subjected to the write operations on the memory cell array.

In the first-in first-out memory device according to the second aspect of the present invention, the signals indicating the values of the respective digits of the count values outputted from the output terminals of the clock counter are shifted and outputted to the input terminals of the address decoder corresponding to high or low order digits thereof. The address decoder outputs the decode outputs to the memory cell array using the shifted count values, whereby the periods for outputting the decode outputs are lengthened or shortened as compared with the case of shifting no count values. Thus, it is possible to change the timing for address specification by the address decoder, thereby enlarging/reducing the data.

In the first-in first-out memory device according to the second aspect of the present invention, the signals of the respective digits of the count values outputted from the output terminals of the clock counter are inputted in the input terminals of the address decoder corresponding to high or low order digits thereof thereby changing the timing for the address decoder specifying the addresses, whereby it is possible to simplify the circuit structure of the first-in first-out memory device having a data enlargement/reduction function and reduce the circuit scale.

According to a third aspect of the present invention, a first-in first-out memory device comprises a memory cell array which is formed by a plurality of memory cells for storing inputted data by write operations and outputting the stored data by read operations, a clock counter having a plurality of output terminals for outputting signals indicating values of respective digits of count values of inputted clocks in response to the clocks, an address decoder having a plurality of input terminals corresponding to the plurality of output terminals of the clock counter for specifying addresses indicating positions of the memory cells on the memory cell array in accordance with the Values of the clock counter, a read data sense amplifier for detecting and reading the data which are outputted from the memory cells corresponding to the addresses which arc specified by the address decoder in response to read clocks which are synchronized with the clocks, a write data driver for writing data in the memory cells corresponding to the addresses which are specified by the address decoder in response to write clocks which are synchronized with the clocks, and a counter output control circuit for shifting the signals indicating respective digits which are received from the plurality of output terminals of the clock counter to high or low order digits and outputting the same to the input terminals of the address decoder in coincidence with the write operations and the read operations which are alternately performed by the write data driver and the read data sense amplifier on the basis of an inputted control signal.

In the first-in first-out memory device according to the third aspect of the present invention, the counter output control circuit shifts the signals indicating the values of the respective digits of the count values outputted from the plurality of output terminals of the clock counter respectively to high or low order digits and supplies the same to the input terminals of the address decoder. In the address decoder, therefore, the periods for outputting the decode outputs for specifying the addresses read by the read data sense amplifier or those for outputting the decode outputs for specifying the addresses written by the write data driver are lengthened or shortened as compared with those before shifting the values of the respective digits of the count values. Therefore, it is possible to change the timing for specifying the addresses in read or write operations in a single address decoder, thereby enlarging/reducing the data.

The first-in first-out memory device according to the third aspect of the present invention comprises the counter output control circuit which shifts the signals of the respective digits received from the plurality of output terminals of the clock counter to high or low order digits and outputs the same to the input terminals of the address decoder in coincidence with the write and read operations alternately performed by the write data driver and the read data sense amplifier on the basis of the received control signal, whereby the data can be enlarged/reduced in the main and subscanning directions in a simple structure with addition of the clock counter output shift circuit and it is possible to simplify the circuit structure of the first-in first-out memory device having a data enlargement/reduction function and reduce the circuit scale. Thus, it is possible to reduce the device in size and cost.

According to a fourth aspect of the present invention, a first-in first-out memory device comprises a memory cell array which is formed by a plurality of memory cells for storing inputted data by write operations and outputting the stored data by read operations, a clock counter having an output terminal for outputting a count value of an inputted clock in response to the clock, an address decoder having an input terminal which is connected to the output terminal of the clock counter for specifying addresses indicating positions of the memory cells on the memory cell array in accordance with the value of the clock counter, a read data sense amplifier for detecting and reading the data which are outputted from the memory cells corresponding to addresses specified by the address decoder, a write data driver for writing the data in the memory cells corresponding to the addresses specified by the address decoder in response to a write Clock which is synchronized with the clock, and a timing control clock counter which is connected to the read data sense amplifier and the write data driver for receiving the count value of the clock counter and controlling write timing and read timing of the write data driver and the read data sense amplifier which is responsive to the count value in response to an inputted control signal.

Preferably, the timing control clock counter lengthens a readable period of the read data sense amplifier which is responsive to the count value so that the read data sense amplifier reads the same data from the memory cell of the same address a plurality of times.

Preferably, the timing control clock counter lengthens a writable period of the write data driver which is responsive to the count value so that the write driver writes different data in the memory cell of the same address a plurality of times.

Preferably, the timing control clock counter includes a counter whose mode of outputting the result of counting by the control signal is changed from an N-ary number (integer of at least 2) to an M-ary number (integer of at least 2).

In the first-in first-out memory device according to the fourth aspect of the present invention, the timing control clock counter can change the number of applying the same addresses to writing or reading by controlling the periods for the read data sense amplifier and the write data driver performing read and write operations, thereby enlarging/reducing the data.

The first-in first-out memory device according to the fourth aspect of the present invention comprises the timing control clock counter which is connected to the read data sense amplifier and the write data driver for receiving the count values of the clock counter and controlling the write timing and the read timing of the write data driver and the read data sense amplifier being responsive to the count values in response to the received control signal, whereby the data can be enlarged/reduced in a simple structure with addition of the timing control clock counter and it is possible to simplify the circuit structure of the first-in first-out memory device having a data enlargement/reduction function and reduce the circuit scale. Thus, it is possible to reduce the device in size and cost.

Accordingly, an object of the present invention is to obtain an FIFO memory device which can enlarge/reduce data to be stored or read with addition of a simple circuit. Another object of the present invention is to obtain an FIFO memory device which can enlarge/reduce data, being obtained by two scanning operations in main and subscanning directions, in the main or subscanning direction with addition of a simple circuit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 22(a) and 22(b) are waveform diagrams showing still another operation of the first-in first-out memory device according to the seventh embodiment of the present invention;

FIGS. 23(a) and 23(b) are waveform diagrams for illustrating an operation of the first-in first-out memory device according to the eighth embodiment of the present invention;

FIGS. 27(a) and 27(b) are waveform diagrams showing an operation of a first-in first-out memory device according to a ninth embodiment of the present invention;

FIGS. 30(a), 30(b) and 30(c) are waveform diagrams showing an operation of a first-in first-out memory device according to a twelfth embodiment of the present invention;

DESCRIPTION OF THE PREFERRED EMBODIMENTS

Figure 1:
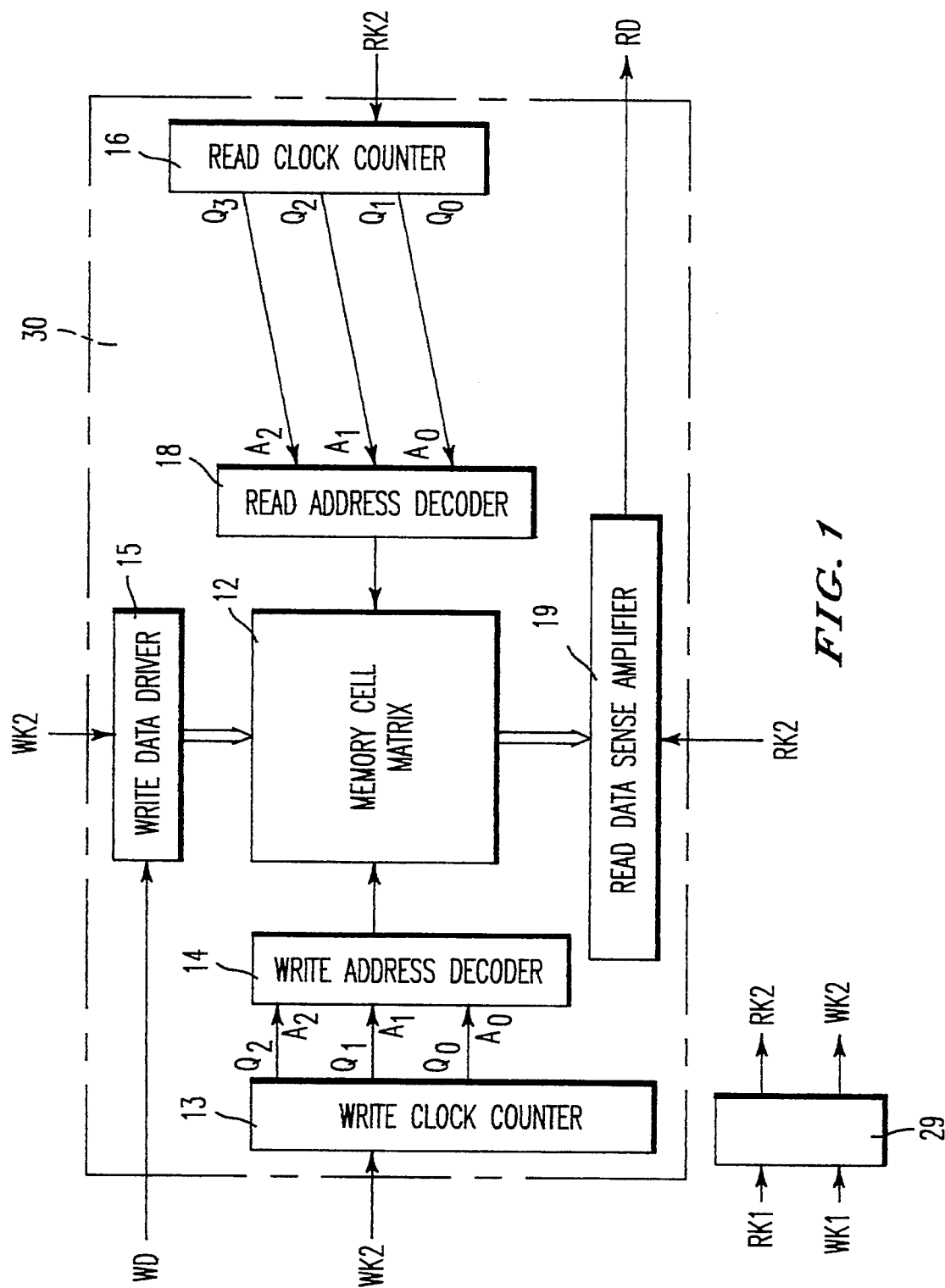
FIG. 1 is a block diagram showing the structure of a first-in first-out memory device according to a first embodiment of the present invention.

A first embodiment of the present invention is now described with reference to FIG. 1. FIG. 1 shows an FIFO memory device 30 according to the first embodiment of the present invention. Referring to FIG. 1, numeral 12 denotes a memory cell matrix which is formed by a plurality of memory cells for holding data, numeral 13 denotes a write clock counter for counting write clocks WK2 received therein, numeral 14 denotes a write address decoder which receives count values outputted from the write clock counter 13 and specifies addresses of the memory cell matrix 12 for writing write data WD with the count values being regarded as address data, and numeral 15 denotes a write data driver which writes the as-received write data WD in the memory cell matrix 12 in response to the write clocks WK2. Further, numeral 16 denotes a read address decoder which counts read clocks RK2 received therein and outputs values of respective digits of the count values from output terminals $Q_0$ to $Q_3$, numeral 18 denotes a read address decoder which receives the count values outputted from the read clock counter 16 in its input terminals $A_0$ to $A_3$ and specifies addresses of memory cells in order to read data held in the memory cells of the memory cell matrix 12 with the count values being regarded as address data, and numeral 19 denotes a read data sense amplifier which reads data from the memory cell matrix 12 in response to the read clocks RK2 for converting the same to digital signals and outputting the signals. In addition, numeral 29 denotes a read/write timing conversion circuit which changes periods of the read and write clocks RK1 and WK1 for adjusting speeds of read and write operations so that the reading operation will not pass the writing operation and vice versa. The output terminals $Q_0$ to $Q_3$ of the read clock counter 16 are adapted to output respective values of first to fourth digits of binary numbers. The input terminals $A_0$ to $A_3$ of the read address decoder 18 are adapted to receive respective values of first to third digits of binary numbers. In an ordinary state with no enlargement/reduction, the input terminals $A_0$, $A_1$ and $A_2$ of the read address decoder 18 are connected to the output terminals $Q_0$, $Q_1$ and $Q_2$ of the read clock counter 16 respectively. Table 1 shows such connection in the column of enlargement magnification.

TABLE 1

| Enlargement Magnification | Read Address Decoder Input Terminal | | |
|---|---|---|---|
| | $A_2$ | $A_1$ | $A_0$ |
| × 1 | $Q_2$ | $Q_1$ | $Q_0$ |
| × 2 | $Q_3$ | $Q_2$ | $Q_1$ |
| × 4 | $Q_4$ | $Q_3$ | $Q_2$ |

Figure 5:
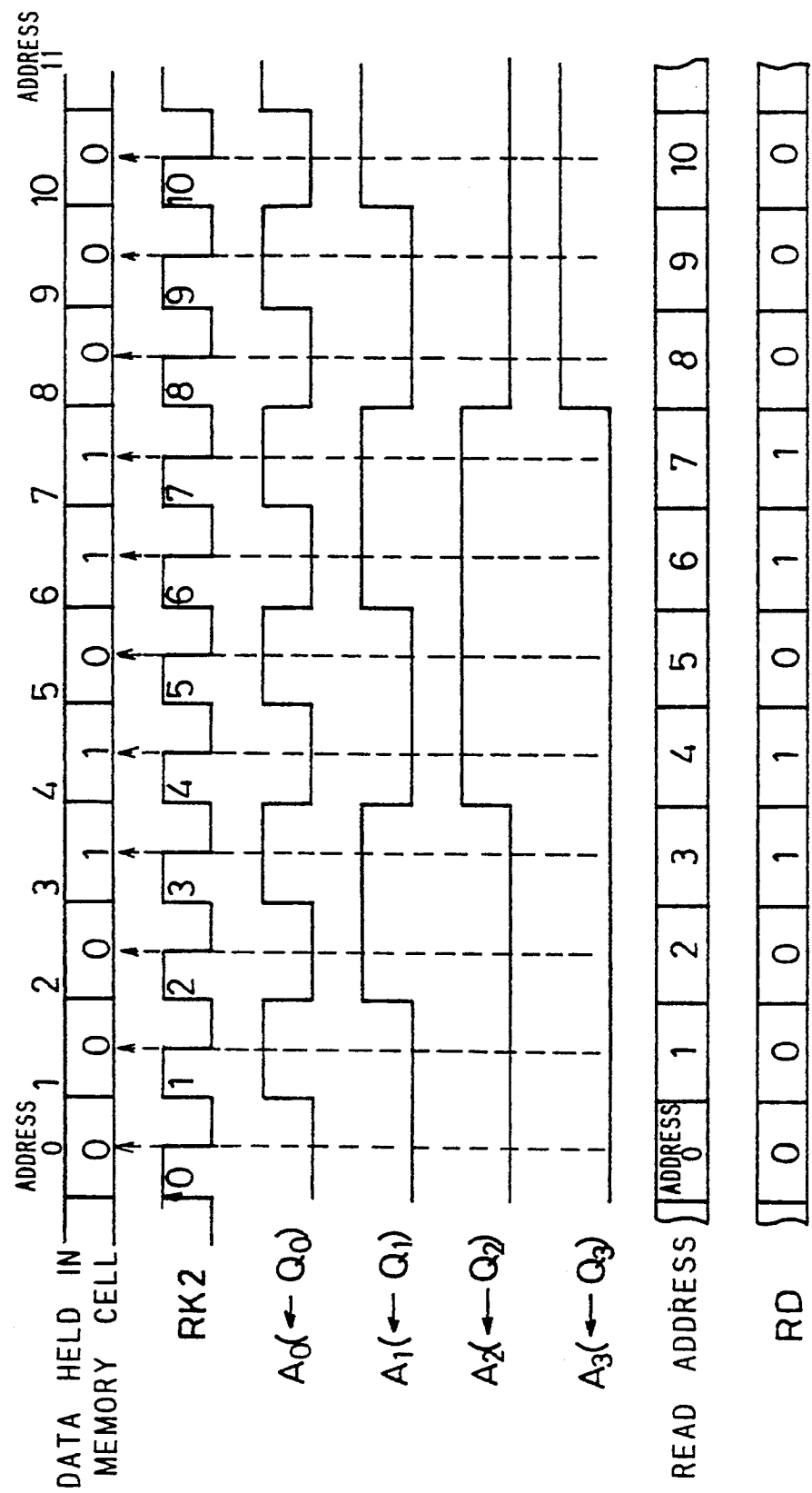
FIG. 5 is a waveform diagram showing an operation of the first-in first-out memory device according to the first, second or third embodiment of the present invention.
Figure 6:
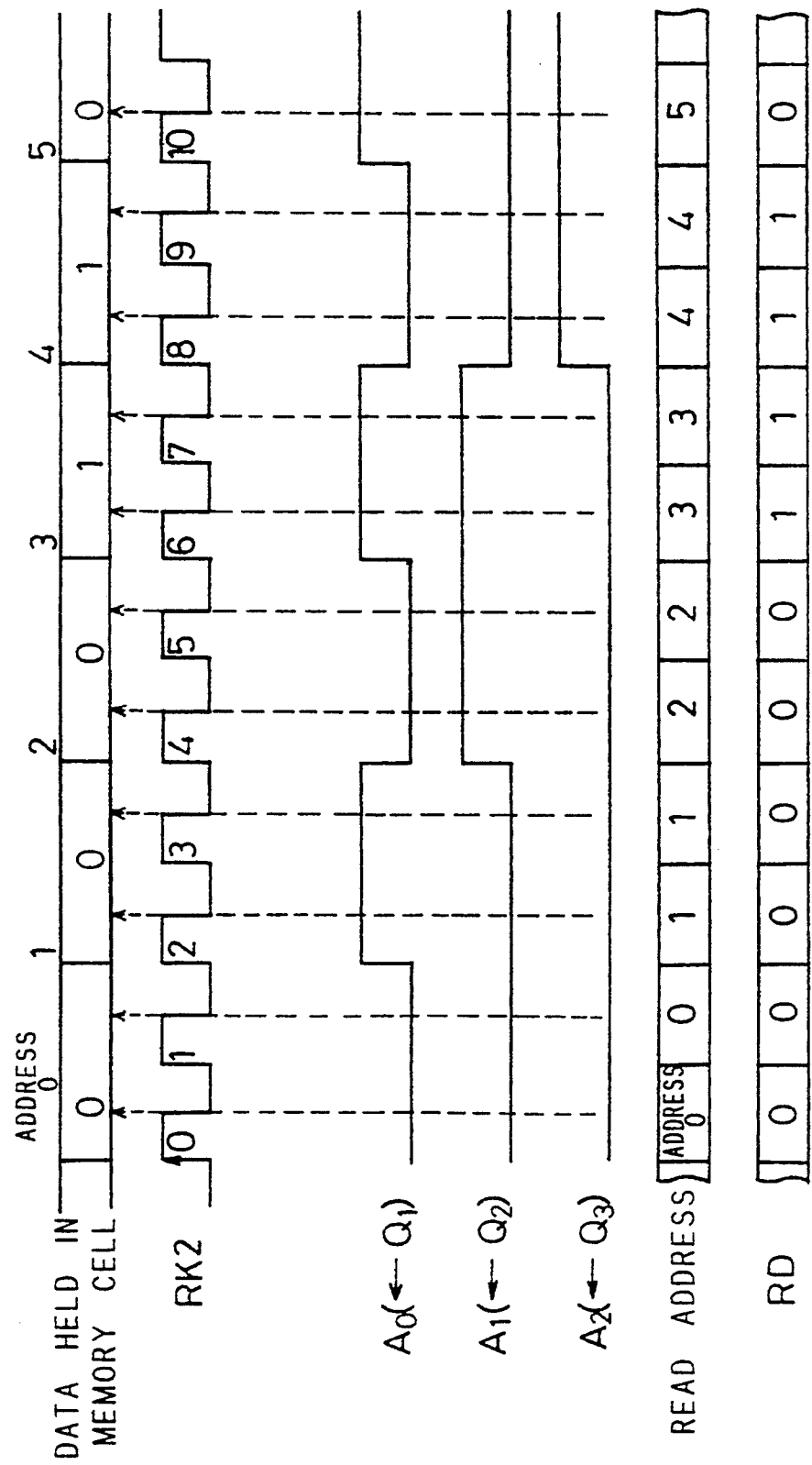
FIG. 6 is a waveform diagram showing an operation of the first-in first-out memory device according to the first or third embodiment of the present invention.
Figure 7:
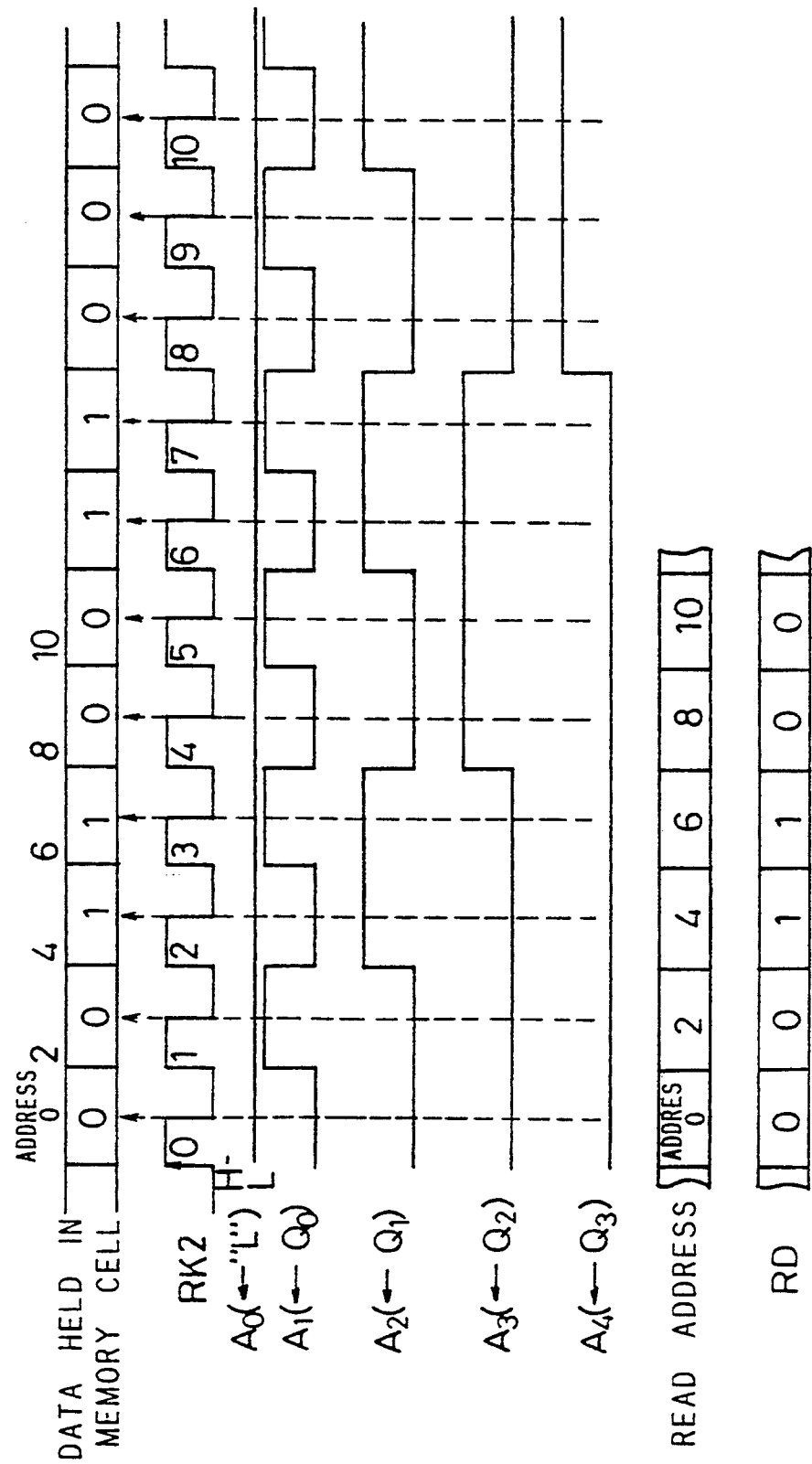
FIG. 7 is a waveform diagram showing an operation of the first-in first-out memory device according to the second or third embodiment of the present invention.

It is assumed here that the memory cell matrix 12 already holds data "00011011 ..." from an address zero. As the read data sense amplifier 19 reads the data from the memory cells in response to the read clocks RK2 as shown in FIG. 5 in the case of equal-scale magnification with no enlargement/reduction, the read address decoder 18 changes the read addresses one by one successively from the address zero. The read sense amplifier 19 outputs "00011011 ..." as the read data RD. However, the output terminals $Q_1$, $Q_2$ and $Q_3$ of the read clock counter 16 of the FIFO memory device 30 shown in FIG. 1 are connected to the input terminals $A_0$, $A_1$ and $A_2$ of the read address decoder 18 respectively. Table 1 shows such connection, in which the outputs $Q_2$, $Q_1$ and $Q_0$ of the read clock counter 16 are bitwisely shifted to low order digits, in the column of enlargement magnification of 2. It is assumed that the memory cell matrix 12 holds data "00011011 ..." in order from the address zero. When outputs of the enlargement magnification of 2 are obtained, the address specified by the read address decoder 18 is changed once every time the read data sense amplifier 19 reads the data from the memory cell matrix 12 twice in response to the read clocks RK2, as shown in FIG. 6. Therefore, the data are read twice from the same read address, such as the address zero, for example, and the read data sense amplifier 19 outputs read data RD of "0000001111001111 ...".

Similarly when the respective output terminals $Q_0$ to $Q_3$ of the read clock counter 16 output signals indicating values of respective digits of binary numbers expressing the count values, the outputs of the read clock counter 16 may be shifted to digits which are lower by two bits in the case of enlargement magnification of 4 or by three bits in the case of enlargement magnification of 8, to be connected to the input terminals $A_0$ to $A_3$ of the read address decoder 18. Table 1 shows such connection in the column of enlargement magnification of 4, for example.

Figure 2:
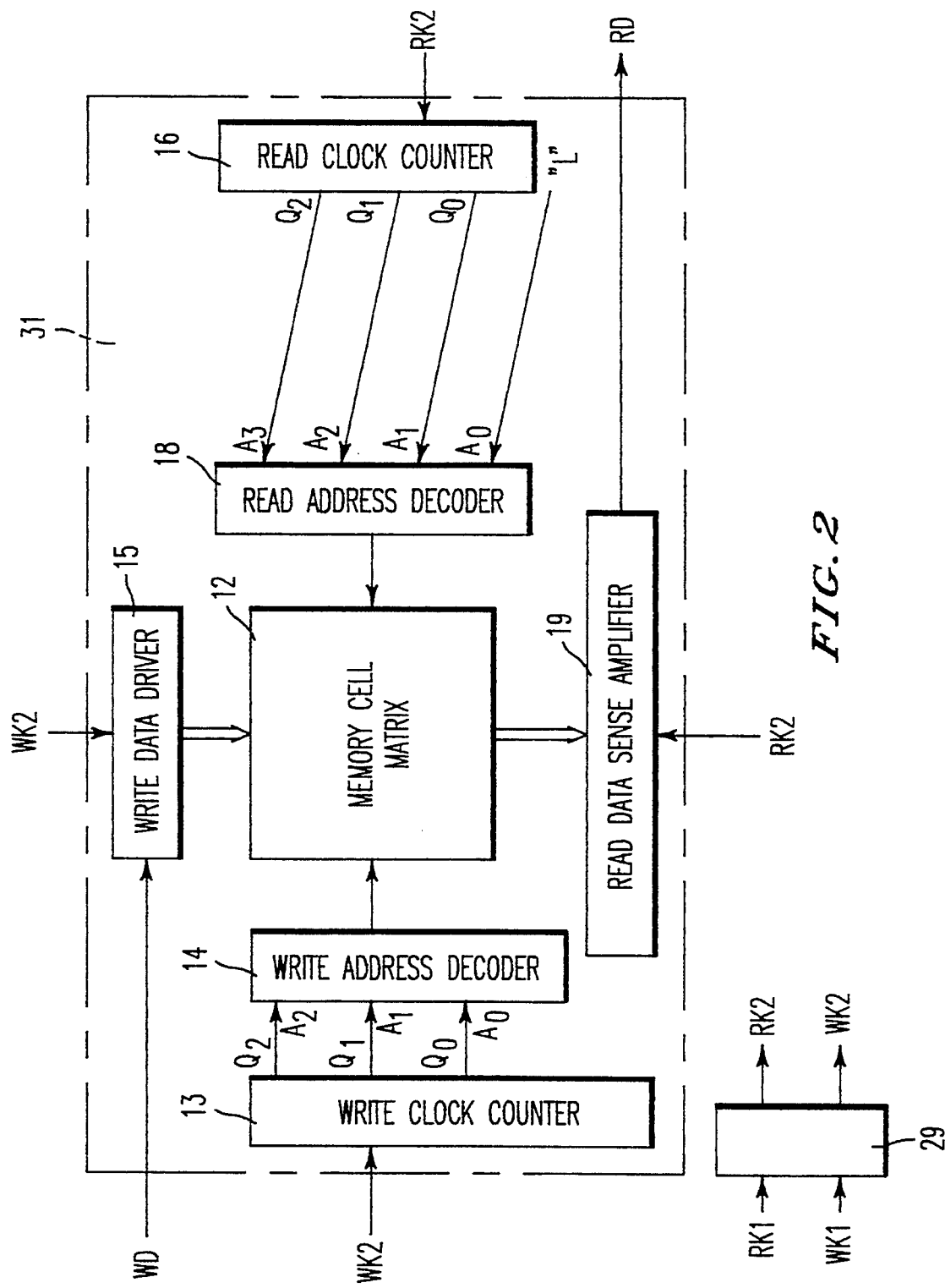
FIG. 2 is a block diagram showing the structure of a first-in first-out memory device according to a second embodiment of the present invention.

A second embodiment of the present invention is now described with reference to FIG. 2. Referring to FIG. 2, numeral 31 denotes an FIFO memory device which is set at reduction magnification of 0.5, while reference numerals identical to those in FIG. 1 denote the same or equivalent parts. The FIFO memory device 31 according to the second embodiment shown in FIG. 2 is different from the FIFO memory device 30 shown in FIG. 1 in a point that output terminals $Q_0$ to $Q_2$ of a read clock counter 16 are bitwisely shifted to high order digits to be connected to input terminals $A_0$ to $A_3$ of a read address decoder 18. Namely, the input terminal $A_0$ of the read address decoder 18 is fixed at a low level, while the input terminals $A_1$, $A_2$ and $A_3$ are connected with the output terminals $Q_0$, $Q_1$ and $Q_2$ of the read clock counter 16 respectively. Table 2 shows such connection on an upper line in the column of reduction magnification of 0.5.

TABLE 2

| Reduction Magnification | Read Address Decoder Input Terminal | | | < Remarks > |
|---|---|---|---|---|
| | $A_2$ | $A_1$ | $A_0$ | Memory Address for Reduction |
| × 1 | $Q_2$ | $Q_1$ | $Q_0$ | — |
| × 0.5 | $Q_1$ | $Q_0$ | L | Even |
| × 0.5 | $Q_1$ | $Q_0$ | H | Odd |
| × 0.25 | $Q_0$ | L | L | 0, 4, 8 ... |
| × 0.25 | $Q_0$ | L | H | 1, 5, 9 ... |
| × 0.25 | $Q_0$ | H | L | 2, 6, 10 ... |
| × 0.25 | $Q_0$ | H | H | 3, 7, 11 ... |

It is assumed that a memory cell matrix 12 already holds data "00011011 ..." successively from an address zero. When outputs of reduction magnification of 0.5 are obtained, addresses specified by the read address decoder 18 are changed once every time the read data sense amplifier 19 reads data from the memory cell matrix 12 once in response to read clocks RK2. In this case, however, every other addresses specified by the read address decoder 18 are changed, whereby the read addresses are specified as addresses zero, 2, 4, ... and "0011 ..." are outputted as read data RD.

Although the input terminal $A_0$ of the read address decoder 18 is fixed at a low level in this embodiment, this input terminal $A_0$ may alternatively be fixed at a high level. In this case, the read address decoder 18 specifics every other data successively from an address 1 as addresses 3, 5, 7, ..., whereby read clocks RD "0101 ..." are outputted with reduction magnification of 0.5.

When the respective output terminals $Q_0$ to $Q_3$ of the read clock counter 16 output signals indicating values of respective digits of binary numbers expressing the count values and the reduction magnification is set at 0.25, the outputs $Q_0$ to $Q_2$ of the read clock counter 16 are shifted to high order digits by two bits and the output terminal $Q_0$ of the read clock counter 16 is connected to the input terminal $A_2$ of the read address decoder 18. In this case, addresses outputted as the read data RD depend on whether the input terminals $A_0$ and $A_1$ of the read address decoder 18 are fixed at high or low levels respectively, as shown in the column of reduction magnification of 0.25 in Table 2. In other words, data in addresses zero, 4, 8, ... of the memory cell matrix 12 are outputted when $A_0=A_1=$"L" and those of addresses 1, 5, 9, ... of the memory cell matrix 12 are outputted when $A_0=$"H" and $A_1=$"L" while those of addresses 2, 6, 10, ... of the memory cell matrix 12 are outputted when $A_1=$"H" and $A_0=$"L" and those of addresses 3, 7, 11, ... of the memory cell matrix 12 are outputted when $A_0=A_1=$"H" as the read data RD.

Figure 3:
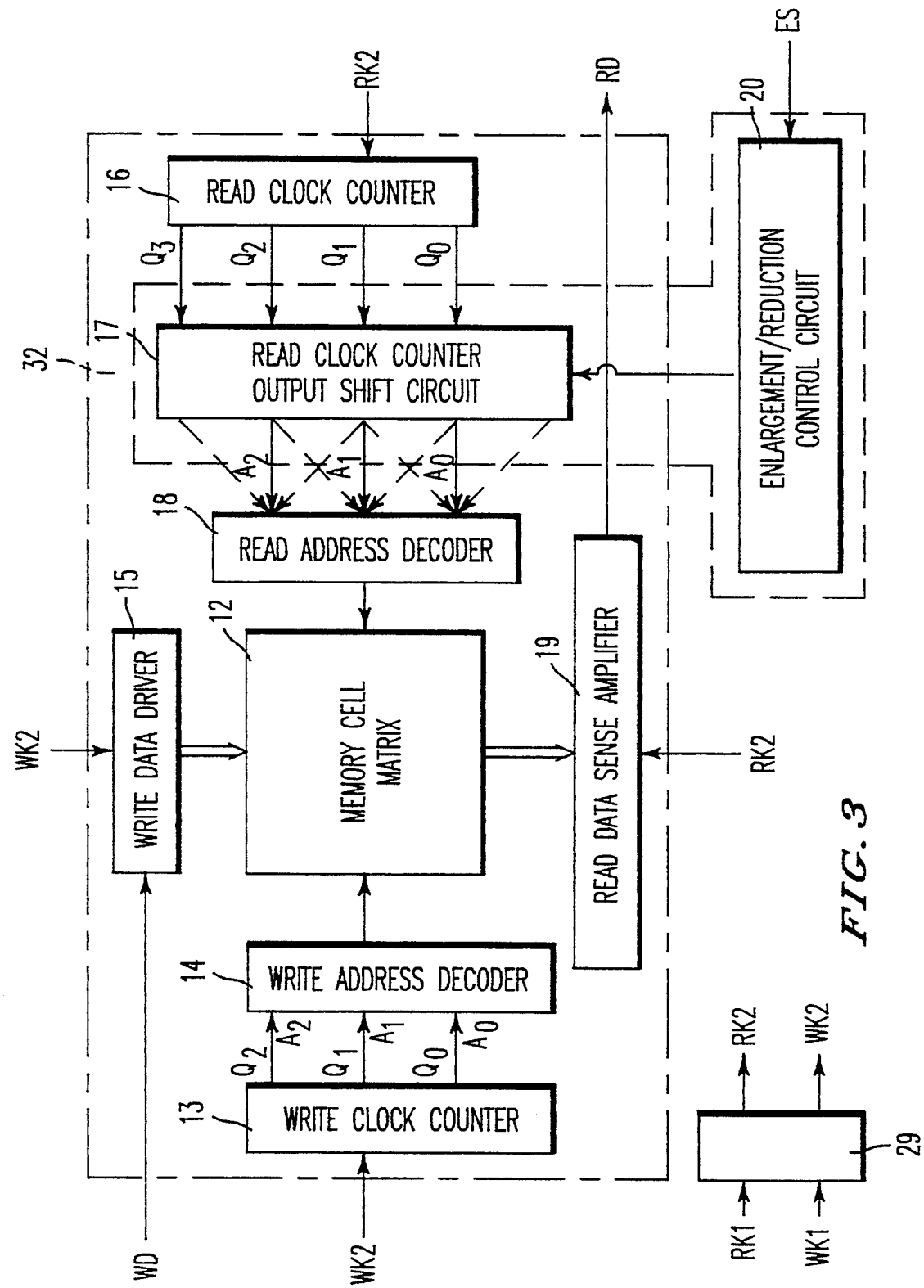
FIG. 3 is a block diagram showing the structure of a first-in first-out memory device according to a third embodiment of the present invention.
Figure 4A:
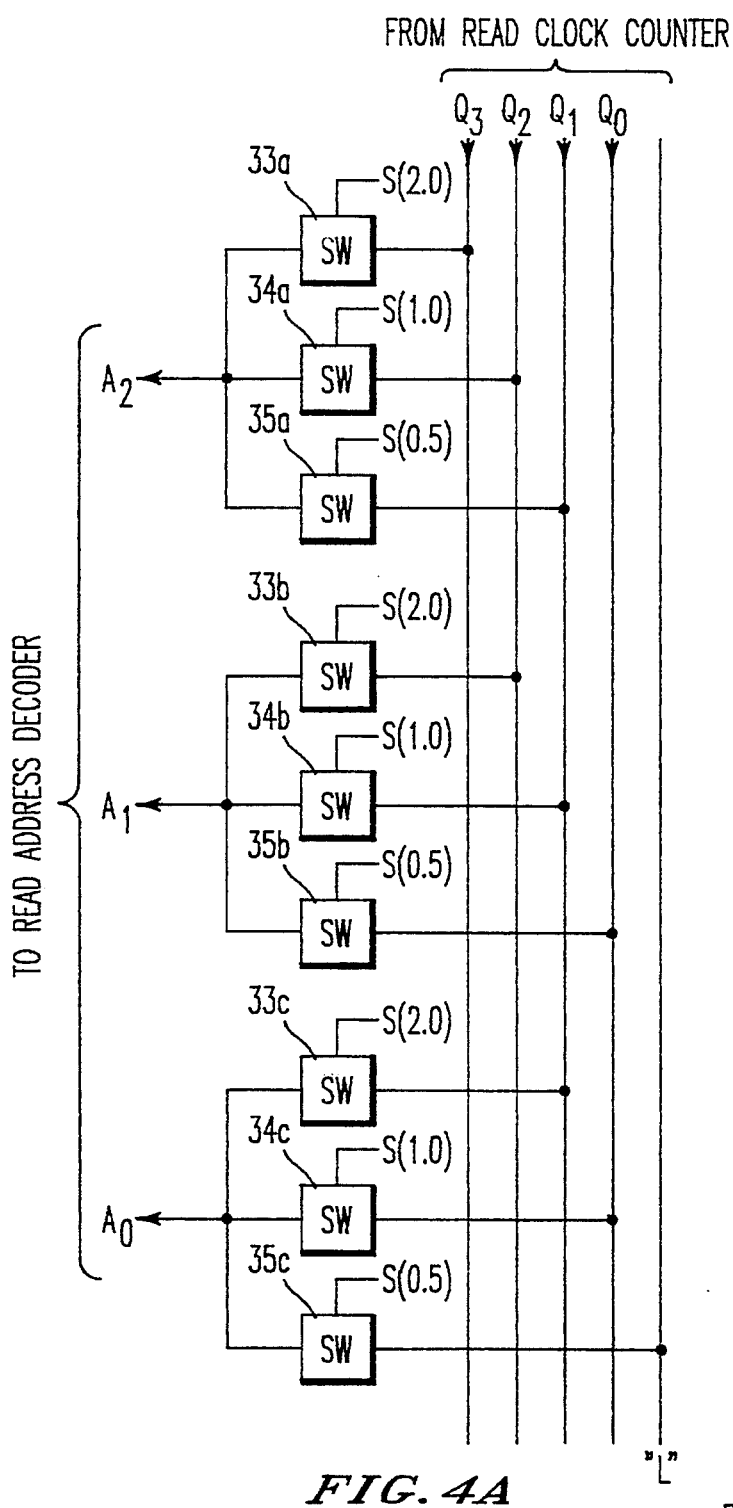
FIG. 4(a) and 4(b) are circuit diagrams showing the structure of a clock counter output shift circuit of the first-in first-out memory device shown in FIG. 3.
Figure 4B:
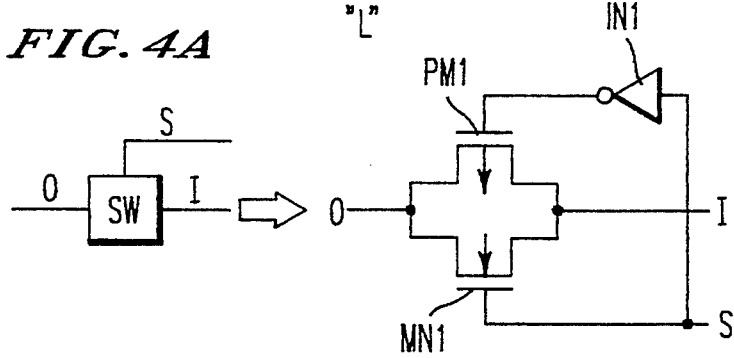

A third embodiment of the present invention is now described with reference to FIG. 3. FIG. 3 is a block diagram showing the structure of an FIFO memory device 32 capable of programming enlargement/reduction magnification according to the third embodiment of the present invention. Referring to FIG. 3, numeral 17 denotes a read clock counter output shift circuit which receives signals outputted from output terminals $Q_0$ to $Q_3$ of a read clock counter 16, shifts the signals to high or low order digits in accordance with enlargement/reduction magnification set by a control signal and outputs the same to a read address decoder 18, and numeral 20 denotes an enlargement/reducing control circuit which outputs the control signal to the read clock counter output shift circuit 17 in accordance with an enlargement/reduction magnification set input signal ES received from the exterior, while the remaining numerals identical to those in FIG. 1 denote the same or corresponding parts. While the enlargement/reduction magnification is fixed every FIFO memory device in the first and second embodiments, the enlargement/reduction magnification can be freely set in the FIFO memory device 32 according to the third embodiment by the externally received enlargement/reduction magnification set signal ES. The read clock counter output shift circuit 17 is controlled by the received enlargement/reduction magnification set signal ES to shift output signals from the output terminals $Q_0$ to $Q_3$ of the read clock counter 16 and connect the same to input terminals $A_0$ to $A_2$ of the read address decoder 18. An operation following this is identical to those described with reference to the first and second embodiments, and hence redundant description is omitted. The structure of the read clock counter output shift circuit 17 and its operation for shifting the outputs of the read clock counter 16 and supplying the same to the read address decoder 18 are now described. FIG. 4 is a circuit diagram showing the structure of the read clock counter output shift circuit 17 shown in FIG. 3. Referring to FIG. 3, numerals 33a to 33c, 34a to 34c and 35a to 35c denote switching circuits which receive the outputs from the output terminals $Q_0$ to $Q_3$ of the read clock counter 16 and supply the same to the input terminals $A_0$ to $A_2$ of the read address decoder 18 in response to control signals S(2.0), S(1.0) and S(0.5) outputted from an enlargement/reduction control circuit 20 respectively. As shown at (b) in FIG. 4, each of the switching circuits 33a to 33c, 34a to 34c and 35a to 35c comprises a transmission gate which is formed by MOS transistors PM1 and MN1 and an inverter IN1.

TABLE 3

| Magnification | Control Signal | | |
|---|---|---|---|
| | S (2.0) | S (1.0) | S (0.5) |
| × 2 | "H" | "L" | "L" |
| × 1 | "L" | "H" | "L" |
| × 0.5 | "L" | "L" | "H" |

The enlargement/reduction magnification is decided by the control signals S(2.0), S(1.0) and S(0.5) outputted from the enlargement/reduction control circuit 20 shown in Table 3. In the case of enlargement magnification of 2, for example, the control signals S(2.0), S(1.0) and S(0.5) are set at high, low and low levels respectively. The switching circuits 33a to 33c are turned on to connect the output terminals $Q_3$, $Q_2$ and $Q_1$ of the read clock counter 16 with the input terminals $A_2$, $A_1$ and $A_0$ of the read address decoder 18 respectively. At this time, the switching circuits 34a to 34c and 35a to 35c are in OFF states. Also in the cases of set magnification of 1.0 and magnification of 0.5, the switching circuits 33a to 33c, 34a to 34c and 35a to 35c are set by the control signals to implement connection between the read clock counter 16 and the read address decoder 18.

Figure 8:
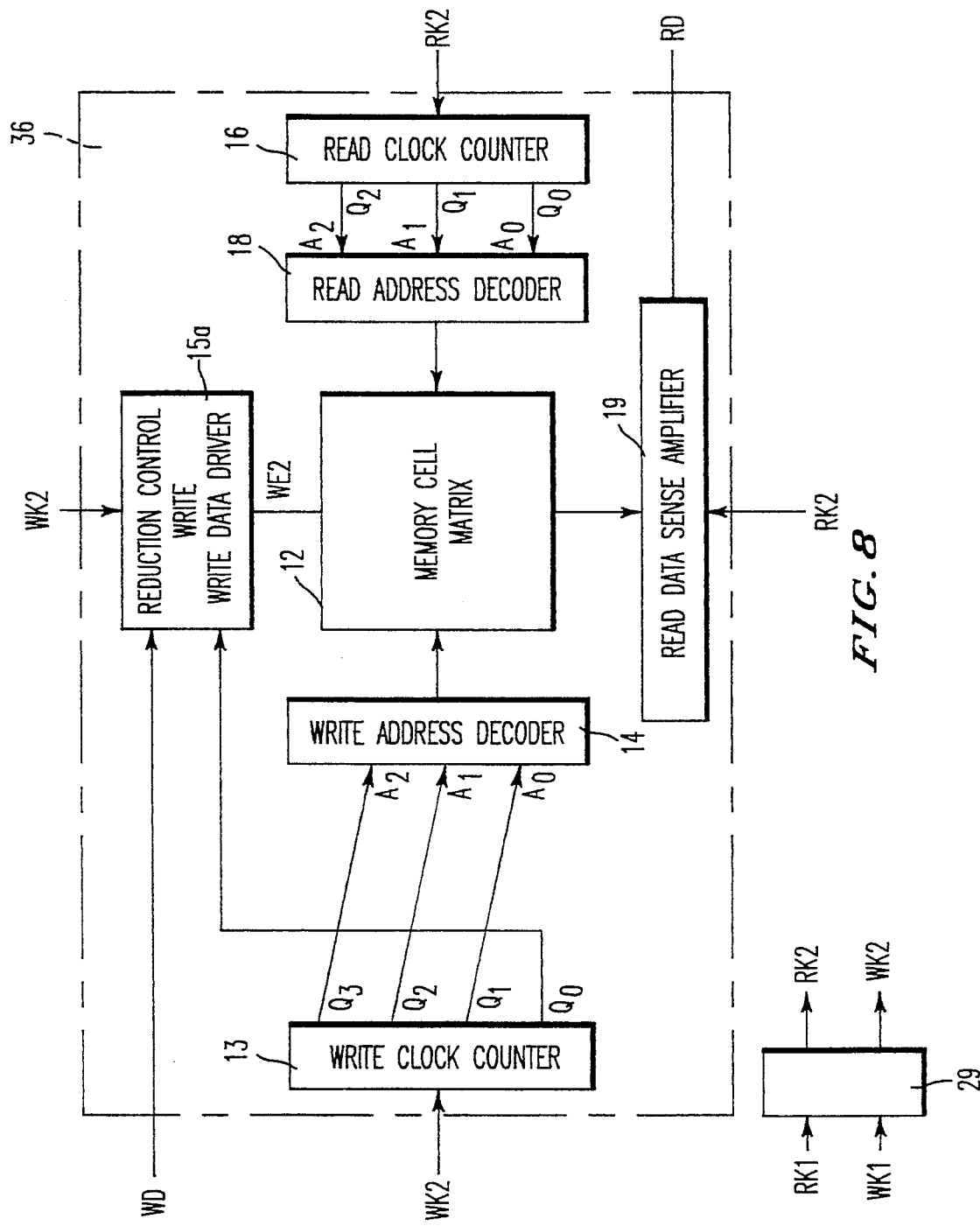
FIG. 8 is a block diagram showing the structure of a first-in first-out memory device according to a fourth embodiment of the present invention.

A fourth embodiment of the present invention is now described with reference to FIG. 8. FIG. 8 is a block diagram showing the structure of an FIFO memory device 36 which reduces write data received therein for writing the same in a memory cell matrix 12. Referring to FIG. 8, numeral 15a denotes a reduction control write data driver which writes received write data RD in the memory cell matrix 12 in response to write clocks WK2 and a signal outputted from an output terminal $Q_0$ of a write clock counter 13, while numerals identical to those in FIG. 1 denote the same or corresponding parts. However, output terminals $Q_0$, $Q_1$ and $Q_2$ of a read clock counter 16 are connected to input terminals $A_0$, $A_1$ and $A_2$ of a read address decoder 18 respectively. Therefore, neither enlargement nor reduction of the data is caused on the read side. Output terminals $Q_1$ to $Q_3$ of the write clock counter 13 are bitwisely shifted to low order digits to be connected to input terminals $A_0$ to $A_2$ of a write address decoder 14. The output terminal $Q_0$, which outputs a value of the least significant digit of count values of the write clock counter 13, is connected to the write data driver 15a. The write data driver 15a takes the logical product of the signal outputted from the output terminal $Q_0$ of the write clock counter 13 and the write clock WK2, to generate a write enable signal WE2 indicating timing for writing the data. Table 4 shows such connection of the write address decoder 14 and the write clock counter 13 in the column of reduction magnification of 0.5.

TABLE 4

| Reduction Magnification | Write Address Decoder Input Terminal | | |
|---|---|---|---|
| | $A_2$ | $A_1$ | $A_0$ |
| × 1 | $Q_2$ | $Q_1$ | $Q_0$ |
| × 0.5 | $Q_3$ | $Q_2$ | $Q_1$ |
| × 0.25 | $Q_4$ | $Q_3$ | $Q_2$ |

It is assumed here that the reduction control write data driver 15a successively receives write data RD "00011011". When data are held in reduction magnification of 0.5, addresses are changed once every time the write data WD are inputted twice so that the data are written twice in every address and hence only even data can be written. In order to eliminate such inconvenience, the write data driver 15a writes the write data WD in the memory cell matrix 12 in response to the write enable signal WE2, which is the logical product of the write clock WK2 and the output $Q_0$ of the clock counter 16. The addresses specified by the write address decoder 18 are changed once every time the write data driver 15a processes the write data WD by two bits. While the addresses specified by the write address decoder 18 are successively changed from an address zero at this time, the write enable signal WE2 goes high for only odd addresses of the write clocks WK2, whereby the write data WD are written in the memory cell matrix 12 every address as the addresses 1, 3, 5, ..., to be held therein. The memory cell matrix 12 holds data "01010" successively from the address zero.

While the above embodiment has been described with reference to the reduction magnification of 0.5, the outputs of the write clock counter 13 are shifted by two bits so that the output terminals $Q_2$ to $Q_4$ of the write clock counter 13 are connected to the input terminals $A_0$ to $A_3$ of the write address decoder 14 when the output terminals $Q_0$ to $Q_3$ of the write clock counter 13 output signals indicating values of respective digits of binary numbers expressing the count values and magnification is set at reduction magnification of 0.25. Table 4 shows such connection in the column of reduction magnification of 0.25.

Figure 9:
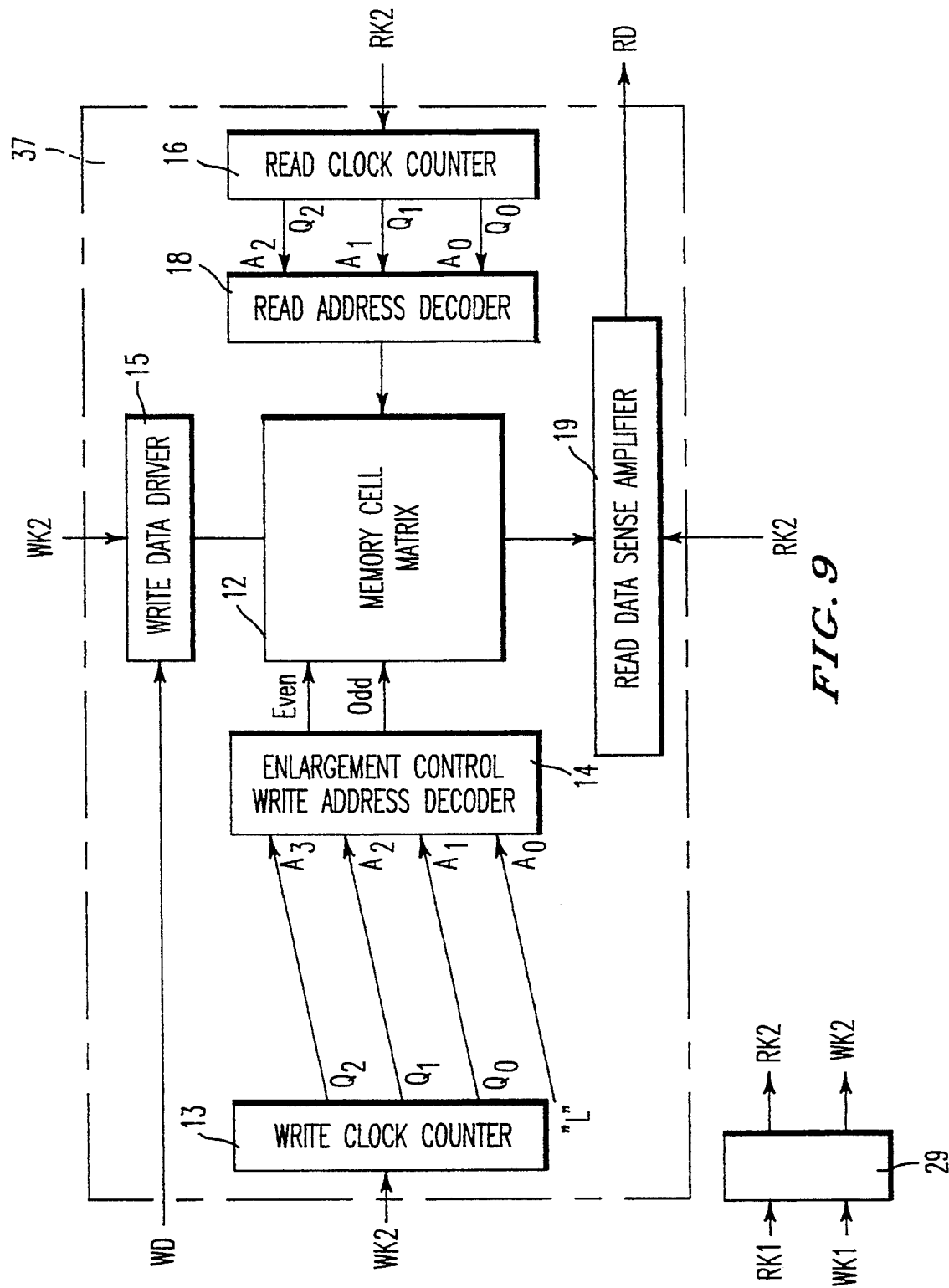
FIG. 9 is a block diagram showing the structure of a first-in first-out memory device according to a fifth embodiment of the present invention.

A fifth embodiment of the present invention is now described with reference to FIG. 9. FIG. 9 is a block diagram showing the structure of an FIFO memory device 37 which enlarges write data received therein for writing the same in a memory cell matrix 12. Referring to FIG. 9, numeral 14a denotes an enlargement control write address decoder which is formed in eight for simultaneously specifying addresses of two memory cells by count values received from output terminals $Q_0$ to $Q_3$ of a write clock counter 13, while numerals identical to those in FIG. 1 denote the same or corresponding parts. However, output terminals $Q_0$, $Q_1$ and $Q_2$ of a read clock counter 16 are connected to input terminals $A_0$, $A_1$ and $A_2$ of a read address decoder 18 respectively. Therefore, neither enlargement nor reduction of data is caused on the read side. The output terminals $Q_0$ to $Q_2$ of the write clock counter 13 are bitwisely shifted to high order digits and connected to the input terminals $A_1$ to $A_3$ of the write address decoder 14a. Table 5 shows such connection of the write address decoder 14a and the write clock counter 13 in the column of enlargement magnification of 2.

TABLE 5

| Enlargement Magnification | Write Address Decoder Input Terminal | | | Structure of Write Address Decoder |
|---|---|---|---|---|
| | $A_2$ | $A_1$ | $A_0$ | |
| × 1 | $Q_2$ | $Q_1$ | $Q_0$ | — |
| × 2 | $Q_1$ | $Q_0$ | "L" or "H" | Simultaneously select (Address 0, Address 1), (2,3), (4,5) ... |
| × 4 | $Q_0$ | "L" or "H" | "L" or "H" | Simultaneously select (0,1,2,3), (4,5,6,7), (8,9,10,11) ... |

It is assumed here that a write data driver 15 receives write data RD "00011011" successively in addresses zero to 7. When the data are written in the memory cell matrix 12 with enlargement magnification of 2, addresses specified by the enlargement control write address decoder 14a are changed once every time the write data driver 15 writes 2-bit data in the memory cell matrix 12 in response to write clocks RK2. At this time, the control write address decoder 14a specifies two addresses, such as addresses zero and 1 or 2 and 3, for example, to bring the same into simultaneously writable states with respect to input of a single count value of the write clock counter 13. Therefore, a single write data WD is written in two addresses of the memory cell matrix 12, so that the memory cell matrix 12 holds data "0000001111001111" successively from the address zero. Thus, the data can be enlarged to twice.

Also when the output terminals $Q_0$ to $Q_3$ of the write clock counter 13 output signals indicating values of respective digits of binary numbers expressing the count values, the outputs of the write clock counter 13 may be upwardly shifted by two digits in the case of enlargement magnification of 4 and three digits in the case of enlargement magnification of 8, to be connected to the input terminals $A_0$ to $A_3$ of the write address decoder 14a. Table 5 shows such connection in the column of enlargement magnification of 4. In the case of enlargement magnification of 4, the input terminals $A_0$ and $A_1$ of the write address decoder 14a are fixed at low or high levels as shown in Table 5. At this time, the write address decoder 14a simultaneously specifies four addresses such as addresses zero, 1, 2 and 3 or 4, 5, 6 and 7, for example, with respect to a single count value of the write clock counter 13.

Figure 10:
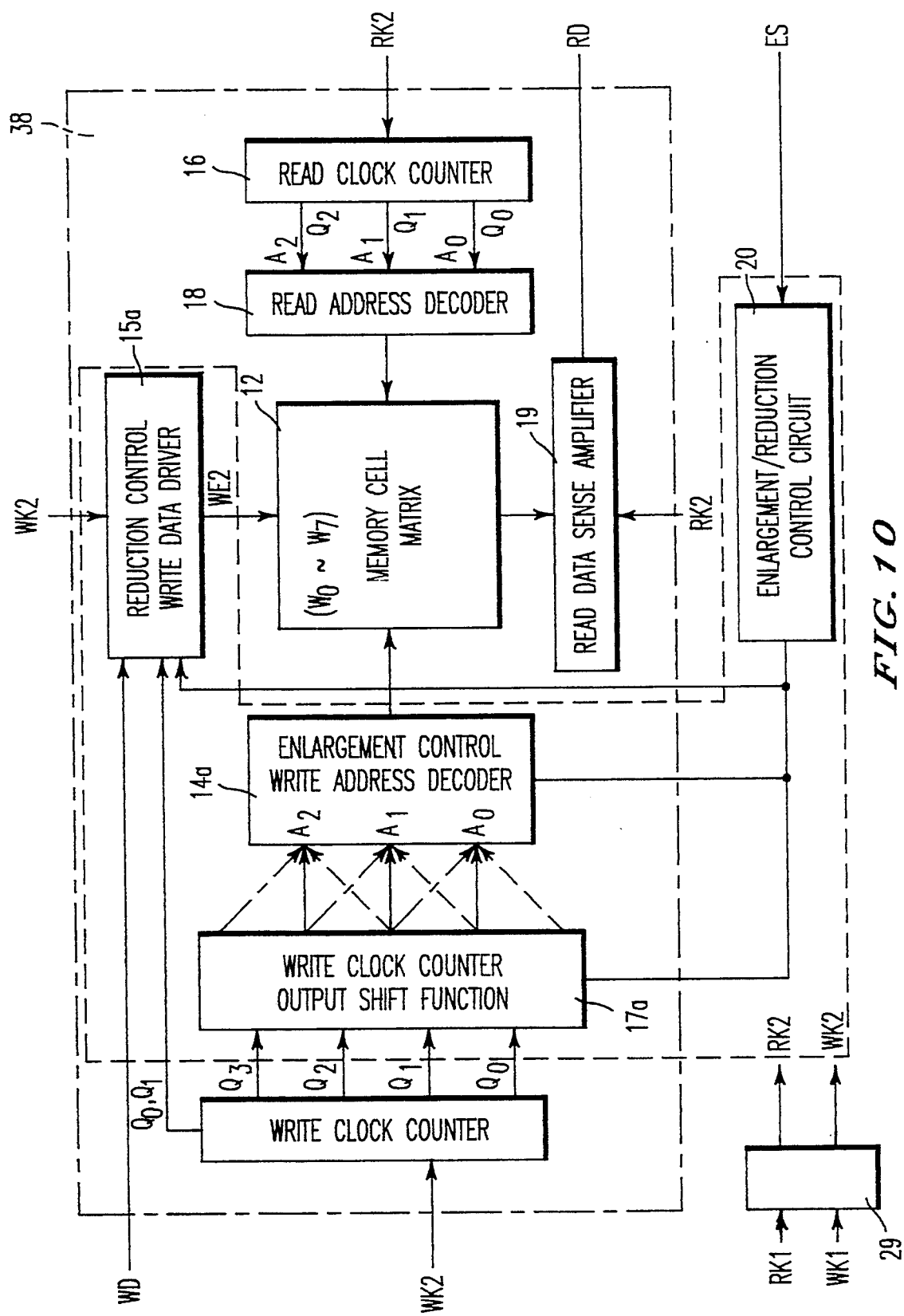
FIG. 10 is a block diagram showing the structure of a first-in first-out memory device according to a sixth embodiment of the present invention.
Figure 12A:
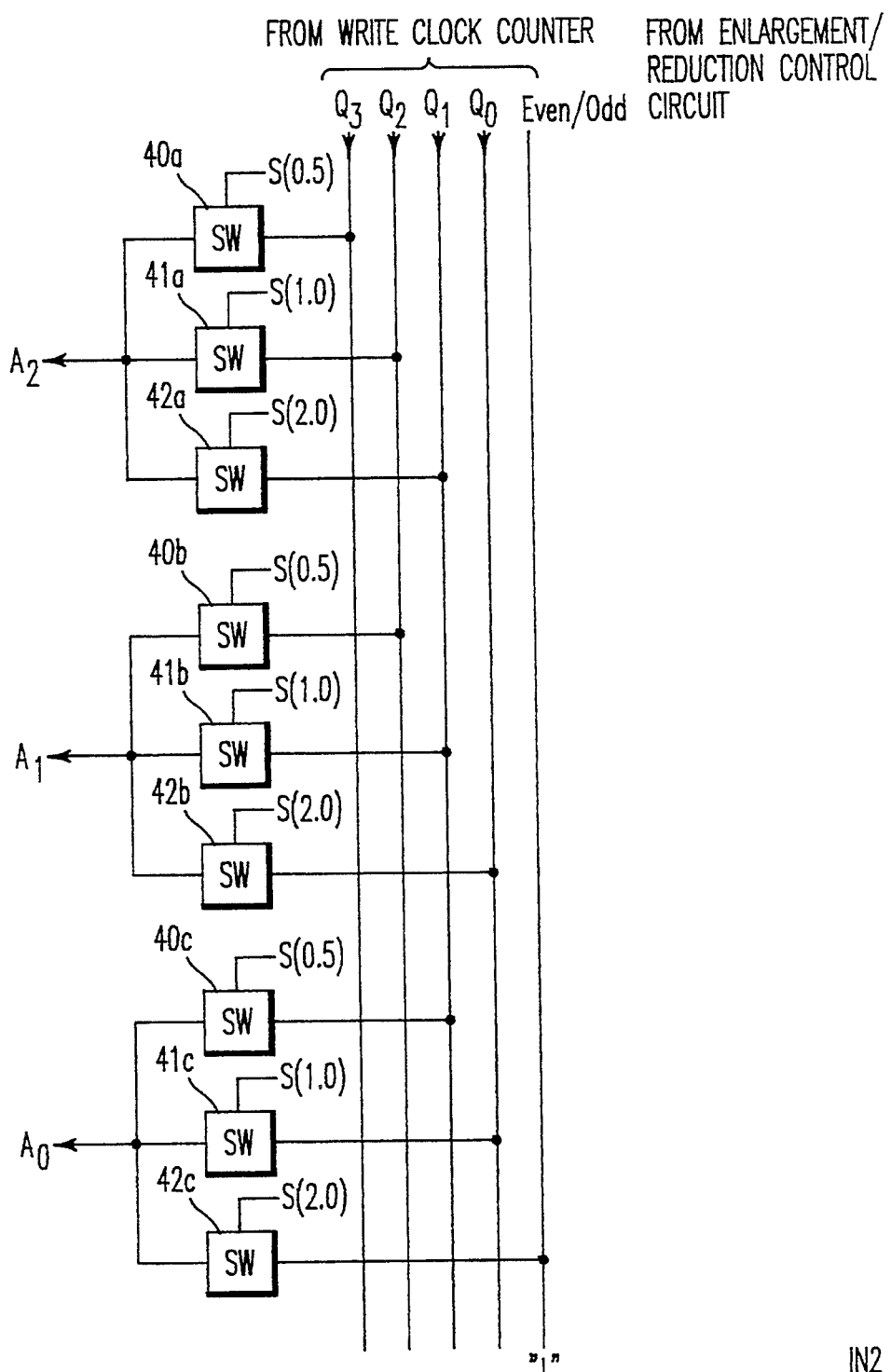
FIGS. 12(a) and 12(b) are block diagrams showing the structure of a clock counter output shift circuit of the first-in first-out memory device shown in FIG. 3.
Figure 12B:
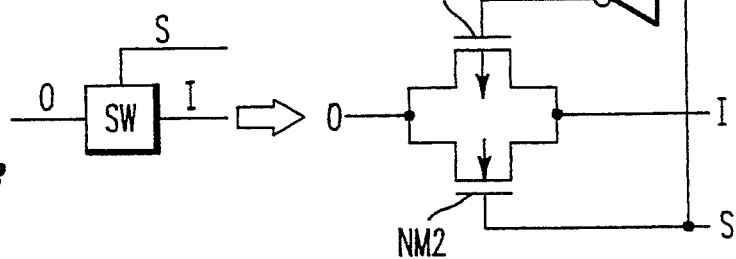
Figure 13:
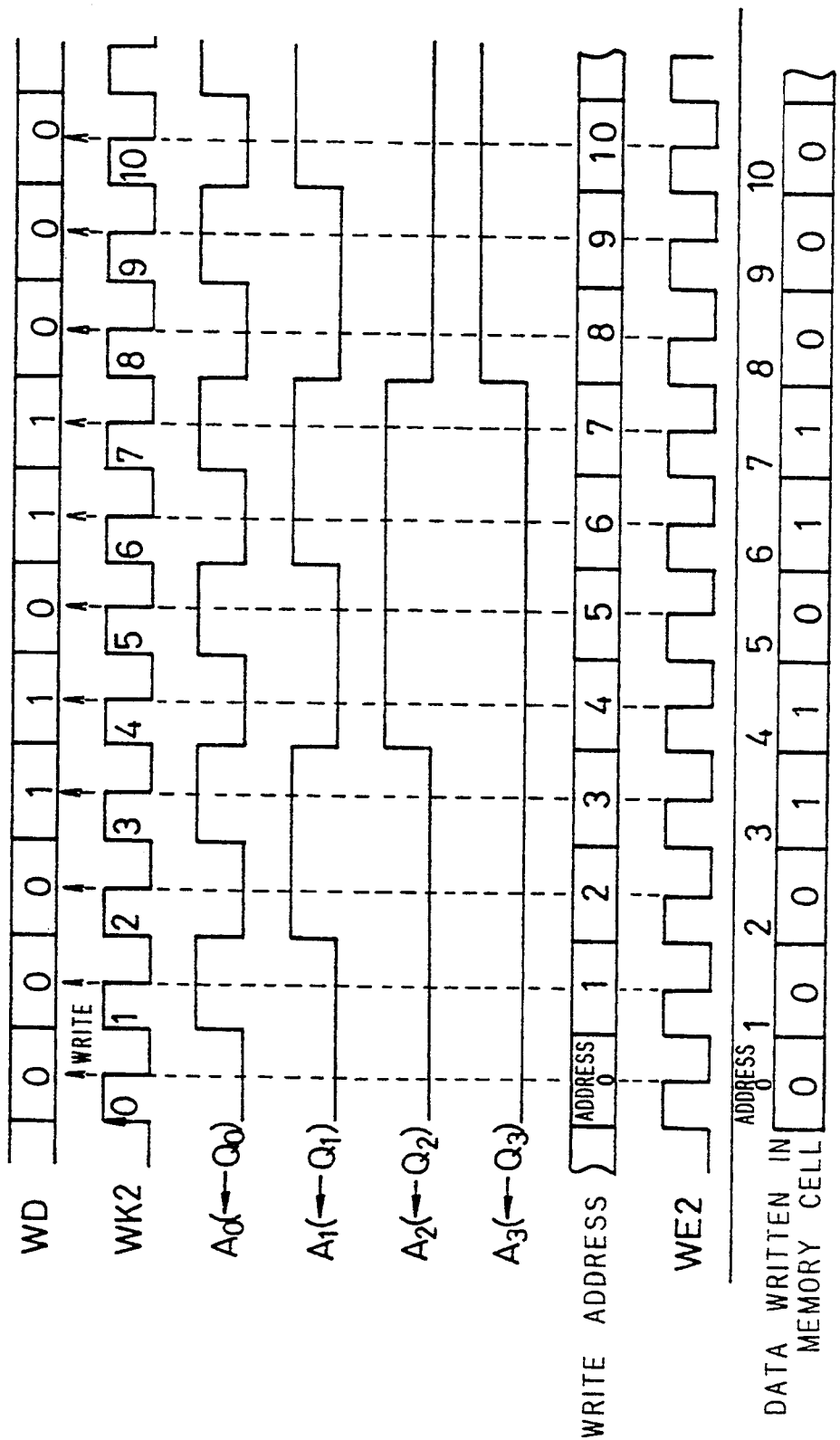
FIG. 13 is a waveform diagram for illustrating an operation of the first-in first-out memory device according to the fourth, fifth or sixth embodiment of the present invention.
Figure 14:
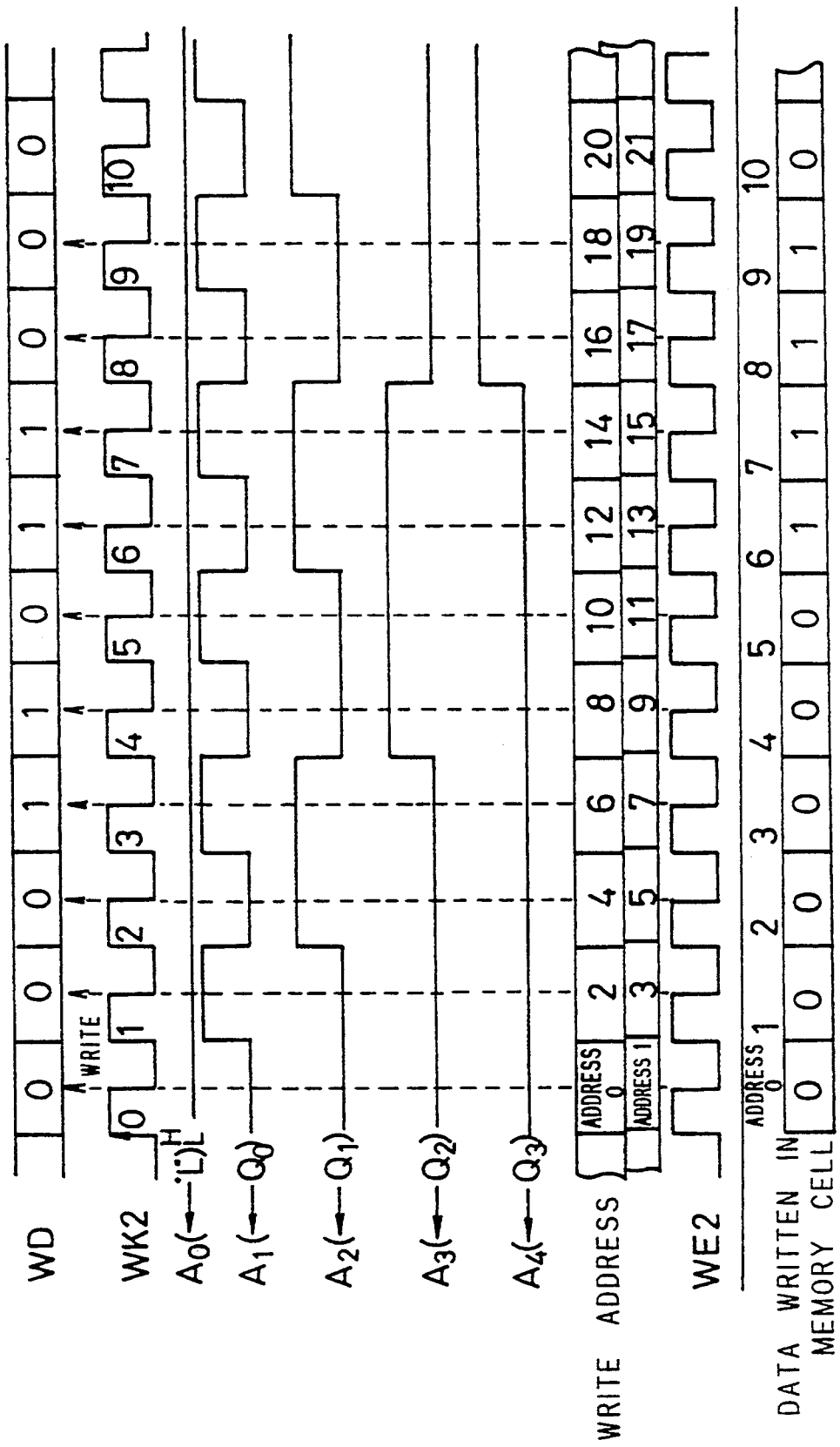
FIG. 14 is a waveform diagram showing an operation of the first-in first-out memory device according to the fourth or sixth embodiment of the present invention.
Figure 15:
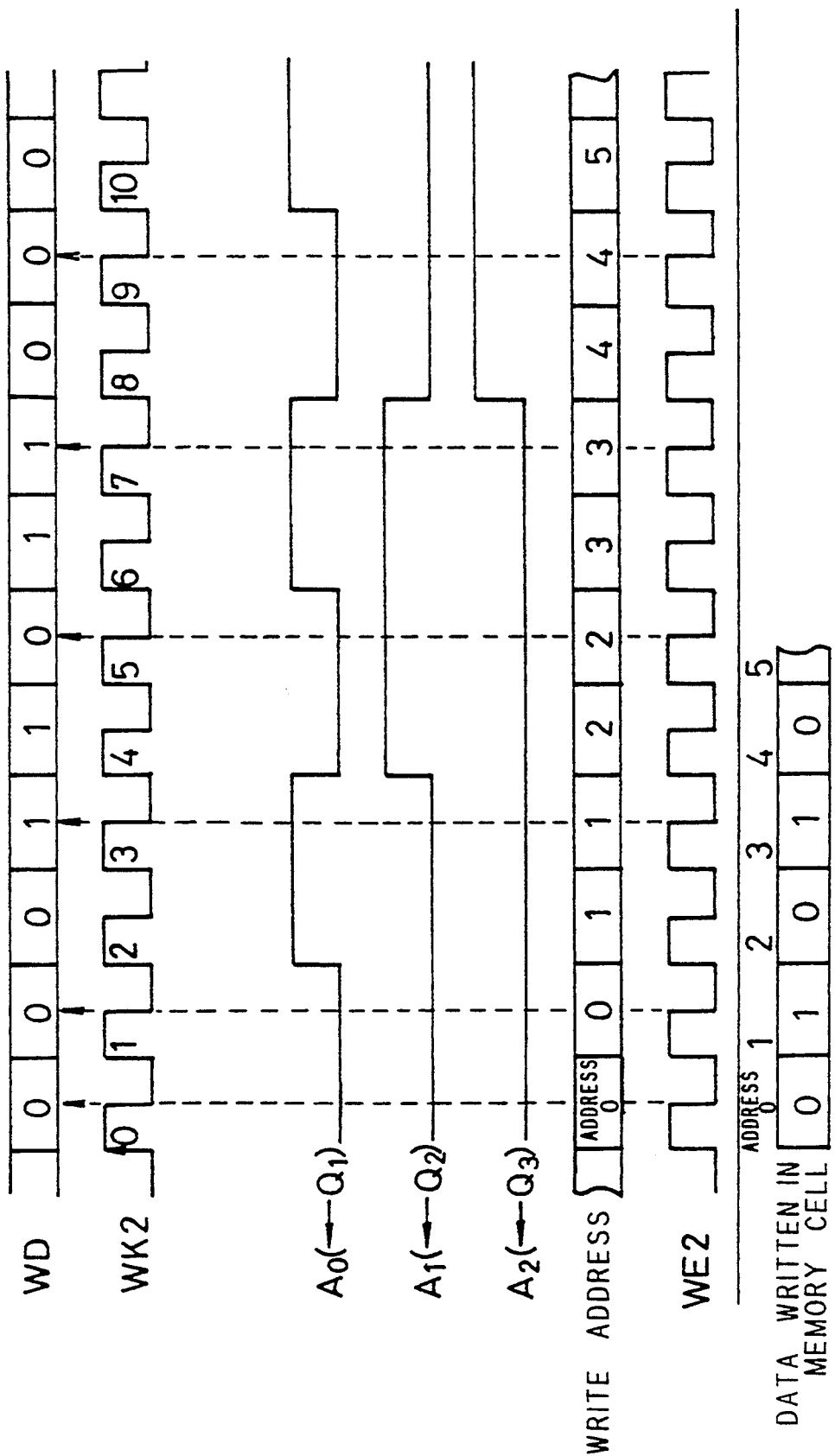
FIG. 15 is a waveform diagram showing an operation of the first-in first-out memory device according to the fifth or sixth embodiment of the present invention.
Figure 16:
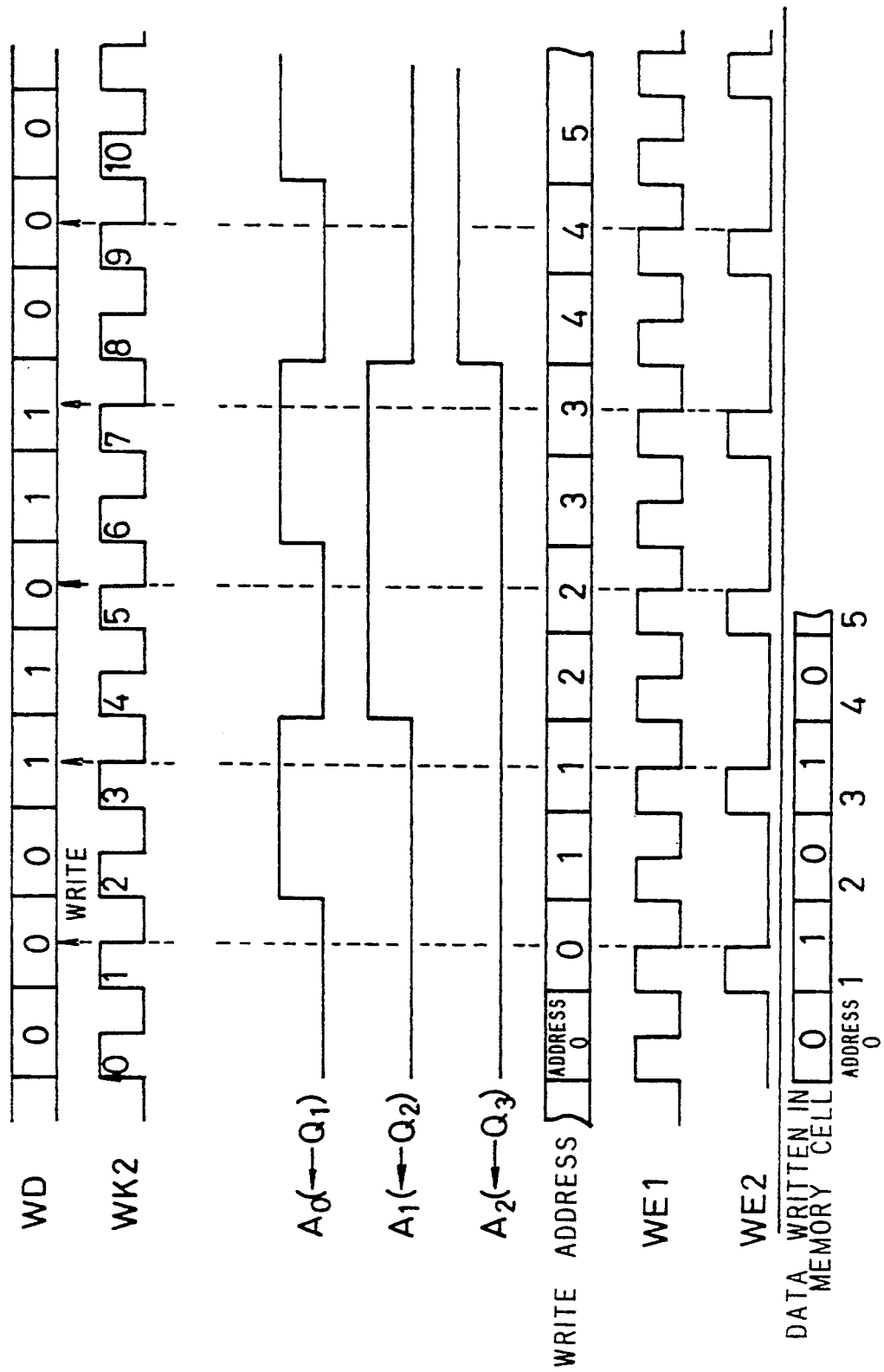
FIG. 16 is a waveform diagram showing another operation of the first-in first-out memory device according to the fifth or sixth embodiment of the present invention.

A sixth embodiment of the present invention is now described with reference to FIG. 10. FIG. 10 is a block diagram showing the structure of an FIFO memory device 38 according to the sixth embodiment of the present invention, which can freely set enlargement/reduction magnification. Referring to FIG. 10, numeral 17a denotes a write clock counter output shift circuit which receives signals outputted from output terminals $Q_0$ to $Q_3$ of a write clock counter 13 and shifts the signals to high or low order digits in accordance with enlargement/reduction magnification set by control signals to output the same to an enlargement control write address decoder 14a while also outputting the control signals selectively to the enlargement control write address decoder 14a, and numeral 20 denotes an enlargement/reduction control circuit which outputs the control signals to the write clock counter output shift circuit 17a, the enlargement control write address decoder 14a and a reduction control write data driver 15a in accordance with an enlargement/reduction magnification set signal ES received from the exterior, while numerals identical to those in FIGS. 8 and 9 denote the same or corresponding parts. While the enlargement/reduction magnification is fixed every FIFO memory device in the fourth and fifth embodiments, the enlargement/reduction magnification can be freely set in the FIFO memory device 38 according to the sixth embodiment by controlling the write clock counter output shift circuit 17a by the externally inputted enlargement/reduction magnification set signal ES. The enlargement/reduction magnification set signal ES is inputted in a enlargement/reduction control circuit 20 to control the write clock counter output shift circuit 17a thereby shifting output signals from output terminals $Q_0$ to $Q_3$ of the write clock counter 13 and connecting the same to input terminals $A_0$ to $A_2$ of the write address decoder 14a. An operation following this is similar to those described with reference to the fourth and fifth embodiments, and hence redundant description is omitted. The structure of the write clock counter output shift circuit 17a and its operation for shifting the outputs of the write clock counter 13 and supplying the same to the enlargement control write address decoder 14a are now described. FIG. 12 is a block diagram showing the structure of the write address counter output shift circuit 17a shown in FIG. 10. Referring to FIG. 12, numerals 40a to 40c, 41a to 41c and 42a to 42c denote switching circuits which receive outputs from the output terminals $Q_0$ to $Q_3$ of the write clock counter 13 and connect the same to the input terminals $A_0$ to $A_2$ of the enlargement control write address decoder 14a in response to control signals S(2.0), S(1.0) and S(0.5) respectively. As shown at (b) in FIG. 12, each of the switching circuits 40a to 40c, 41a to 41c and 42a to 42c comprises a transmission gate which is formed by MOS transistors PM2 and MN2 and an inverter IN2.

TABLE 6

| Magnification | Control Signal | | |
|---|---|---|---|
| | S (2.0) | S (1.0) | S (0.5) |
| × 2 | "H" | "L" | "L" |
| × 1 | "L" | "H" | "L" |
| × 0.5 | "L" | "L" | "H" |

It is possible to decide enlargement/reduction magnification by the control signals S(2.0), S(1.0) and S(0.5) outputted from the enlargement/reduction control circuit shown in Table 6. In the case of enlargement magnification of 2, for example, the control signals S(2.0), S(1.0) and S(0.5) are set at high, low and low levels respectively. The switching circuits 42a to 42c are turned on along this setting, so that the output terminals $Q_1$ and $Q_0$ of the write clock counter 13 are connected to the input terminals $A_2$ and $A_1$ of the enlargement control write address decoder 14a respectively and the input terminal $A_0$ receives a signal Even/odd outputted from the enlargement/reduction control circuit 20 as a control signal. At this time, the switching circuits 40a to 40c and 41a to 41c are in OFF states. It is also possible to implement connection between the write clock counter 13 and the enlargement control write address decoder 14a when set magnification is of 1.0 or of 1.5 by setting the switching circuits 40a to 40c, 41a to 41c and 42a to 42c by the control signals S(2.0), S(1.0) and S(0.5) from the enlargement/reduction control circuit 20. The enlargement control write address decoder 14a has a structure shown in Table 7, since it is necessary to simultaneously specify a plurality of addresses for data enlargement.

TABLE 7

| Magnification Control Signal | | | Decoder Input | | | Decoder Output (in Selection of "H") | | | | | | | |
|---|---|---|---|---|---|---|---|---|---|---|---|---|---|
| S (4.0) | S (2.0) | S (1.0) | A2 | A1 | A0 | W7 | W6 | W5 | W4 | W3 | W2 | W1 | W0 |
| 0 | 0 | 1 | 0 | 0 | 0 | L | L | L | L | L | L | L | H |
| | (× 1.0) | | 0 | 0 | 1 | L | L | L | L | L | L | H | L |
| | | | 0 | 1 | 0 | L | L | L | L | L | H | L | L |
| | | | 0 | 1 | 1 | L | L | L | L | H | L | L | L |
| | | | 1 | 0 | 0 | L | L | L | H | L | L | L | L |
| | | | 1 | 0 | 1 | L | L | H | L | L | L | L | L |
| | | | 1 | 1 | 0 | L | H | L | L | L | L | L | L |
| | | | 1 | 1 | 1 | H | L | L | L | L | L | L | L |
| 0 | 1 | 0 | 0 | 0 | 0 | L | L | L | L | L | L | H | H |
| | (× 2.0) | | 0 | 1 | 0 | L | L | L | L | H | H | L | L |
| | | | 1 | 0 | 0 | L | L | H | H | L | L | L | L |
| | | | 1 | 1 | 0 | H | H | L | L | L | L | L | L |
| 1 | 0 | 0 | 0 | 0 | 0 | L | L | L | L | H | H | H | H |
| | (× 4.0) | | 1 | 0 | 0 | H | H | H | H | L | L | L | L |

When the enlargement magnification is set at 2, for example, control signals S(4.0), S(2.0) and S(1.0) received from the enlargement/reduction control circuit 20 and the outputs of the write address counter 13 are inputted and decode outputs are decided to simultaneously select two addresses with these signals being regarded as a set of address data. When the control signals S(4.0), S(2.0) and S(1.O) are at low, high and low levels and the input terminals $A_0$, $A_1$ and $A_2$ are at low levels, decoder outputs W0 and W1 simultaneously go high.

Figure 11:
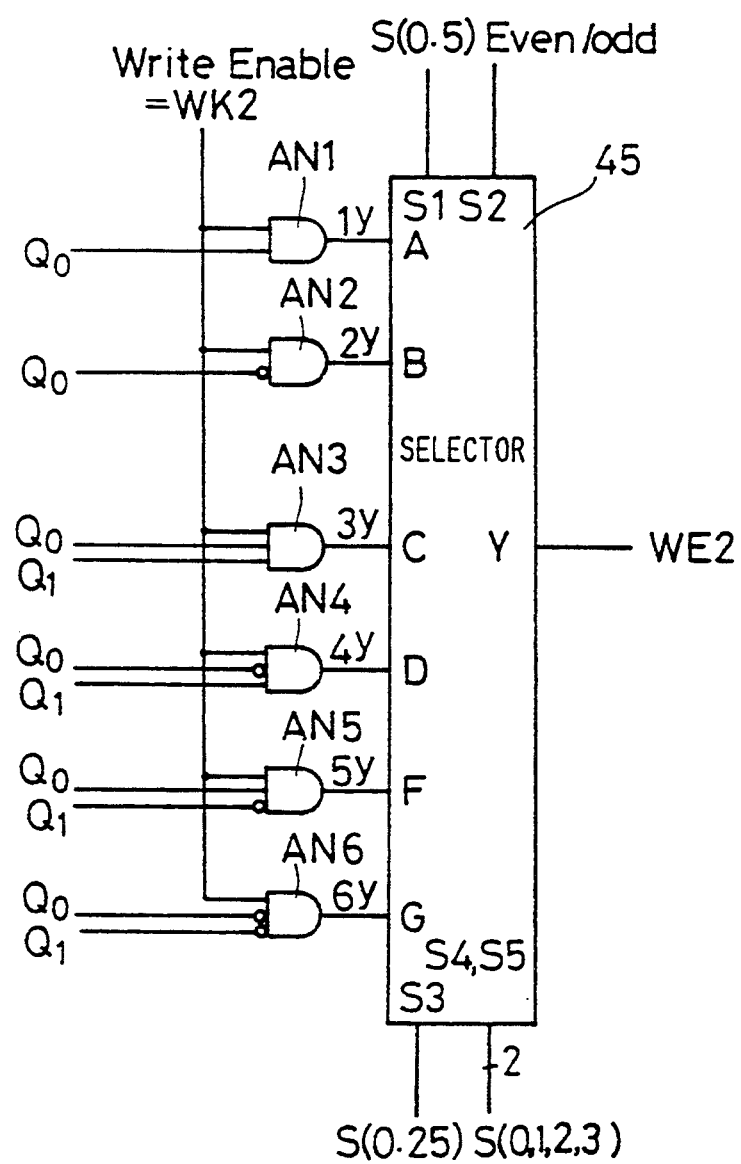
FIG. 11 is a block diagram showing the structure of a write data driver of the first-in first-out memory device shown in FIG. 10.

Further, the reduction control write data driver 15a of the FIFO memory device 38 shown in FIG. 10 can specify those of the write data WD written in reduction by control signals S(0.5), S(0.25), Even/odd and S(0, 1, 2, 3) from the enlargement/reduction control circuit 20, as shown in FIG. 11. Referring to FIG. 11, symbols AN1 to AN6 denote AND gates which take logical products of the signals outputted from the output terminals $Q_0$ and $Q_1$ of the write clock counter 13 and write clocks WK2, which are enable signals WE, and numeral 45 denotes a selector which selectively outputs the outputs of the AND gates AN1 to AN6 in response to the control signals S(0.5), S(0.25), Even/odd and S(0, 1, 2, 3).

TABLE 8

| S1 = S (0.5) | S2 = Even/Odd | S3 = S (0.25) | S4 S (0,1,2,3) | S5 | Y | Remarks |
|---|---|---|---|---|---|---|
| H | L | L | | | 1y | × 0.5 Times Even |
| H | H | L | — | — | 2y | × 0.5 Times Odd |
| L | — | H | L | L | 3y | × 0.25 Times 0th |
| L | — | H | L | H | 4y | × 0.25 Times 1st |
| L | — | H | H | L | 5y | × 0.25 Times 2nd |
| L | — | H | H | H | 6y | × 0.25 Times 3rd |

When the reduction magnification is set at 0.5, even or odd one of the write data WD can be selectively written in a memory cell matrix 12 by the control signal S(0.5), as shown in Table 8. When the reduction magnification is set at 0.25, on the other hand, (4n+0)-th, (4n+1)-th, (4n+2)-th or (4n+3)-th one of the write data WD can be selected to be written in the memory cell matrix 12. When the reduction magnification is set at 0.5 and the control signals S(0.5) and S2 are at high levels, for example, an output 2y of the AND gate AN2 is selected so that a writing operation is performed by a write enable signal WE2 which is formed by the logical product of the write clock WK2, i.e., the write enable signal WE1 and the output $Q_0$ of the clock counter and odd one of the write data WD is held in the memory cell matrix 12.

Figure 17:
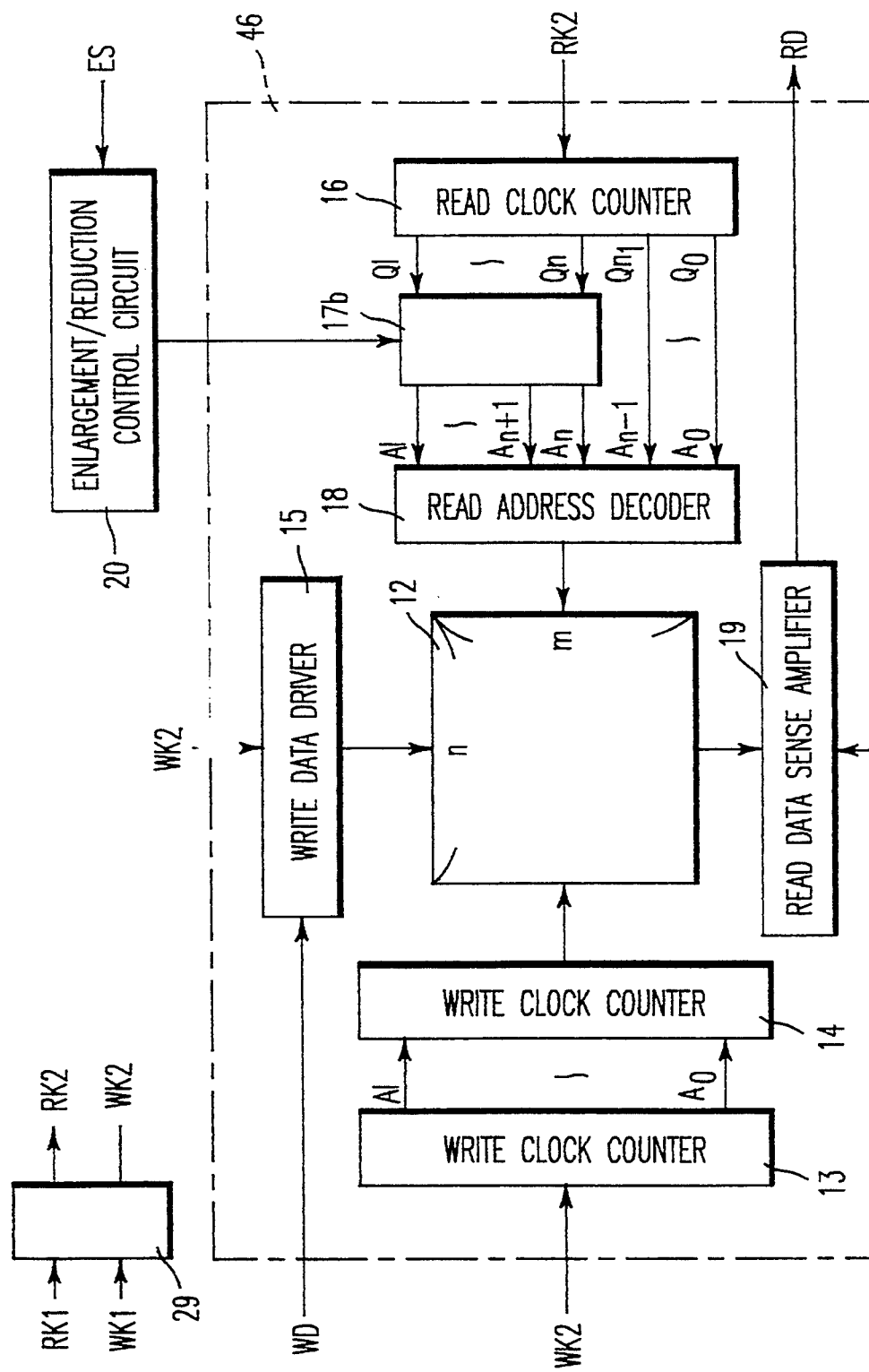
FIG. 17 is a block diagram showing the structure of a first-in first-out memory device according to a seventh embodiment of the present invention.
Figures 20A, 20B:
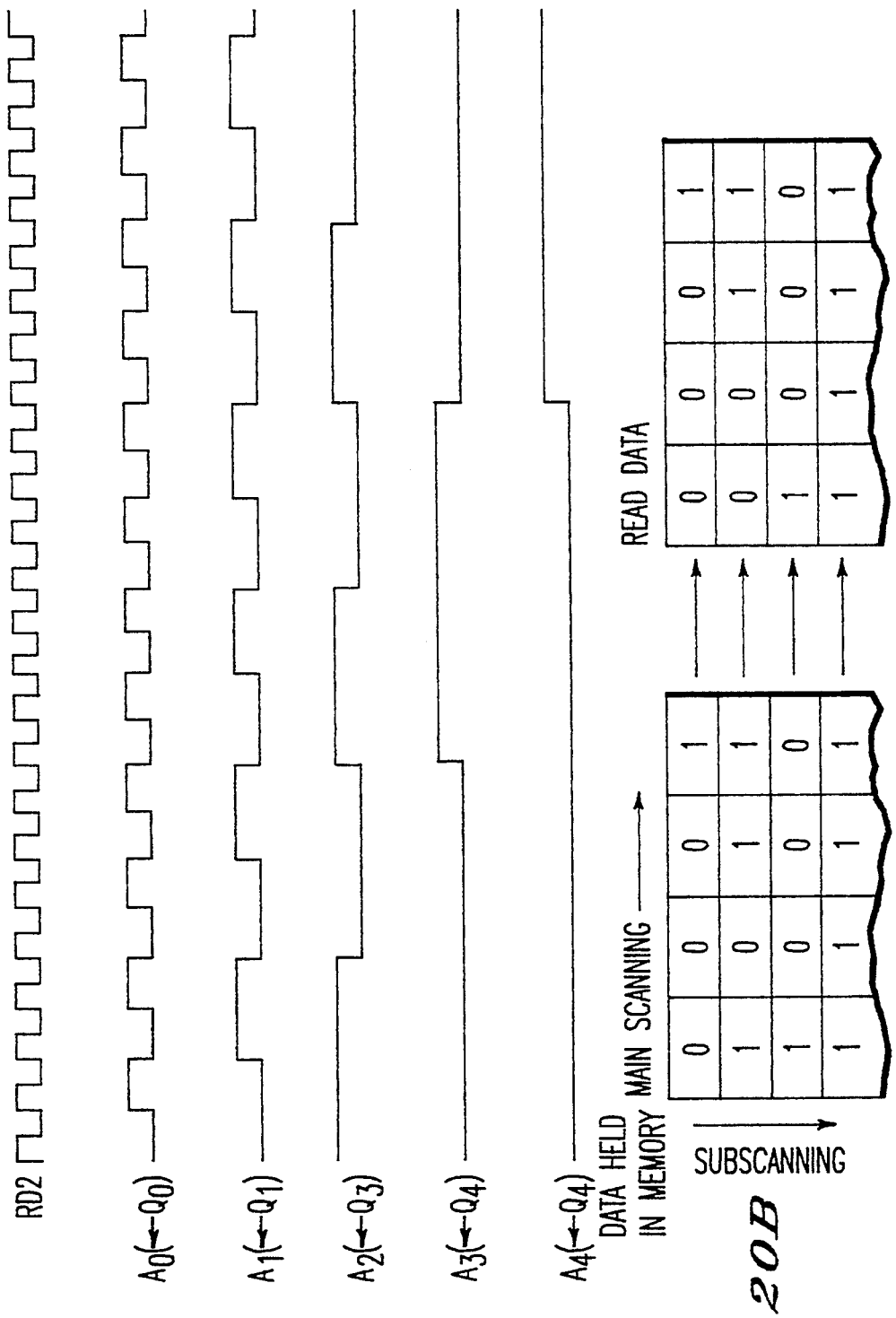
FIGS. 20(a) and 20(b) are waveform diagrams for illustrating an operation of the first-in first-out memory device according to the seventh embodiment of the present invention.

A seventh embodiment of the present invention is now described with reference to FIG. 17. FIG. 17 illustrates the structure of an FIFO memory device 46 holding image data etc. obtained by two scanning operations of main scanning and subscanning in a memory cell matrix 12. Referring to FIG. 17, numeral 17b denotes a read clock counter output shift circuit, being connected to output terminals $Q_n$ to $Q_1$ of a read clock counter 16, which is controlled by an enlargement/reduction control circuit 20 to shift signals received from the output terminals $Q_n$ to $Q_1$ and output the same to input terminals $A_n$ to $A_1$ of a read address decoder 18, while reference numerals identical to those in FIG. 3 denote the same or corresponding parts. Input terminals $A_0$ to $A_{n-1}$ of the read address decoder 18 specify order of addresses in the main scanning direction, While the input terminals $A_n$ to $A_l$ specify that of addresses in the subscanning direction. Main scanning and subscanning of data are in coincidence with those of writing and reading in and from the memory cell matrix 12 when the memory cell matrix 12 has a structure of $2^n$ by $2^{(l-n)}$, while the former are not in coincidence with the latter in other case. In order to simplify the illustration, it is assumed here that n=2 and l=5. When no data enlargement/reduction is performed, the output terminals $Q_0$ to $Q_4$ of the read clock counter 16 are connected to the input terminals $A_0$ to $A_4$ of the read address decoder 18 respectively, as shown at (a) in FIG. 20. Assuming that the memory cell matrix 12 holds 4-bit main scanning data "0001", "1011", "1000" and "1111" successively along the subscanning direction at this time, a read data sense amplifier 19 similarly outputs read data RD of "0001", "1011", "1000" and "1111, as shown at (b) in FIG. 20.

TABLE 9

| Enlargement Magnification | Read Address Decoder Input Terminal | | | | |
|---|---|---|---|---|---|
| | $A_4$ | $A_3$ | $A_2$ | $A_1$ | $A_0$ |
| × 1 | $Q_4$ | $Q_3$ | $Q_2$ | $Q_1$ | $Q_0$ |
| × 2 | $Q_5$ | $Q_4$ | $Q_3$ | $Q_1$ | $Q_0$ |
| × 4 | $Q_6$ | $Q_5$ | $Q_4$ | $Q_1$ | $Q_0$ |

Figure 21A:
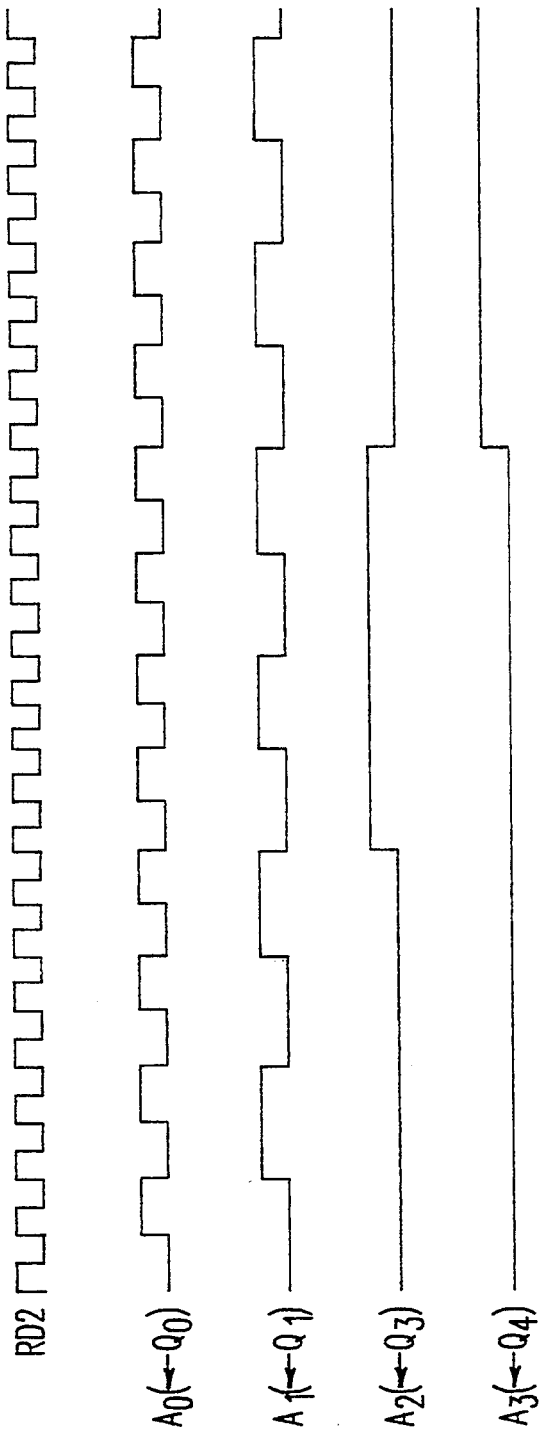
FIGS. 21(a) and 21(b) are waveform diagrams showing another operation of the first-in first-out memory device according to the seventh embodiment of the present invention.
Figure 21B:
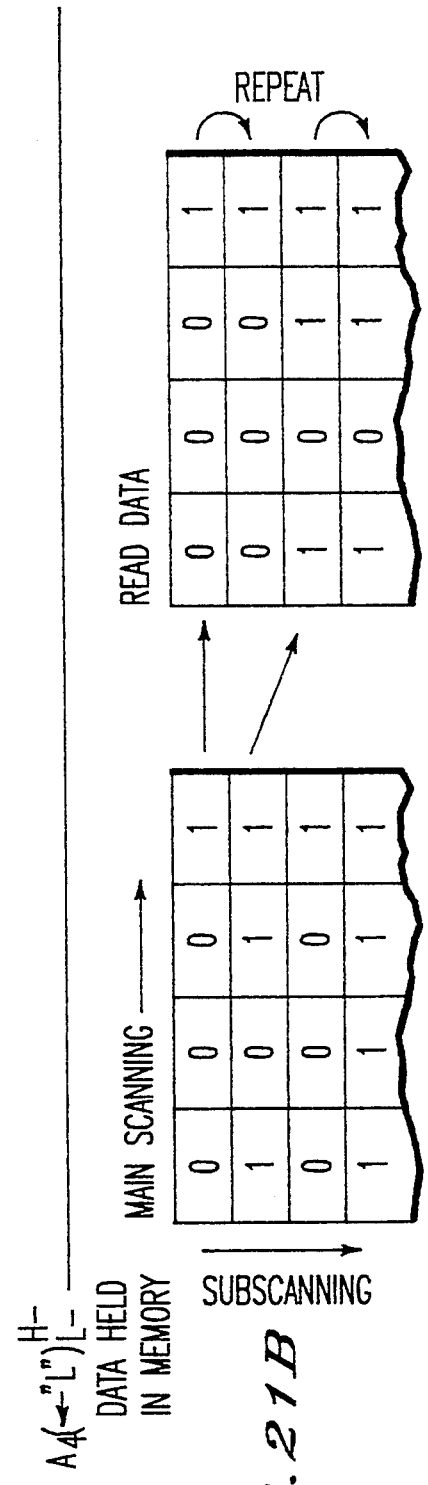

In order to enlarge the read data RD in the subscanning direction, the output terminals $Q_2$ to $Q_4$ of the read clock counter 16 are shifted to low order digits to be connected to the input terminals $A_2$ to $A_4$ of the read address decoder 18, as shown in Table 9. In the case of enlargement magnification of 2, for example, the output terminals $Q_3$, $Q_4$ and $Q_5$ of the read clock counter 16 are connected with the input terminals $A_2$, $A_3$ and $A_4$ of the read address decoder 18 respectively. Therefore, a set of data of next main scanning are read out every time data of main scanning, such as those in addresses zero to 3, for example, are repeatedly read twice, as understood from a timing chart shown at (a) in FIG. 21. Therefore, the read address decoder 18 specifics addresses "0, 1, 2, 3, 0, 1, 2, 3, 4, 5, . . . " in synchronization with read clocks RK2, so that the read data RD outputted from the read data sense amplifier 19 are enlarged to twice in the subscanning direction as "0001", "0001", "1011", "1011" as shown at (b) in FIG. 21.

Similarly, it is possible to implement enlargement magnification of $2^x$ by downwardly shifting the signals outputted from the output terminals $Q_2$ to $Q_4$ of the read clock counter 16 by x digits by the read counter output shift circuit 17b.

TABLE 10

| Reduction Magnification (Target Line) | Read Address Decoder Input Terminal | | | | |
|---|---|---|---|---|---|
| | $A_4$ | $A_3$ | $A_2$ | $A_1$ | $A_0$ |
| × 1 | $Q_4$ | $Q_3$ | $Q_2$ | $Q_1$ | $Q_0$ |
| × 0.5 (0,2,4 . . . ) | $Q_3$ | $Q_2$ | L | $Q_1$ | $Q_0$ |
| × 0.5 (1,3,5 . . . ) | $Q_3$ | $Q_2$ | H | $Q_1$ | $Q_0$ |
| × 0.25 (0,4,8 . . . ) | $Q_2$ | L | L | $Q_1$ | $Q_0$ |
| × 0.25 (1,5,9 . . . ) | $Q_2$ | L | H | $Q_1$ | $Q_0$ |
| × 0.25 (2,6,10 . . . ) | $Q_2$ | H | L | $Q_1$ | $Q_0$ |

TABLE 10-continued

| Reduction Magnification (Target Line) | Read Address Decoder Input Terminal | | | | |
|---|---|---|---|---|---|
| | $A_4$ | $A_3$ | $A_2$ | $A_1$ | $A_0$ |
| × 0.25 (3,7,11 . . . ) | $Q_2$ | H | H | $Q_1$ | $Q_0$ |

In order to reduce the read data RD in the subscanning direction, the output terminals $Q_2$ to $Q_4$ of the read clock counter 16 are shifted to high order digits to be connected to the input terminals $A_2$ to $A_4$ of the read address decoder 18, as shown in Table 10. In the case of reduction magnification of 0.5, for example, the output terminals $Q_2$ and $Q_3$ of the read clock counter 16 are connected with the input terminals $A_3$ and $A_4$ of the read address decoder 18 respectively. Further, the input terminal $A_2$ of the read address decoder 18 receives a low or high level in accordance with a control signal which is received from the enlargement/reduction control circuit 20. The read clock counter output shift circuit 17b can be structured similarly to that shown in FIG. 4. This can be implemented by changing input terminals of the read address decoder 18 which receive the signals outputted from the read clock counter 16 by the read clock counter output shift circuit 17b. Due to such connection, every other main scanning set of data are read every main scanning reading, as understood from a timing chart shown at (a) in FIG. 22. For example, the input terminal $A_2$ of the read address decoder 18 is fixed at a low level in order to reduce even lines. Thus, the read address decoder 18 specifies addresses "0, 1, 2, 3, 8, 9, 10, 11, . . . " in synchronization with the read clocks RK2, so that the read data RD outputted from the read data sense amplifier 19 are halved in the subscanning direction as "0001", "1000" as shown at (b) in FIG. 22.

Figure 18:
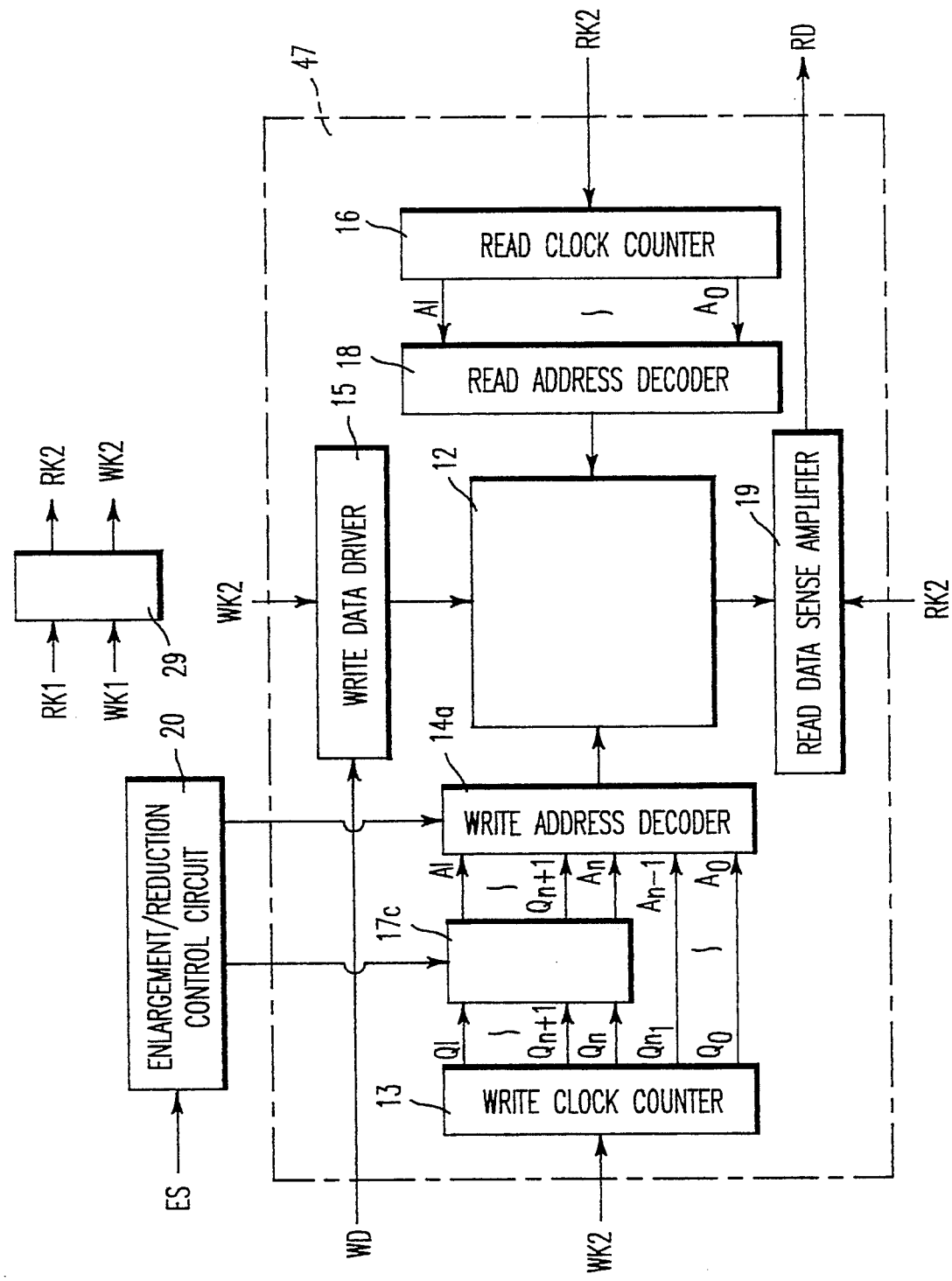
FIG. 18 is a block diagram showing the structure of a first-in first-out memory device according to an eighth embodiment of the present invention.

An eighth embodiment of the present invention is now described with reference to FIG. 18. FIG. 18 illustrates the structure of an FIFO memory device 47 for receiving image data etc. obtained by two scanning operations of main scanning and subscanning as write data WD. Referring to FIG. 18, numeral 17c denotes a write clock counter output shift circuit, receiving signals from output terminals $Q_n$ to $Q_l$ of a write clock counter 13, which is controlled by an enlargement/reduction control circuit 20 to shift the received signals and output the same to input terminals $A_n$ to $A_1$ of a write address decoder 14a, while numerals identical to those in FIG. 10 denote the same or corresponding parts. The input terminals $A_0$ to $A_{n-1}$ of the write address decoder 14a specifics order of data in the main scanning direction, while the input terminals $A_n$ to $A_1$ specifies that in the subscanning direction. In order to simplify the illustration, it is assumed here that n=2 and l=4. When no data enlargement/reduction is performed, the output terminals $Q_0$ to $Q_4$ are connected respectively as shown at (a) in FIG. 23. At this time, 4-bit main scanning data "0001", "1011", "1000" and "1111" are successively written as write data WD along the subscanning direction as shown at (b) in FIG. 23, whereby a memory cell matrix 12 holds the data "0001", "1011", "1000" and "1111" in order from an address zero.

TABLE 11

| Enlargement Magnification | Write Address Decoder Input Terminal | | | | |
|---|---|---|---|---|---|
| | $A_4$ | $A_3$ | $A_2$ | $A_1$ | $A_0$ |
| × 1 | $Q_4$ | $Q_3$ | $Q_2$ | $Q_1$ | $Q_0$ |
| × 2 | $Q_3$ | $Q_2$ | x | $Q_1$ | $Q_0$ |
| × 4 | $Q_2$ | x | x | $Q_1$ | $Q_0$ | x: Don't Care (Simultaneously write in all considerable combinations)

Figure 24A:
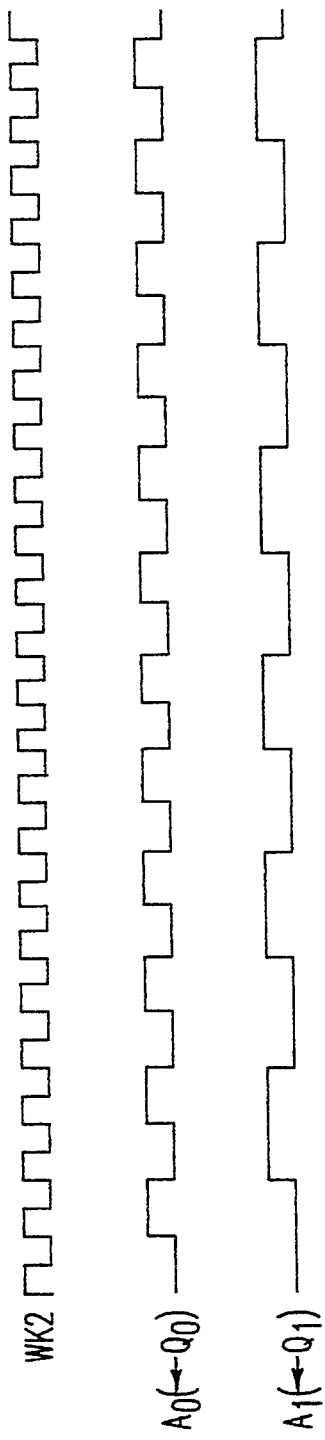
FIGS. 24(a) and 24(b) are waveform diagrams showing another operation of the first-in first-out memory device according to the eighth embodiment of the present invention.
Figure 24B:
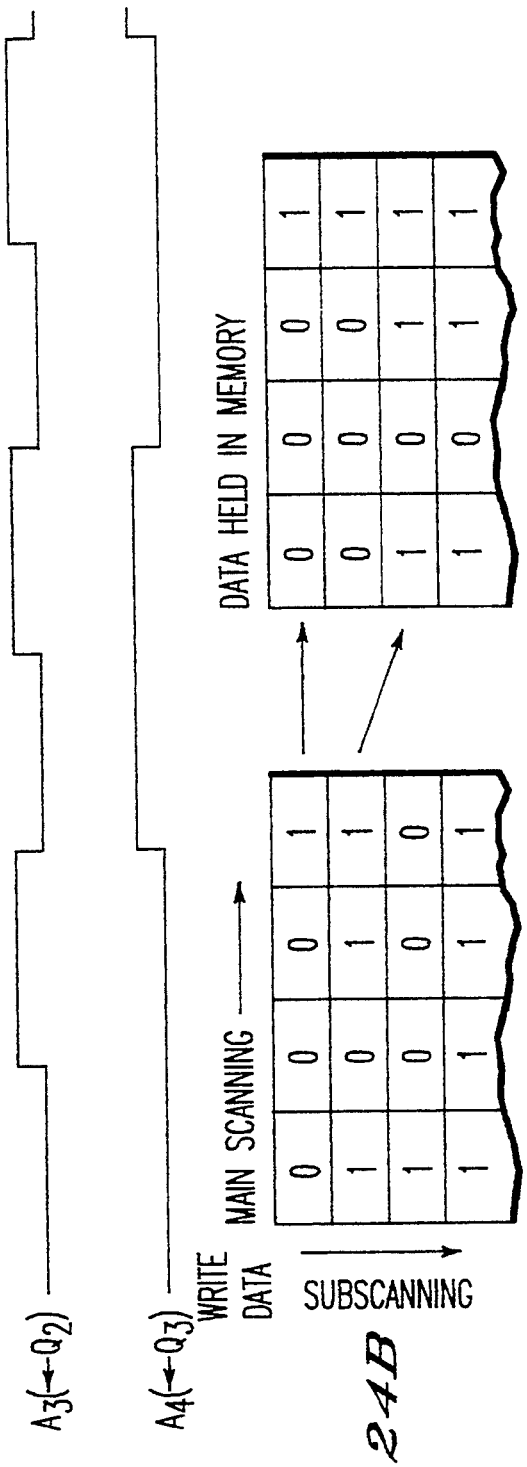

In order to enlarge the write data WD and write the same in the memory cell matrix 12, the output terminals $Q_2$ to $Q_4$ of the write clock counter 13 are shifted to high order digits to be connected to the input terminals $A_2$ to $A_4$ of the write address decoder 14a, as shown in Table 11. In the case of enlargement magnification of 2, for example, the output terminals $Q_3$ and $Q_2$ of the write clock counter 13 are connected with the input terminals $A_4$ and $A_3$ of the write address decoder 14a respectively. Whatever signal is received in the input terminal $A_2$ of the write address decoder 14a, values that can be taken by the write address decoder 14a by the input signal in the input terminal $A_2$ are simultaneously selected so that the same write data WD are written in two addresses. Addresses zero and 4, addresses 1 and 5, ... are simultaneously specified here as shown at (a) in FIG. 24, so that a write data driver 15 writes write data WD in the memory cell matrix 12 in synchronization with write clocks WK2. Therefore, the data held in the memory cell $A_0$, matrix 12 are doubled in the subscanning direction as "0001", "0001", "1011", "1011", ..., as shown at (b) in FIG. 24.

When signals outputted from the output terminals $Q_2$ to $Q_4$ are downwardly shifted by x digits by the write clock counter output shift circuit 17c, it is possible to implement enlargement magnification of $2^x$.

TABLE 12

| Reduction Magnification | Write Address Decoder Input Terminal | | | | |
|---|---|---|---|---|---|
| | $A_4$ | $A_3$ | $A_2$ | $A_1$ | $A_0$ |
| × 1 | $Q_4$ | $Q_3$ | $Q_2$ | $Q_1$ | $Q_0$ |
| × 0.5 (Odd Line) | $Q_5$ | $Q_4$ | $Q_3$ | $Q_1$ | $Q_0$ |
| × 0.25 (3,7 ... Line) | $Q_6$ | $Q_5$ | $Q_4$ | $Q_1$ | $Q_0$ |

Figure 25A:
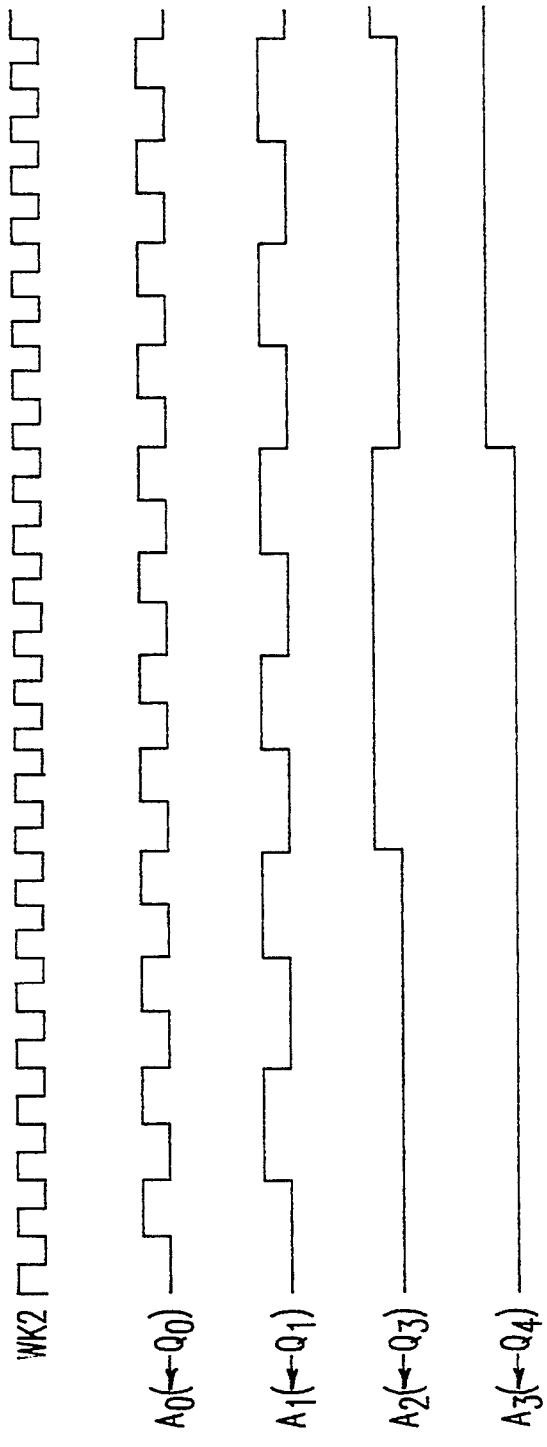
FIGS. 25(a) and 25(b) are waveform diagrams showing still another operation of the first-in first-out memory device according to the eighth embodiment of the present invention.
Figure 25B:
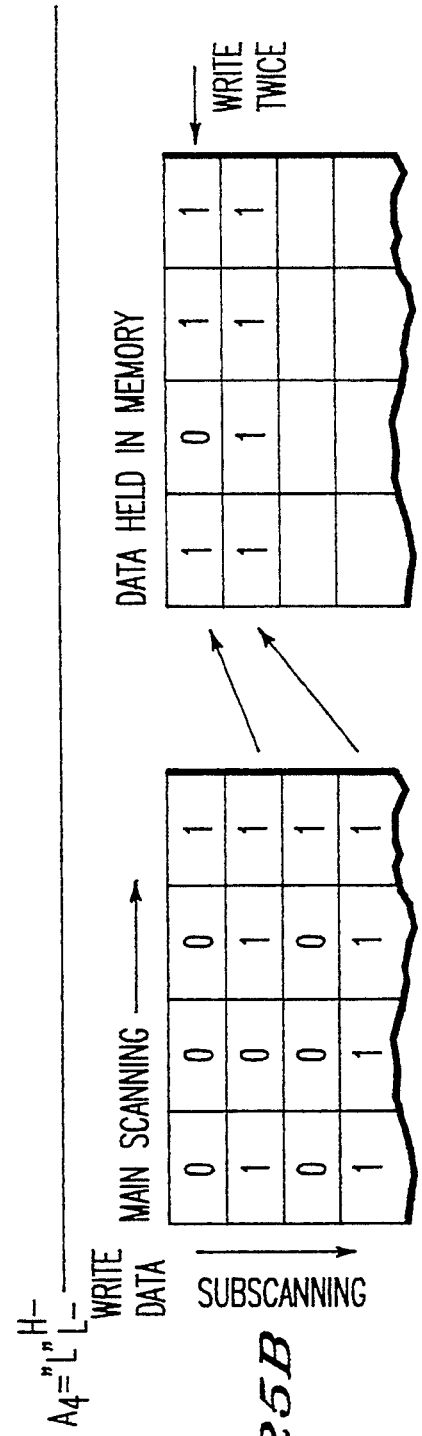

In order to reduce the write data WD and write the same in the memory cell matrix 12, the output terminals $Q_3$ to $Q_5$ of the write clock counter 13 are shifted to low order digits as shown in Table 12, to be connected to the input terminals $A_2$ to $A_4$ of the write address decoder 14a. In the case of enlargement magnification of 0.5, for example, the output terminals $Q_3$, $Q_4$ and $Q_5$ of the write clock counter 13 are connected to the input terminals $A_2$, $A_3$ and $A_4$ of the write address decoder 14a respectively. In this case, main scanning writing is repeated twice to write 2-bit write data WD received in a single address, whereby the write data WD written later are to be reduced on odd lines. Therefore, the data held in the memory cell matrix 12 are halved in the subscanning direction as "1011", "1111", ..., as shown at (b) in FIG. 25.

Similarly, it is possible to implement data reduction in reduction magnification of $\frac{1}{2^y}$ by downwardly shifting the signals outputted from the output terminals $Q_n$ to $Q_1$ of the write clock counter 13 by y digits by the write clock counter output shift circuit 17c.

Figure 19:
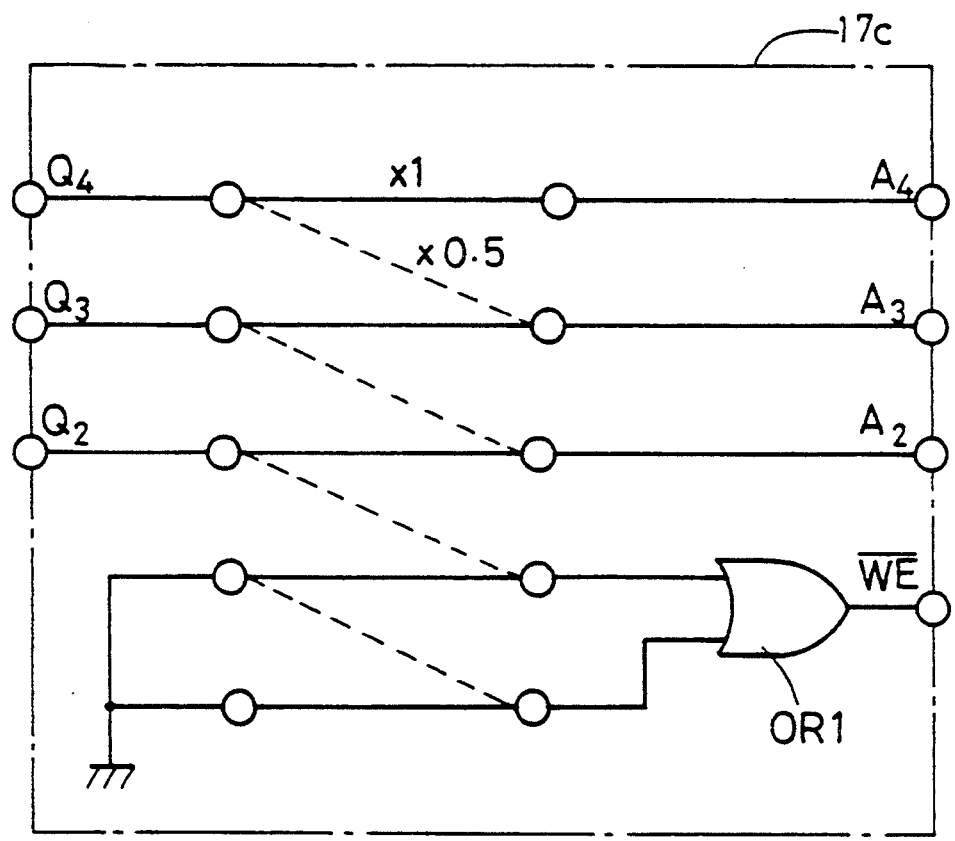
FIG. 19 is a conceptual diagram showing the structure of a clock counter output shift circuit of the first-in first-out memory device shown in FIG. 18.
Figures 26A, 26B:
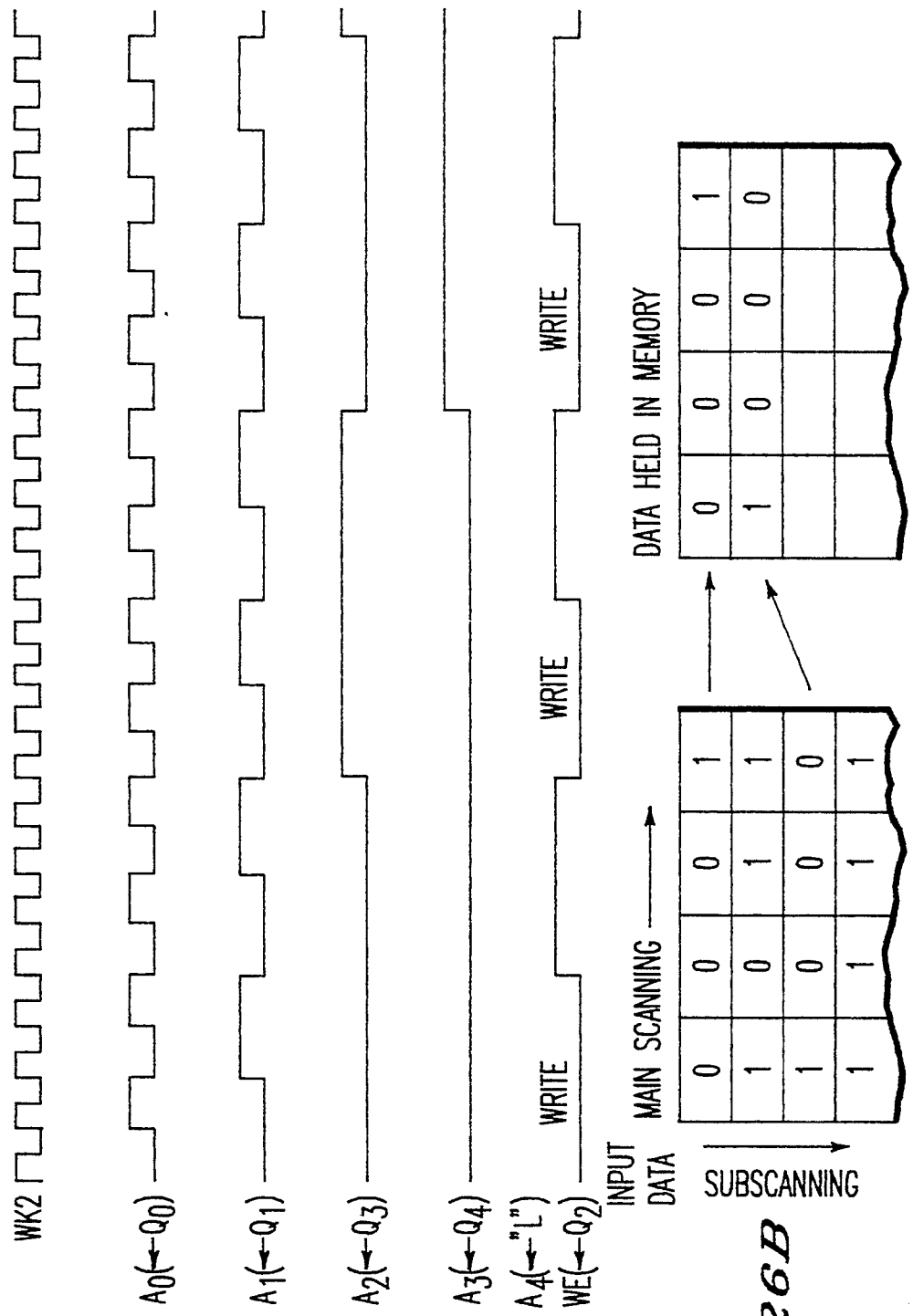
FIGS. 26(a) and 26(b) are waveform diagrams showing a further operation of the first-in first-out memory device according to the eighth embodiment of the present invention.

Since a plurality of bits of the write data WD inputted in the same addresses are written according to the eighth embodiment, the write data WD written later are reduced while precedently written data cannot be reduced. Therefore, an output signal from the output terminal $Q_2$ of the write clock counter 13, which is not inputted in the write address decoder 14a, is employed as a write enable signal WE, as shown in FIG. 19. Thus, it is possible to reduce even lines of main scanning in the subscanning direction, as shown in FIG. 26.

TABLE 13

| Data Writing Condition | Reduction Magnification (Target Line) | Write Address Decoder Input Terminal | | | | |
|---|---|---|---|---|---|---|
| | | $A_4$ | $A_3$ | $A_2$ | $A_1$ | $A_0$ |
| — | × 1 | $Q_4$ | $Q_3$ | $Q_2$ | $Q_1$ | $Q_0$ |
| $Q_2$ | × 0.5 (0,2,4 ... ) | $Q_5$ | $Q_4$ | $Q_3$ | $Q_1$ | $Q_0$ |
| $Q_2$ | × 0.5 (1,3,5 ... ) | $Q_5$ | $Q_4$ | $Q_3$ | $Q_1$ | $Q_0$ |
| $Q_2 \cdot Q_3$ | × 0.25 (0,4,8 ... ) | $Q_6$ | $Q_5$ | $Q_4$ | $Q_1$ | $Q_0$ |
| $Q_2 \cdot Q_3$ | × 0.25 (1,5,9 ... ) | $Q_6$ | $Q_5$ | $Q_4$ | $Q_1$ | $Q_0$ |
| $Q_2 \cdot Q_3$ | × 0.25 (2,6,10 ... ) | $Q_6$ | $Q_5$ | $Q_4$ | $Q_1$ | $Q_0$ |
| $Q_2 \cdot Q_3$ | × 0.25 (3,7,11 ... ) | $Q_6$ | $Q_5$ | $Q_4$ | $Q_1$ | $Q_0$ |

Figure 27B:
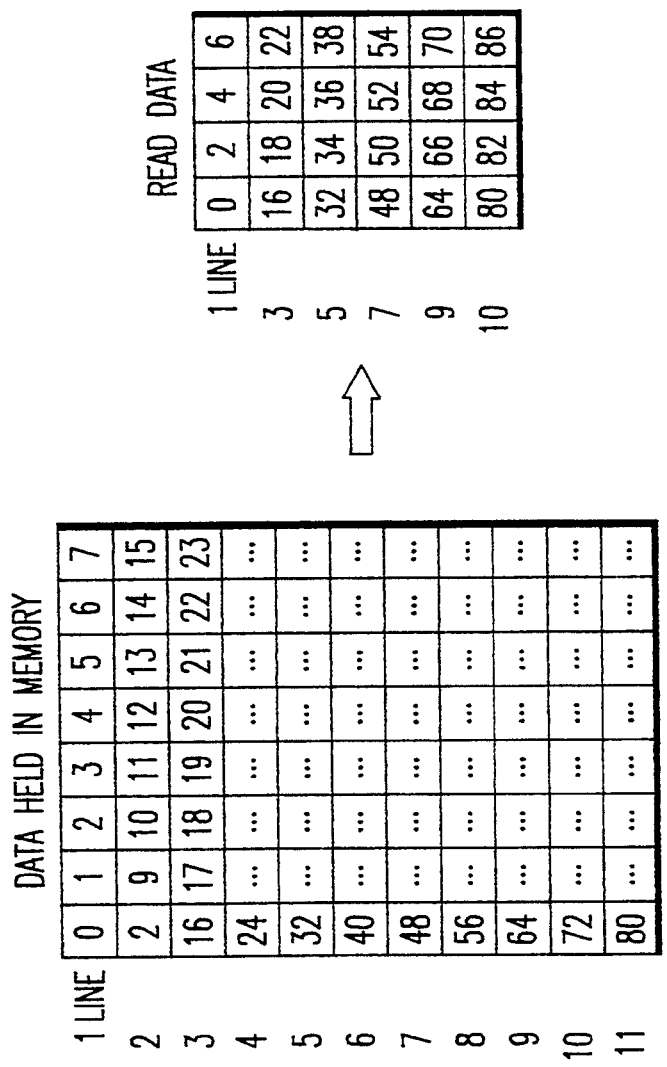
Figure 31:
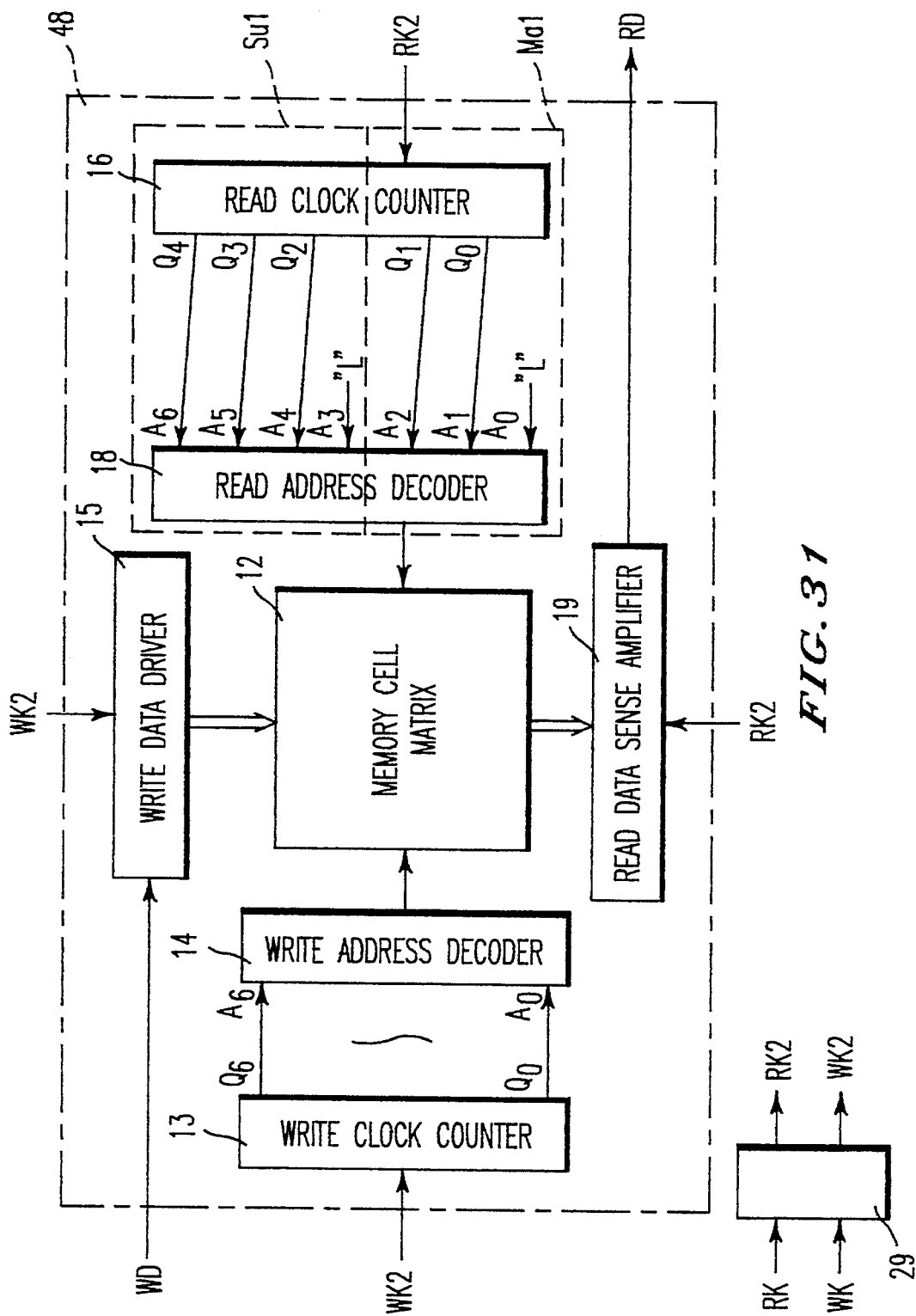
FIG. 31 is a block diagram showing the structure of the first-in first-out memory device according to the ninth embodiment of the present invention.

A ninth embodiment of the present invention is now described with reference to FIG. 31. FIG. 31 illustrates the structure of an FIFO memory device 48 which holds image data etc. obtained by main scanning and subscanning in a memory cell matrix 12. Referring to FIG. 31, symbol Ma1 denotes a main scanning reduction functional part which is formed by input terminals of a read address decoder 18 for specifying order in the main scanning direction and output terminals of a read clock counter 16 for supplying address data to the read address decoder 18, and symbol Su1 denotes a subscanning reduction functional part which is formed by input terminals of the read address decoder 18 for specifying order in the subscanning direction and output terminals of the read clock counter 16 for supplying address data to the read address decoder 18, while numerals identical to those in FIG. 1 ¬e the same or corresponding parts. Input terminals $A_0$ to $A_2$ of the read address decoder 18 included in the main scanning direction reduction functional part Ma1 specify the order of addresses in the main scanning direction, while input terminals $A_3$ to $A_6$ included in the subscanning reduction functional part Su1 specify that of addresses in the subscanning direction. This figure shows a structure in the case of reduction with magnification of 0.5 in both of main scanning and subscanning. The memory cell matrix 12 holds data shown at (b) in FIG. 27. In the main scanning reduction functional part Ma1, the output terminals $Q_0$ and $Q_1$ of the read clock counter 16 are bitwisely shifted to high order digits to be connected to the input terminals $A_1$ and $A_2$ of the read address decoder 18, as shown in FIG. 31. The input terminal $A_0$ of the read address decoder 18 is fixed at a low level. Address data shown in a timing chart at (a) in FIG. 27 are inputted and data of even addresses in main scanning of respective lines held in the memory cell matrix 12 are read, so that the data can be read in the main scanning direction in reduction magnification of 0.5.

In the subscanning reduction functional part Su1, on the other hand, the output terminals $Q_2$ to $Q_4$ of the read clock counter 16 are bitwisely shifted to high order digits to be connected to the input terminals $A_4$ to $A_6$ of the read address decoder 18, as shown in FIG. 31. The input terminal $A_3$ of the read address decoder 18 is fixed at a low level. Address data shown in the timing chart at (a) in FIG. 27 are inputted and data of even lines in subscanning of respective lines held in the memory cell matrix 12 are read, so that the data can be read in the subscanning direction in reduction magnification of 0.5.

Figure 28A:
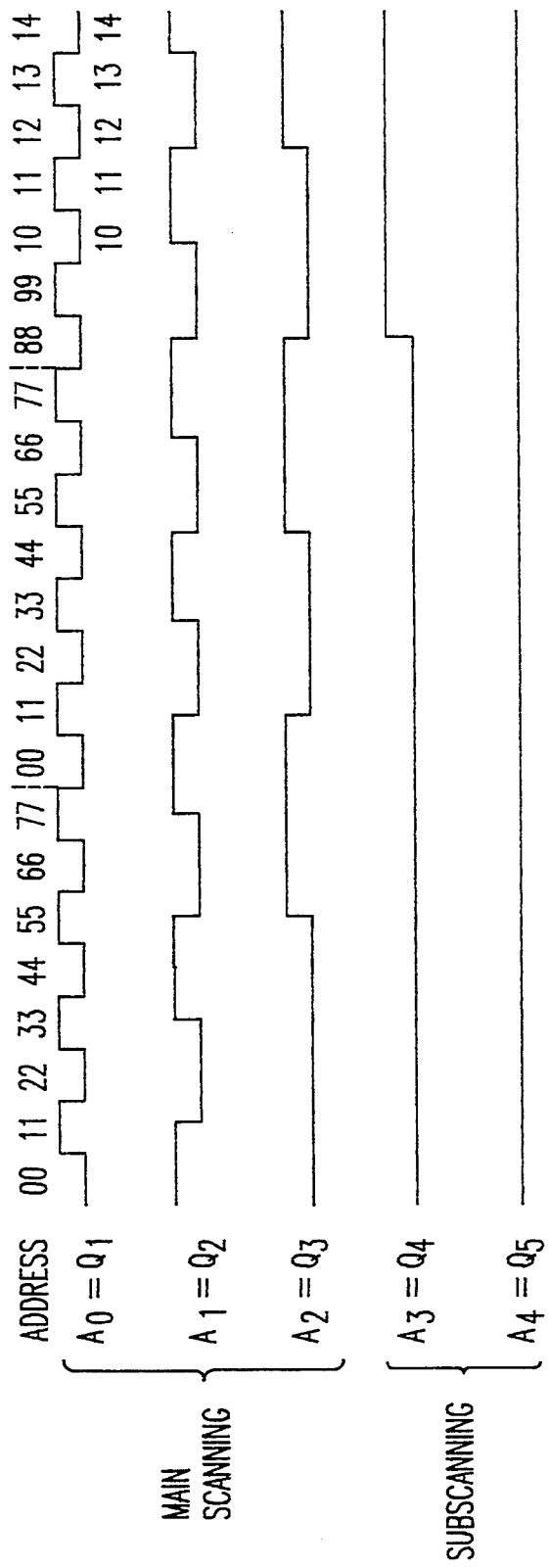
FIGS. 28(a) and 28(b) are a waveform diagrams showing an operation of a first-in first-out memory device according to a tenth or thirteenth embodiment of the present invention.
Figure 28B:
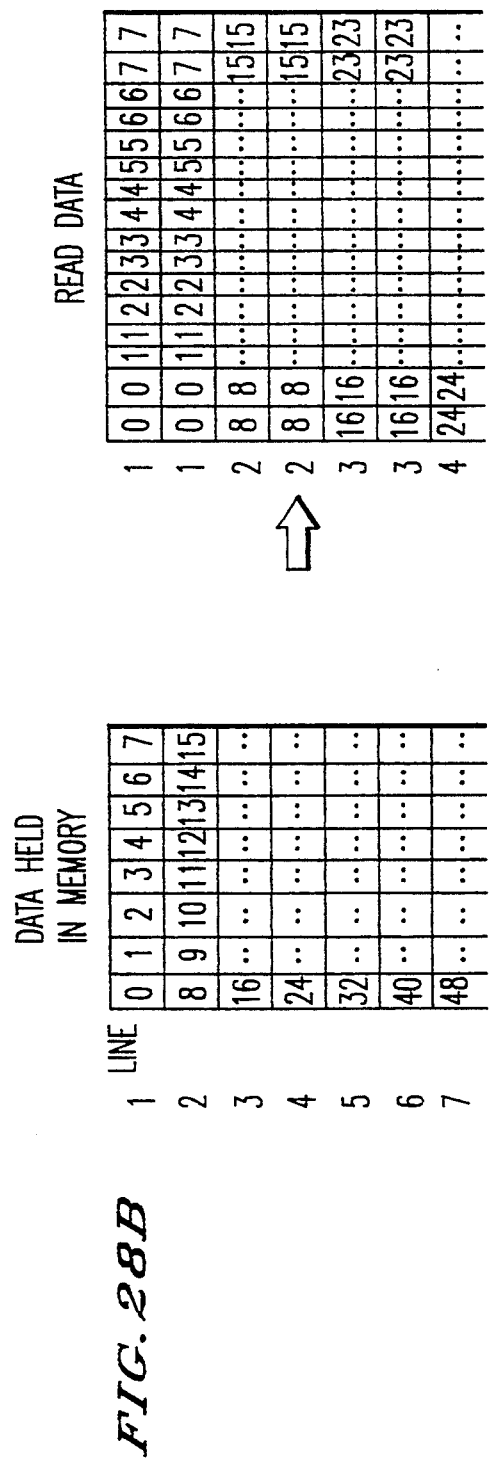
Figure 32:
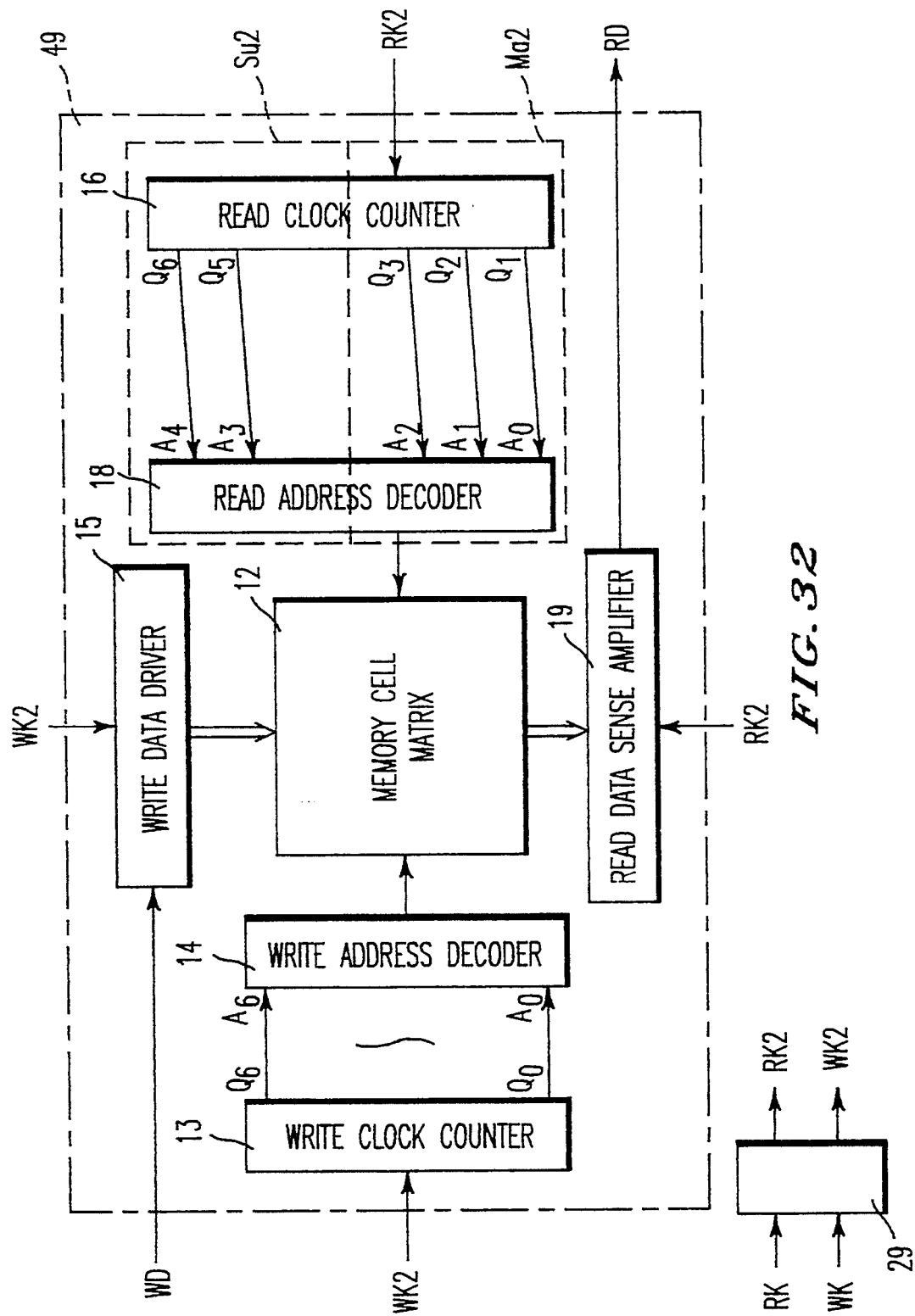
FIG. 32 is a block diagram showing the structure of the first-in first-out memory device according to the tenth embodiment of the present invention.

A tenth embodiment of the present invention is now described with reference to FIG. 32. FIG. 32 illustrates the structure of an FIFO memory device 49 which holds image data etc. obtained by main scanning and subscanning in a memory cell matrix 12. Referring to FIG. 32, symbol Ma2 denotes a main scanning enlargement functional part which is formed by input terminals of a read address decoder 18 for specifying order in the main scanning direction and output terminals of a read clock counter 16 for supplying address data to the read address decoder 18 and symbol Su2 denotes a subscanning enlargement functional part which is formed by input terminals of the read address decoder 18 for specifying order in the subscanning direction and output terminals of the read clock counter 16 for supplying address data to the read address decoder 18, while numerals identical to those in FIG. 1 denote the same or corresponding parts. Input terminals $A_0$ to $A_2$ of the read address decoder 18 included in the main scanning enlargement functional part Ma2 specify order of addresses in the main scanning direction, while input terminals $A_3$ and $A_4$ included in the subscanning enlargement functional part Su2 specify order of addresses in the: subscanning direction. The figure shows a structure for reduction in magnification of 2.0 in both of main scanning and subscanning directions. The memory cell matrix 12 holds data shown at (b) in FIG. 28. In the main scanning enlargement functional part Ma2, the output terminals $Q_1$ to $Q_3$ of the read clock counter 16 are bitwisely shifted to low order digits to be connected to the input terminals $A_0$ to $A_3$ of the read address decoder 18, as shown in FIG. 32. Address data shown in a timing chart at (a) in FIG. 28 are inputted and data of respective addresses in main scanning of respective lines held in the memory matrix 12 are read twice, so that the data can be read in enlargement magnification of 2.0 in the main scanning direction.

In the subscanning enlargement functional part Su2, on the other hand, the output terminals $Q_5$ and $Q_6$ of the read clock counter 16 are bitwisely shifted to low order digits to be connected to the input terminals $A_3$ and $A_4$ of the read address decoder 18, as shown in FIG. 32. Address data shown in the timing chart at (a) in FIG. 28 are inputted and data of respective lines in subscanning of the respective lines held in the memory cell matrix 12 are read twice so that the data can be read in enlargement magnification of 0.5 in the subscanning direction.

Figure 29A:
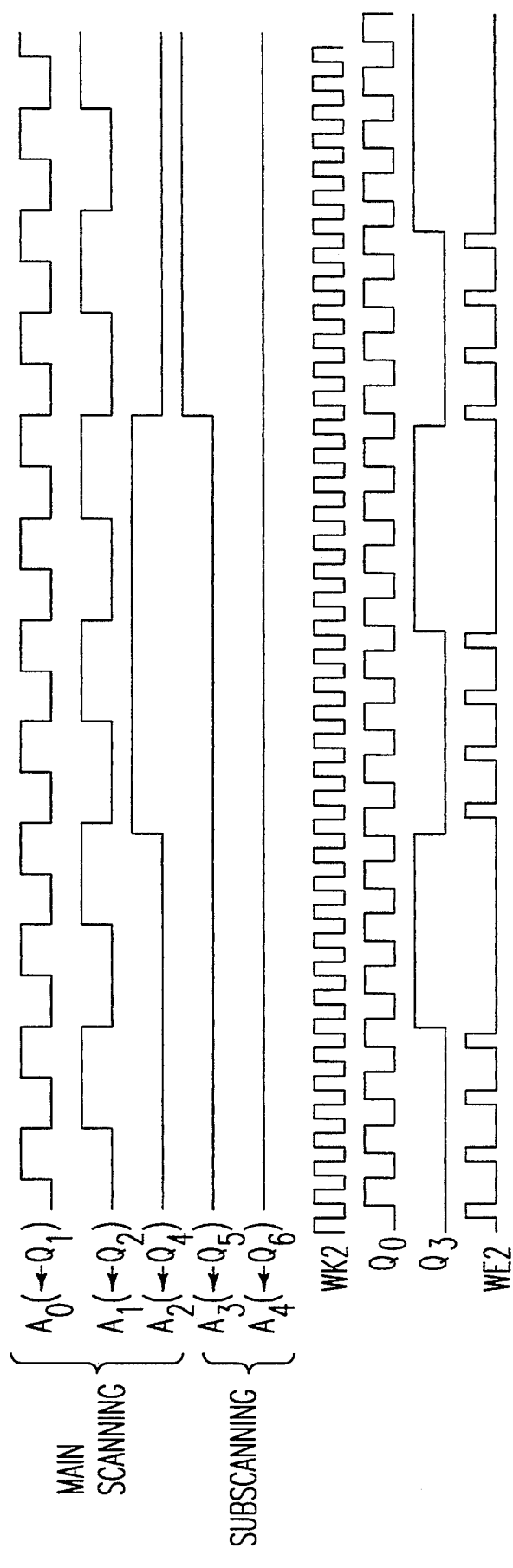
FIGS. 29(a) and 29(b) are waveform diagrams showing an operation of a first-in first-out memory device according to an eleventh or fourteenth embodiment of the present invention.
Figure 29B:
Figure 33:
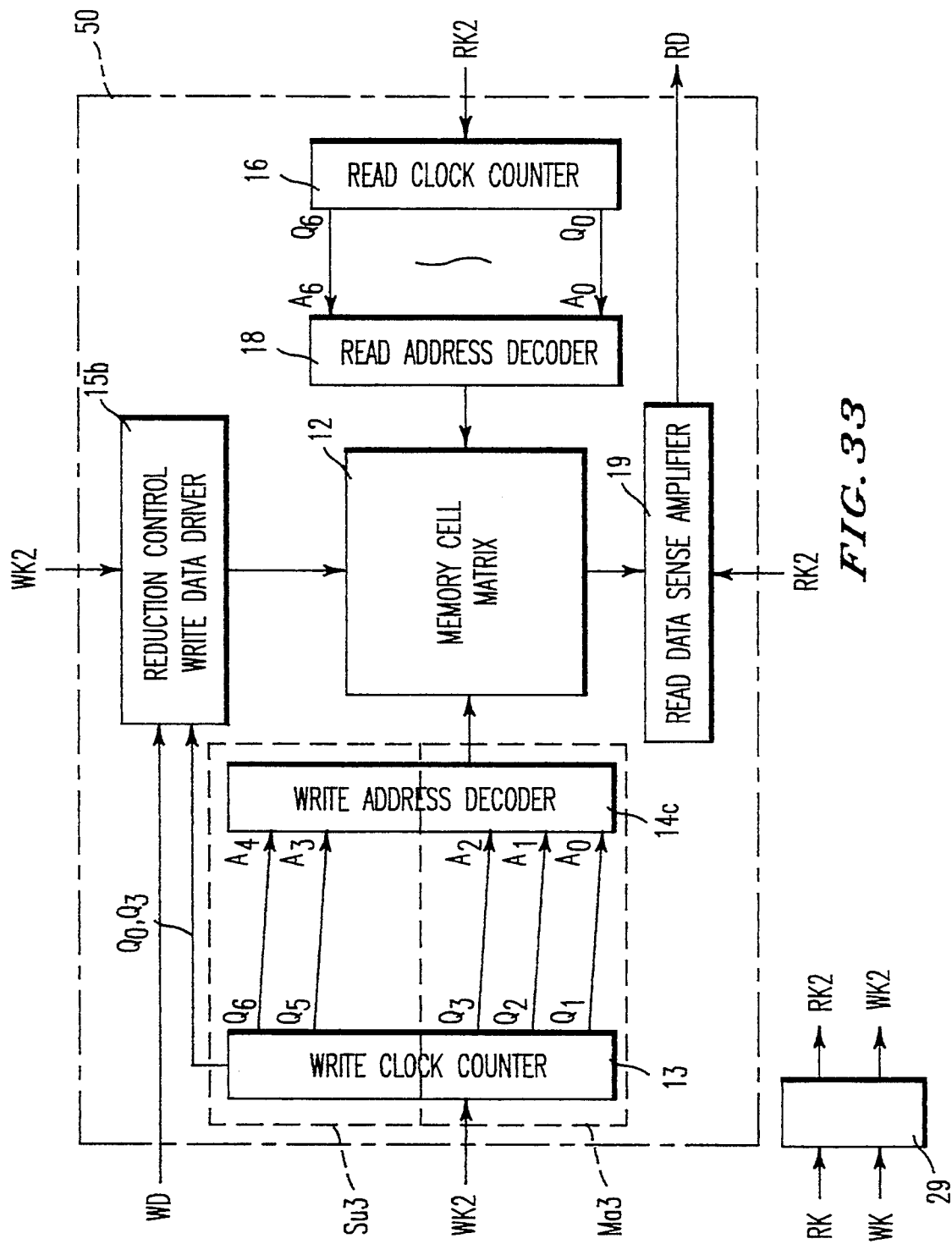
FIG. 33 is a block diagram showing the structure of the first-in first-out memory device according to the eleventh embodiment of the present invention.

An eleventh embodiment of the present invention is now described with reference to FIG. 33. FIG. 33 illustrates a structure of an FIFO memory device 50 which reduces write data received therein for writing the same in a memory cell matrix 12. Referring to FIG. 33, symbol Ma3 denotes a main scanning reduction functional part which is formed by input terminals of a write address decoder 14 for specifying order in the main scanning direction and output terminals of a write clock counter 13 for supplying address data to the write address decoder 14, symbol Su3 denotes a subscanning reduction functional part which is formed by input terminals of the write address decoder 14 for specifying order in the subscanning direction and output terminals of the write clock counter 13 for supplying address data to the write address decoder 14, and numeral 15b denotes a write data driver which can generate a write enable signal WE2 by output signals from output terminals $Q_0$ and $Q_3$ of the write clock counter 13, while numerals identical to those in FIG. 8 denote the same or corresponding parts. Input terminals $A_0$ to $A_2$ of the write address decoder 14 included in the main scanning reduction functional part Ma3 specify order of addresses in the main scanning direction, while input terminals $A_3$ and $A_4$ included in the subscanning reduction functional part Su3 specify order of addresses in the subscanning direction. This figure shows a structure for reducing data in magnification of 0.5 in both of main scanning and subscanning operations. The write data driver 15b receives write data WD shown at (b) in FIG. 29. In the main scanning reduction functional part Ma3, the output terminals $Q_1$ to $Q_4$ of the write clock counter 13 are shifted to low order digits to be connected to the input terminals $A_0$ to $A_2$ of the write address decoder 14, as shown in FIG. 33. Address data shown in a timing chart at (a) in FIG. 29 are inputted and odd data in main scanning of the respective lines received in the write data driver 15b are written in the memory cell matrix 12, so that the data can be written in reduction magnification of 0.5 in the main scanning direction.

In the subscanning reduction functional part Su3, the output terminals $Q_5$ and $Q_6$ of the write clock counter 13 are bitwisely shifted to low order digits to be connected to the input terminals $A_3$ and $A_4$ of the write address decoder 14, as shown in FIG. 33. Address data shown in the timing chart at (a) in FIG. 29 are inputted and data of odd lines in subscanning of the lines received in the write data driver 15b are written in the memory cell matrix 12, so that the data can be written in reduction magnification of 0.5 in the subscanning direction.

Figures 30B, 30C:
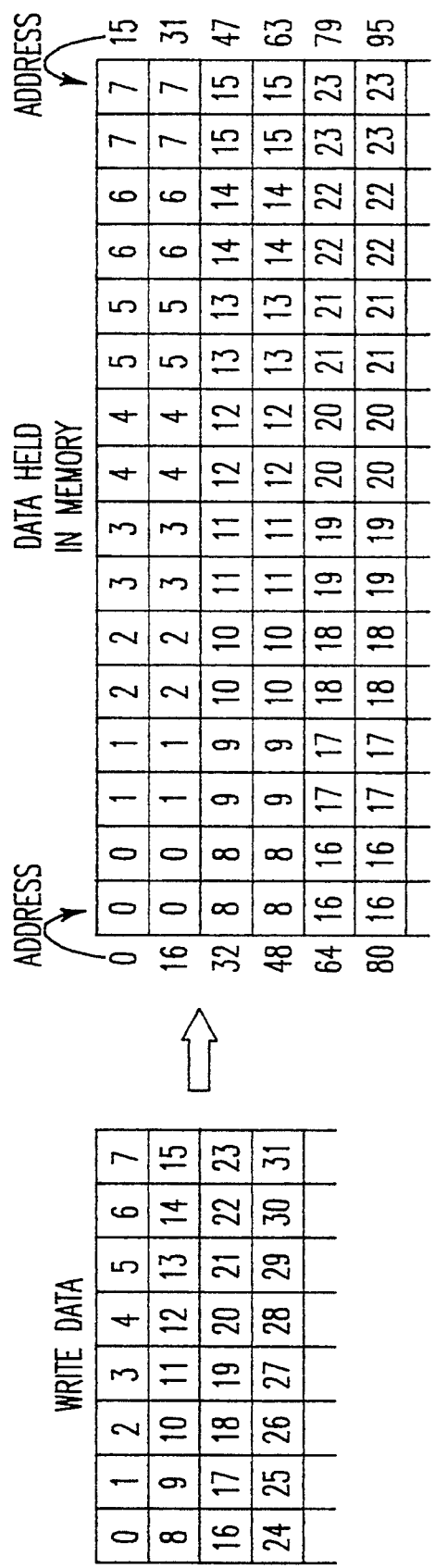
Figure 34:
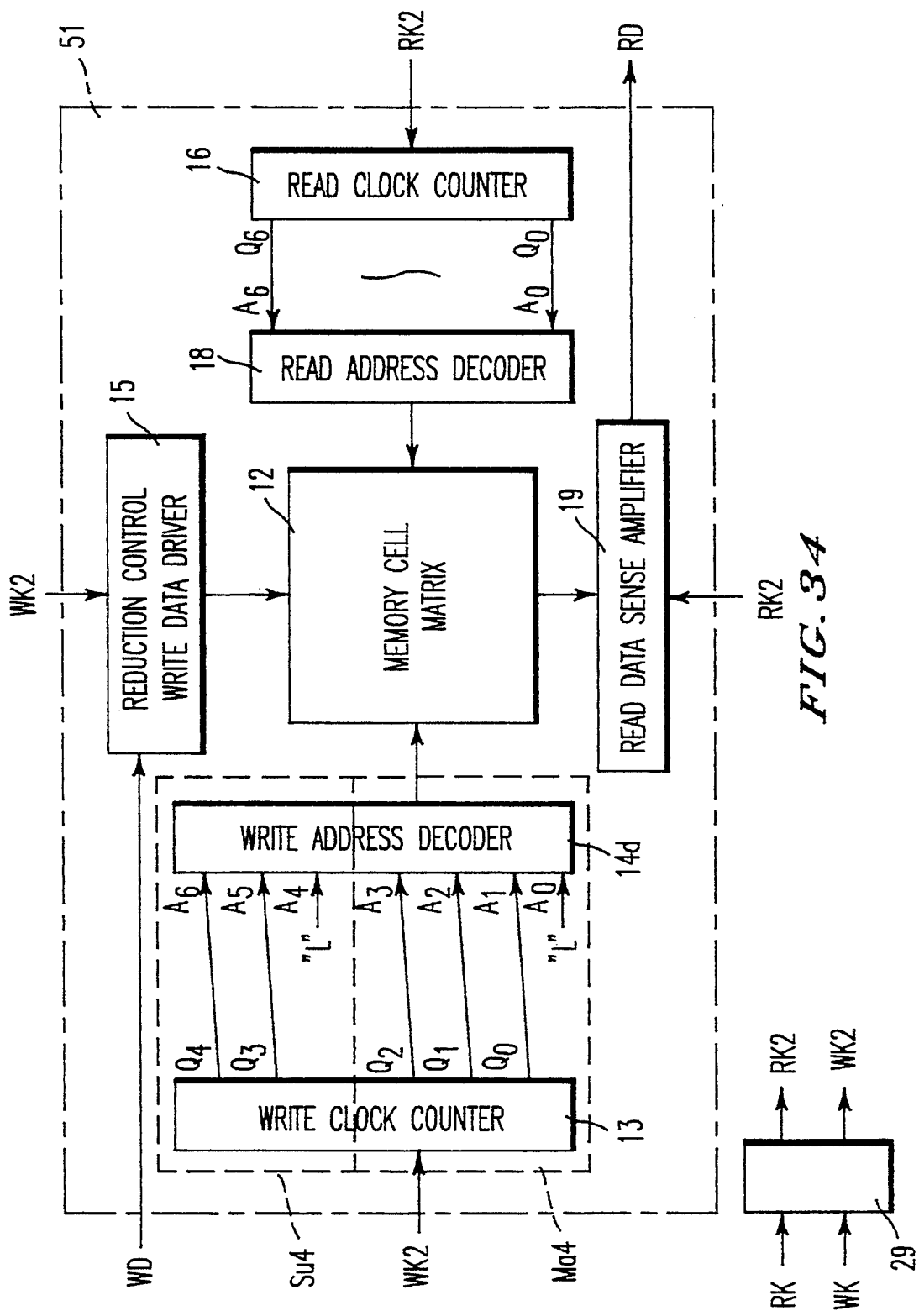
FIG. 34 is a block diagram showing the structure of the first-in first-out memory device according to the twelfth embodiment of the present invention.

A twelfth embodiment of the present invention is now described with reference to FIG. 34. FIG. 34 illustrates a structure of an FIFO memory device 51 which enlarges write data received therein for writing the same in a memory cell matrix 12. Referring to FIG. 34, numeral 14d denotes a write address decoder which is formed to simultaneously select four addresses as shown at (b) in FIG. 30, symbol Ma4 denotes a main scanning enlargement functional part which is formed by input terminals of the write address decoder 14d for specifying order in the main scanning direction and output terminals of a write clock counter 13 for supplying address data to the write address decoder 14d, and symbol Su4 denotes a subscanning enlargement functional part which is formed by input terminals of the write address decoder 14d for specifying order in the subscanning direction and output terminals of the write clock counter 13 for supplying address data to the write address decoder 14d, while numerals identical to those in FIG. 8 denote the same or corresponding parts. Input terminals $A_0$ to $A_3$ of the write address decoder 14d included in the main scanning enlargement functional part Ma4 specify order of addresses in the main scanning direction, while input terminals $A_4$ to $A_6$ included in the subscanning enlargement functional part Su4 specify order of addresses in the subscanning direction. This figure shows a structure for enlargement in magnification of 2.0 in both of main scanning and subscanning operations. The write data driver 15a receives write data WD shown at (c) in FIG. 30. In the main scanning enlargement functional part Ma4, the output terminals $Q_0$ to $Q_2$ of the write clock counter 13 are bitwisely shifted to high order digits to be connected to the input terminals $A_1$ to $A_3$ of the write address decoder 14d, as shown in FIG. 34. The input terminal $A_0$ of the write address decoder 14d is fixed at a low level. Address data shown in a timing chart at (a) in FIG. 30 are inputted, and respective data in main scanning of respective lines inputted in the write data driver 15a are written in two addresses of the memory cell matrix 12, so that the data can be written in enlargement magnification of 2.0 in the main scanning direction.

In the subscanning enlargement functional part Su4, the output terminals $Q_3$ and $Q_4$ of the write clock counter 13 are bitwisely shifted to high order digits to be connected to the input terminals $A_5$ and $A_6$ of the write address decoder 14c, as shown in FIG. 34. The input terminal $A_4$ of the write address decoder 14c is fixed at a low level. Address data shown in the timing chart at (a) in FIG. 30 are inputted, and data received in the write data driver 15a are written in two addresses of the memory cell matrix 12 as data of lines in subscanning, so that the data can be written in enlargement magnification of 2.0 in the subscanning direction.

Figure 35:
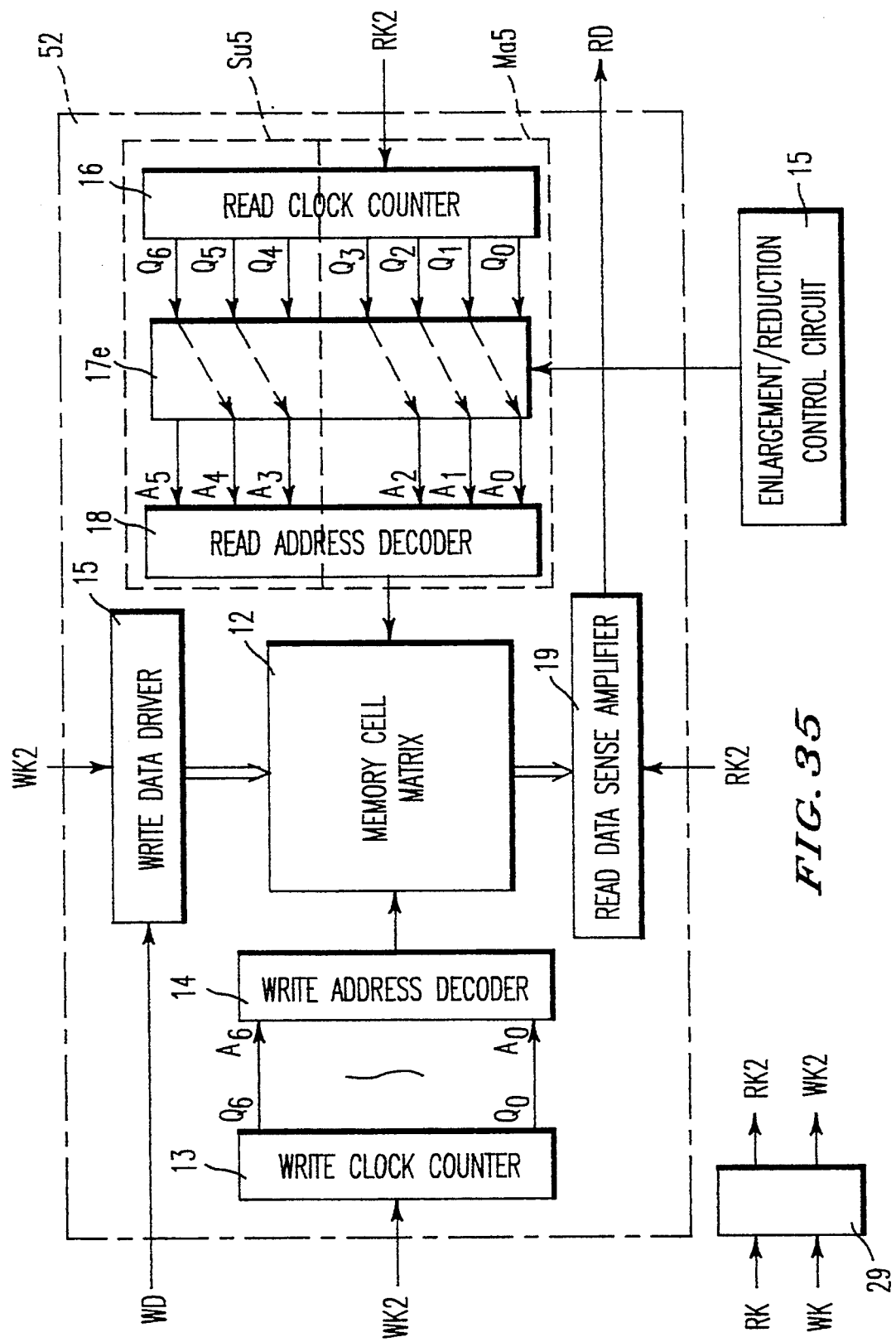
FIG. 35 is a block diagram showing the structure of the first-in first-out memory device according to the thirteenth embodiment of the present invention.

In a thirteenth embodiment shown in FIG. 35, it is possible to perform enlargement/reduction in main scanning/subscanning also by a read clock counter output shift circuit 17e. An operation in the state shown in FIG. 35 is similar to that of the tenth embodiment. It is possible to freely set enlargement/reduction magnification of main scanning/subscanning using the read clock counter output shift circuit 17e.

Figure 36:
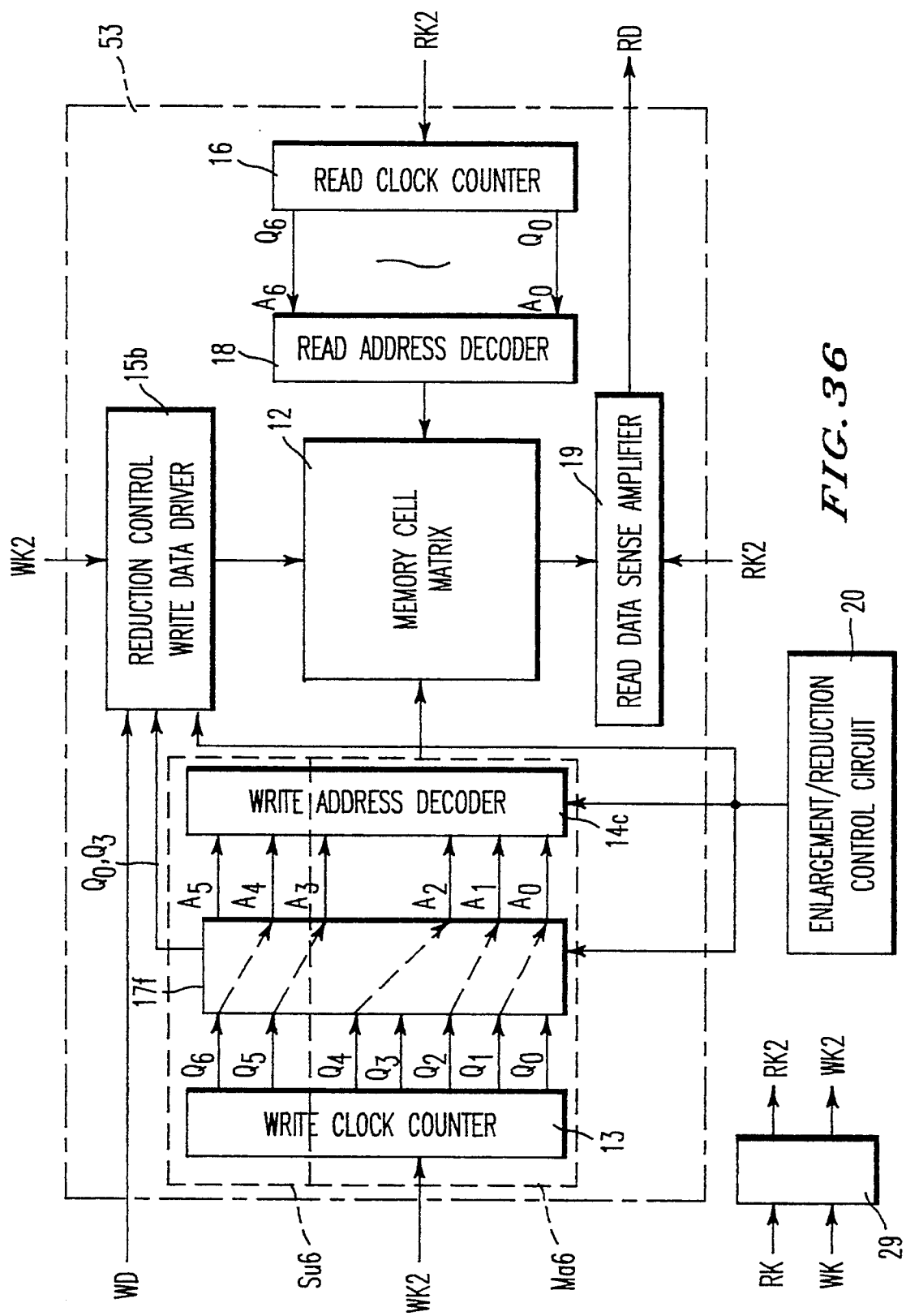
FIG. 36 is a block diagram showing the structure of the first-in first-out memory device according to the fourteenth embodiment of the present invention.

In a fourteenth embodiment shown in FIG. 36, further, it is possible to perform enlargement/reduction of main scanning/subscanning also by a write clock counter output shift circuit 17f. An operation shown in FIG. 36 is similar to that of the eleventh embodiment. It is possible to freely set enlargement/reduction magnification of main scanning/subscanning using the write clock counter output shift circuit 17f.

Although the signals outputted from the output terminals of the clock counter indicate values of respective digits expressing count values as binary numbers in each of the aforementioned embodiments, signals transmitted between output terminals of such a clock counter and input terminals of an address decoder corresponding thereto may generally indicate respective values of m-ary numbers, and it is possible to perform enlargement of $m^n$ times and reduction of $1/m^n$ times in this case.

Figure 37:
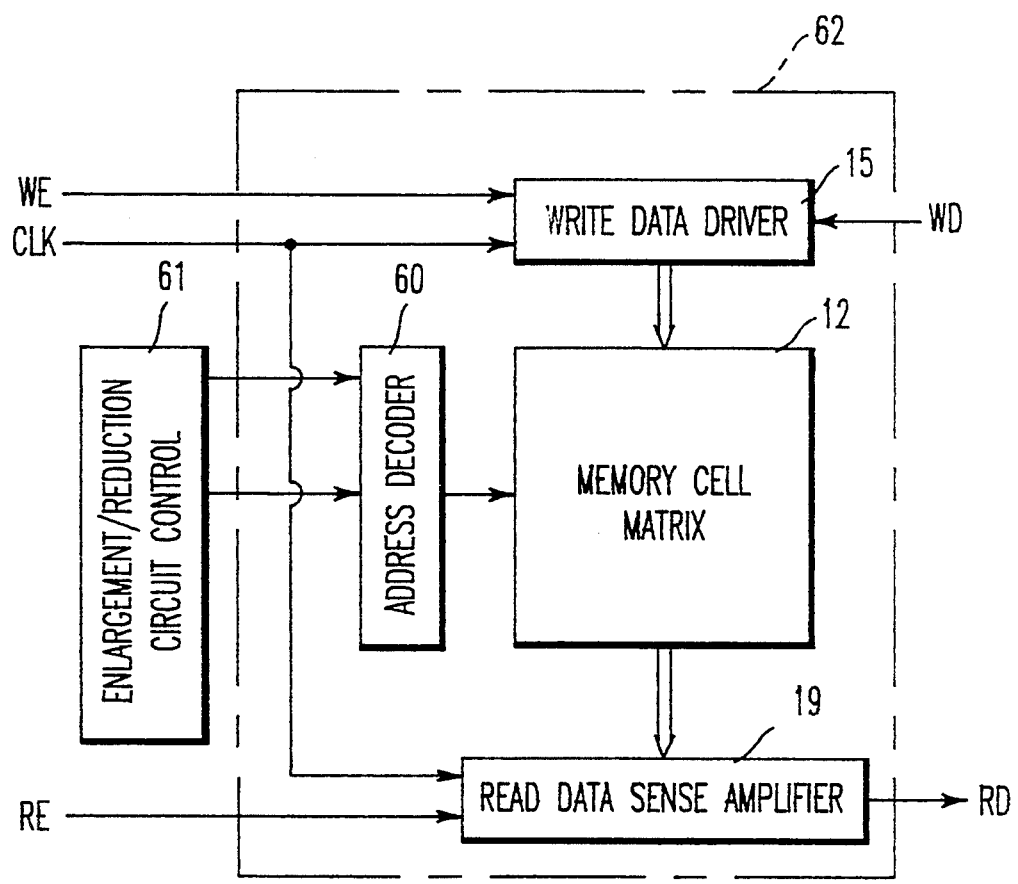
FIG. 37 illustrates a circuit structure for implementing enlargement/reduction of data.

In relation to an FIFO memory device which is directed to one line in a main scanning direction in a single write/read operation in a memory such as a line memory, proposed is an FIFO memory device 62 shown in FIG. 37. FIG. 37 is a block diagram showing a circuit structure for implementing enlargement/reduction of image data obtained by main scanning and subscanning.

Referring to FIG. 37, numeral 60 denotes an address decoder which demodulates address signals received therein for selecting memory cells of a memory cell matrix 12, numeral 61 denotes an enlargement/reduction control circuit which generates addresses to the address decoder 60 in response to the content of enlargement/reduction for controlling enlargement/reduction in the subscanning direction, and numeral 62 denotes the FIFO memory device which is formed by the address decoder 60, the memory cell matrix 12, a write data driver 15 and a read data sense amplifier 19. This FIFO memory device 62 is adapted to enlarge/reduce data by generating addresses from the external enlargement/reduction control circuit 61 using a random access memory. Therefore, the enlargement/reduction control circuit 61 performs enlargement/reduction control as well as address generation, and hence the circuit is extremely complicated.

In order to simplify the illustration, it is assumed that the data are in structures of addresses zero to 3 (2 bit addresses), and the memory cell matrix 12 has memory cells for data of one line in the main scanning direction.

Figure 38:
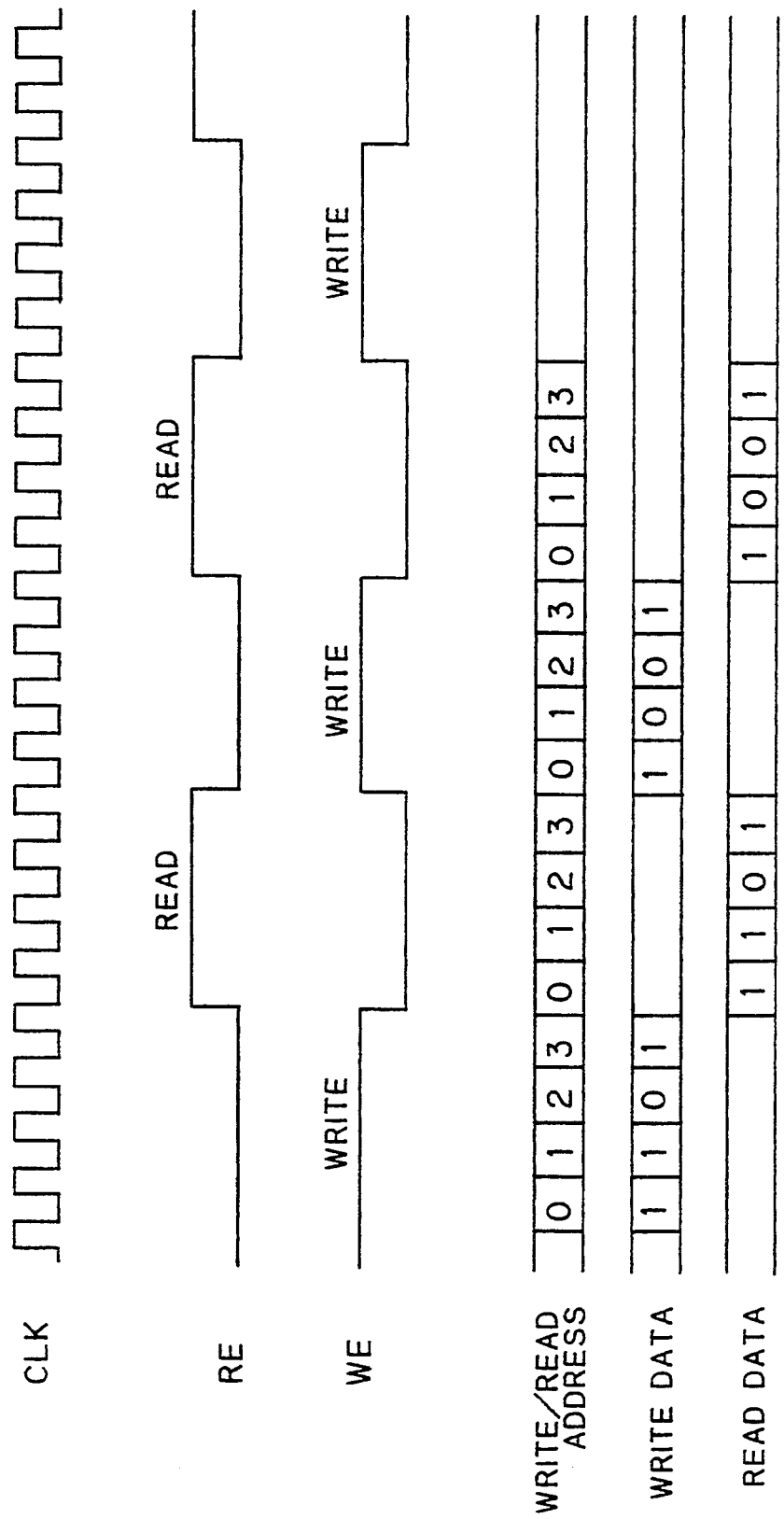
FIG. 38 is a waveform diagram showing an operation (equal-scale magnification) of the circuit for implementing enlargement/reduction of data.

First, the case of equal-scale magnification (1.0 in the main scanning direction by 1.0 in the subscanning direction) is now described with reference to FIG. 38. When a write enable signal WE goes high to implement a write enable state in FIG. 38, data "1101" of the first line of main scanning is written in an address outputted from the enlargement/reduction control circuit 61 in synchronization with a clock CLK as a write operation. Then, a read enable signal RE goes high to implement a read enable state, whereby the data "1101" are read from the addresses outputted from the enlargement/reduction control circuit 61 in synchronization with the clocks CLK in a read operation. Similar write and read operations are repeated to perform processing on second and subsequent lines of main scanning.

Figure 39:
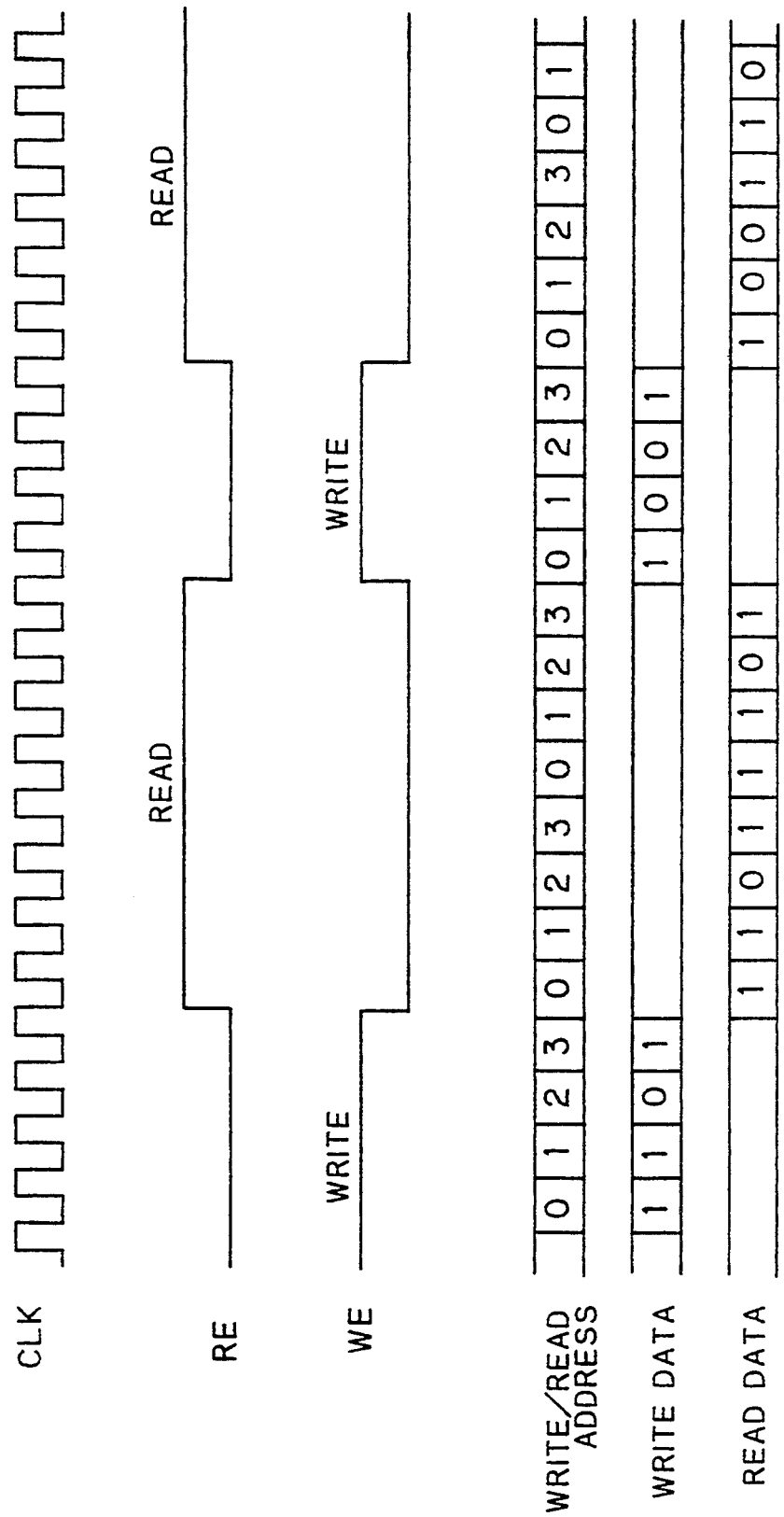
FIG. 39 is a waveform diagram showing an operation (enlargement) of the circuit for implementing enlargement/reduction of data.

The case of enlargement (1.0 in the main scanning direction by 2.0 in the subscanning direction) is now described with reference to FIG. 39. Referring to FIG. 39, a write operation is similar to that in the case of equal-scale magnification. Then, a period when the read enable signal RE is at a high level is doubled as compared with that in the case of equal-scale magnification. Namely, when a read enable state is implemented, data "1101" of the first line of main scanning, for example, are read twice from addresses outputted from the enlargement/reduction control circuit 61 in synchronization with the clocks CLK in the read enable state in a read operation. Similar operations are carried out on the second and subsequent lines.

Figure 40:
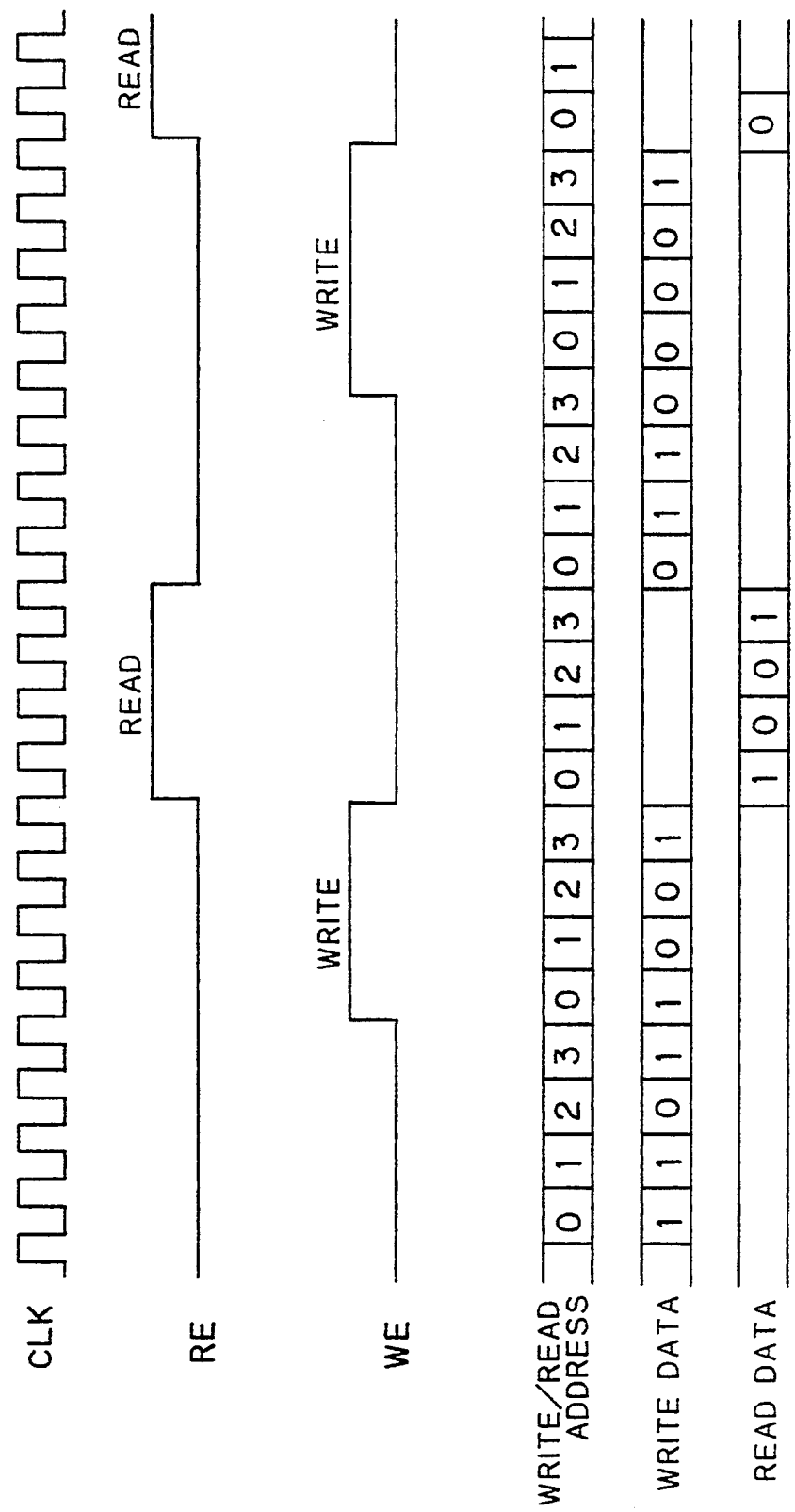
FIG. 40 is a waveform diagram showing another operation (reduction) of the circuit for implementing enlargement/reduction of data.

The case of reduction (1.0 in the main scanning direction by 0.5 in the subscanning direction) is now described with reference to FIG. 40. Referring to FIG. 40, a period when the write enable signal WE is at a high level is doubled as compared with that in the case of equal-scale magnification. Namely, when a write enable state is implemented, no data of the first line of main scanning are written but data "1001" of the second line are written in addresses outputted from the enlargement/reduction control circuit 61 in synchronization with the clocks CLK in a write operation. A read operation is similar to that in the case of equal-scale magnification. Similar operations are carried out for third and subsequent lines.

In the aforementioned FIFO memory device 62 for implementing data enlargement/reduction in the subscanning direction, the enlargement/reduction control circuit 61 for controlling enlargement/reduction in the subscanning direction must set addresses in response to current circumstances, while the logical scale is increased and complicated by set magnification, conditions and the like.

In order to enable data enlargement/reduction in the subscanning direction by providing a counter output control circuit or a $2^{n-1}+1$-ary counter in an FIFO memory device, therefore, the following FIFO memory device provided with a data enlargement/reduction function has been invented. In this FIFO memory device, generation of addresses is simplified by employment of a counter output control circuit or a $2^{n-1}+1$-ary counter for switching write and read operations, thereby implementing simple enlargement/reduction of data in the subscanning direction.

Figure 41:
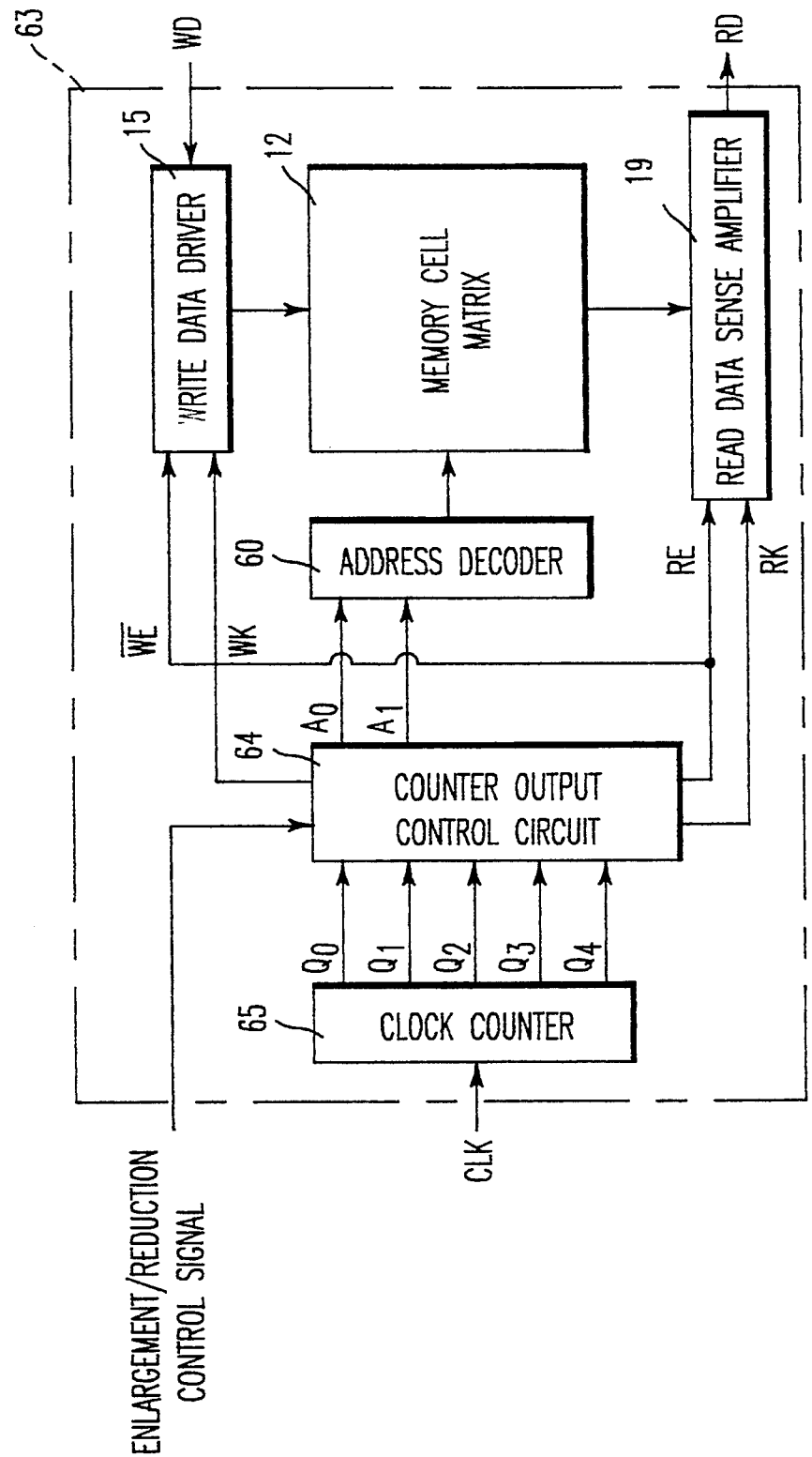
FIG. 41 is a block diagram showing the structure of a first-in first-out memory device according to a fifteenth embodiment of the present invention.

A fifteenth embodiment of the present invention is now described with reference to FIG. 41. Referring to FIG. 41, numeral 60 denotes an address decoder which decodes signals received in input terminals $A_0$ and $A_1$ and inputs the same in a memory cell matrix 12 as address inputs, numeral 65 denotes a binary clock counter which counts clocks CLK received therein and outputs count values from output terminals $Q_0$ to $Q_4$ in synchronization therewith, and numeral 64 denotes a counter output control circuit which controls the count values received from the output terminals $Q_0$ to $Q_4$ of the clock counter 65 by changing connection between the output terminals $Q_0$ to $Q_4$ of the clock counter 65 and the input terminals $A_0$ and $A_1$ of the address decoder 60, while numerals identical to those in FIG. 37 denote the same or corresponding portions. The clock counter 65 can be formed by a divider circuit. A write data driver 15 and a read data sense amplifier 19 are controlled by write and read enable signals /WE and RE and write and read clocks WK and RK outputted from the counter output control circuit 64. Numeral 63 denotes an FIFO memory device which is formed by the respective circuits 12, 15, 19, 60, 64 and 65.

Figure 42:
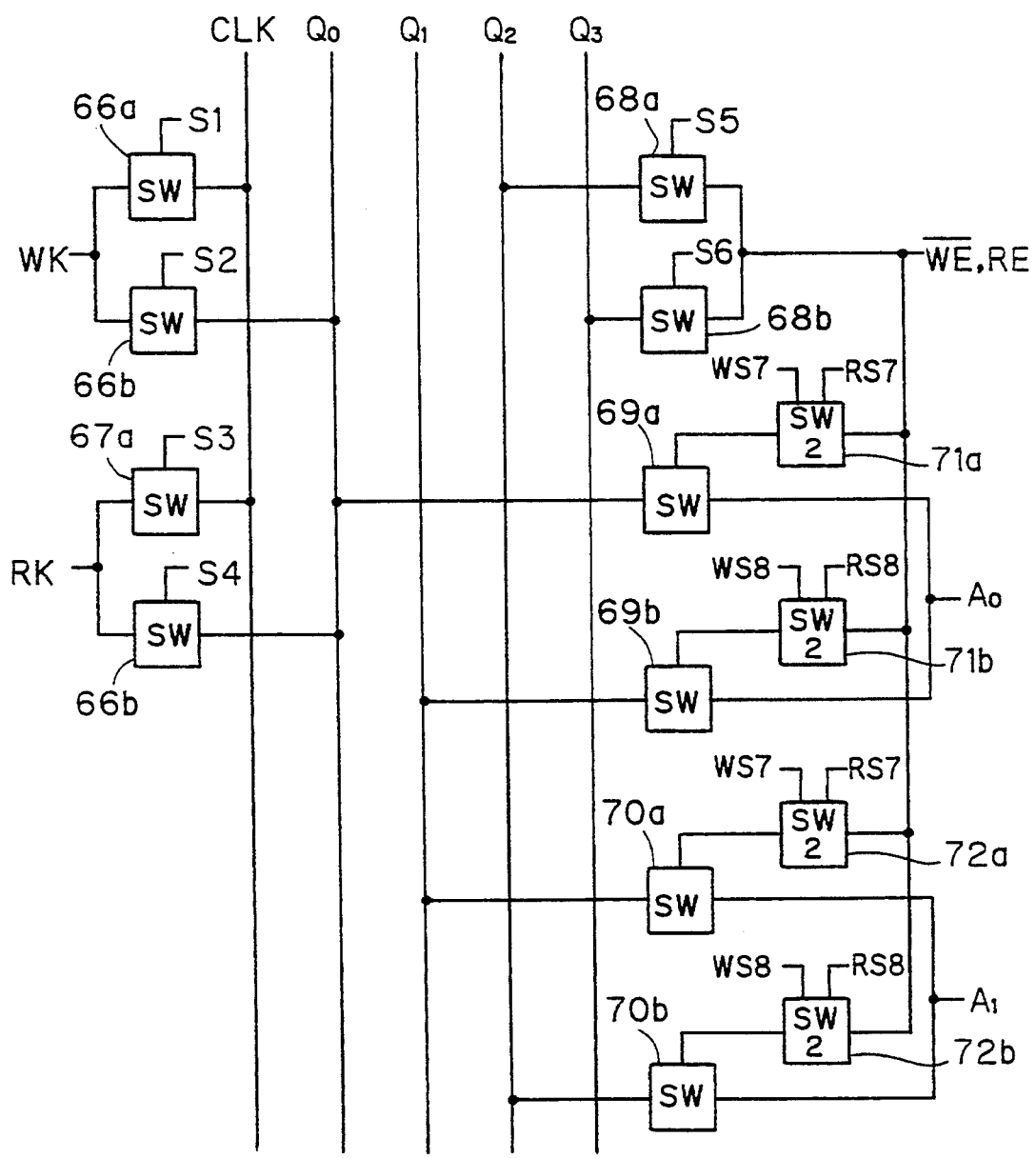
FIG. 42 is a circuit diagram showing the structure of a counter output control circuit of the first-in first-out memory device shown in FIG. 41.

FIG. 42 shows an exemplary structure of the counter output control circuit 64, which is formed by a plurality of switching circuits 66a to 72b. The respective switching circuits 66a to 72b are controlled by control signals S1 to S6, WS7, RS7, WS8 and RS8 which are inputted in the counter output control circuit 64 from the exterior of the circuit. These switching circuits 66a to 71b switch connection between the output terminals $Q_0$ to $Q_3$ of the clock counter 65 and the input terminals $A_0$ and $A_1$ of the address decoder 60 shown in FIG. 41, which are connected to the counter output control circuit 64. The counter output control circuit 64 further supplies the enable signals /WE and RE and the clock signals WK and RK for controlling operations of the write data driver 15 and the read data sense amplifier 19 by switching connection with the output terminals $Q_0$ to $Q_3$ of the clock counter 65 by the switching circuits 66a to 72b. Table 14 shows connection between enlargement/reduction magnification and the control signals S1 to S6, WS7, RS7, WS8 and RS8.

TABLE 14

| Magnification | S1 | S2 | S3 | S4 | S5 | S6 | WS7 | RS7 | WS8 | RS8 |
|---|---|---|---|---|---|---|---|---|---|---|
| × 1.0 | H | L | H | L | H | L | H | H | L | L |
| × 2.0 | H | L | L | H | L | H | H | L | L | H |
| × 0.5 | L | H | H | L | L | H | L | H | H | L |

Figure 43:
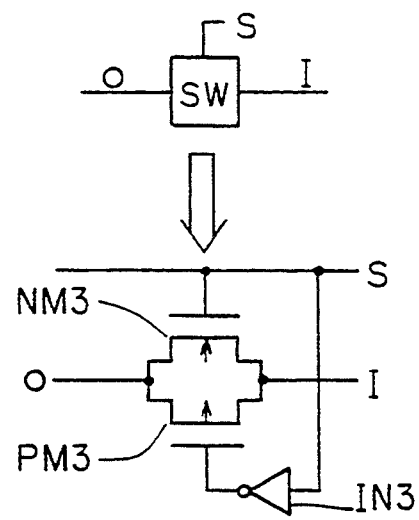
FIG. 43 is a circuit diagram showing the structure of a switching circuit of the counter output control circuit shown in FIG. 42.
Figure 44:
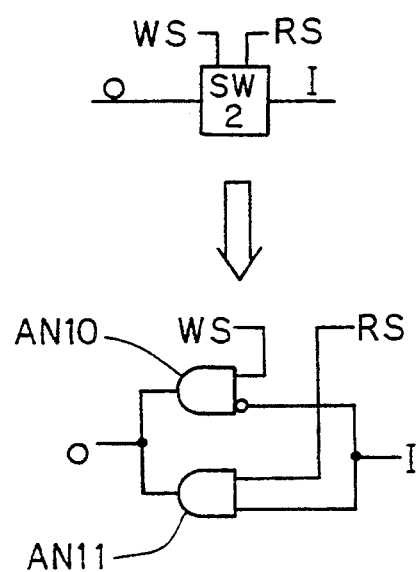
FIG. 44 is a circuit diagram showing the structure of another switching circuit of the counter output control circuit shown in FIG. 42.

In the case of equal-scale magnification, for example, the switching circuits 66a, 67a and 68a enter ON states. The switching circuits 71a and 72a regularly output high levels while the switching circuits 71b and 72b output low levels, whereby the switching circuits 69a and 69b enter ON states. Therefore, the write data driver 15 and the read sense amplifier 19 use clocks CLK as write and read clocks WK and RK, and the output terminals $Q_0$ and $Q_1$ of the clock counter 65 are connected to the input terminals $A_0$ and $A_1$ of the address decoder 60. Each of the switching circuits 66a to 70b can be formed by a transmission gate which comprises a PMOS transistor PM3, an NMOS transistor NM3 and an inverter IN3 as shown in FIG. 43, for example, while each of the switching circuits 71a to 72b can be formed by two AND gates AN10 and AN11 as shown in FIG. 44, for example.

The operation of the FIFO memory device 63 is now described. In order to simplify the illustration, it is assumed that the memory is formed by addresses zero to 3 (2-bit addresses $A_0$ and $A_1$) similarly to the FIFO memory device shown in FIG. 37 for a single line in the main scanning direction.

The case of equal-scale magnification (1.0 in the main scanning direction by 1.0 in the subscanning direction) is now described with reference to FIG. 45. The counter output control circuit 64 controls the signals outputted from the output terminals $Q_0$ to $Q_4$ of the clock counter 65 by an enlargement/reduction control signal along Table 15.

TABLE 15

| | | Write | | | Read | | |
|---|---|---|---|---|---|---|---|
| Magnification | /WE/RE | WK | $A_0$ | $A_1$ | RK | $A_0$ | $A_1$ |
| × 1 | $Q_2$ | CLK | $Q_0$ | $Q_1$ | CLK | $Q_0$ | $Q_1$ |
| × 0.5 | $Q_3$ | CLK | $Q_0$ | $Q_1$ | $Q_0$ | $Q_1$ | $Q_2$ |
| × 0.25 | $Q_4$ | CLK | $Q_0$ | $Q_1$ | $Q_1$ | $Q_2$ | $Q_3$ |
| × 2 | $Q_3$ | $Q_0$ | $Q_1$ | $Q_2$ | CLK | $Q_0$ | $Q_1$ |
| × 4 | $Q_4$ | $Q_1$ | $Q_2$ | $Q_3$ | CLK | $Q_0$ | $Q_1$ |

Figure 48:
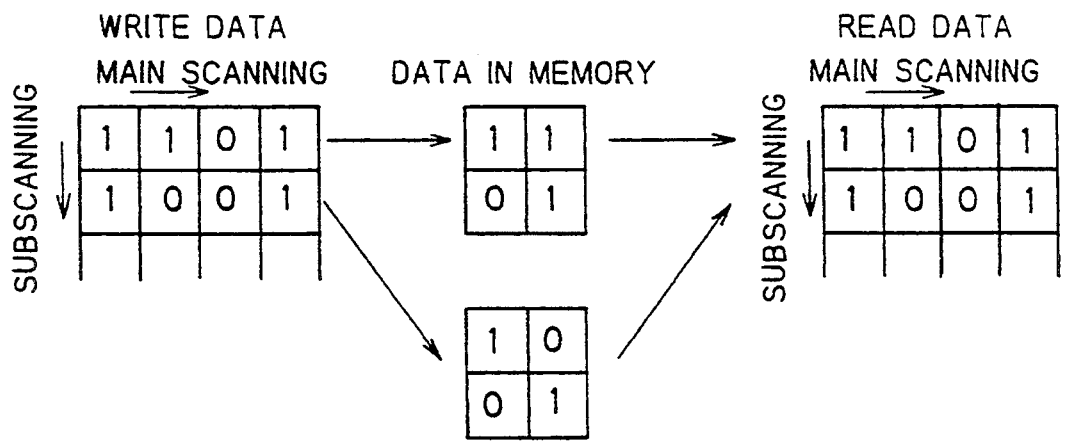
FIG. 48 is a model diagram illustrating an operation of the first-in first-out memory device according to the fifteenth embodiment of the present invention.

Setting of the counter output control circuit 64 shown in Table 15 depends on combinations of the control signals S1 to S6, WS7, WS8, RS7 and RS8 shown in Table 14. From Table 15, the output from the output terminal $Q_2$ of the clock counter 65 is employed for the write and read enable signals /WE and RE, the clocks CLK are employed as the write and read clocks WK and RK, and the outputs from the output terminals $Q_0$ and $Q_1$ of the clock counter 65 are employed for the input terminals $A_0$ and $A_1$ of the address decoder 60 in both of write and read operations. As to the operation, data "1101" of the first line of main scanning are written in the addresses zero to 3 of the memory cell matrix 12 in synchronization with the write clocks WK (CLK) in a write enable state (/WE="L"), as shown in the timing chart of FIG. 45 and write and read data in FIG. 48. In a read enable state (RE="H"), on the other hand, the data "1101" are read from the memory cell matrix 12 (from the addresses zero to 3) in synchronization with the read clocks RL (CLK). Similar operations are carried out for the second and subsequent lines of main scanning.

Figure 46:
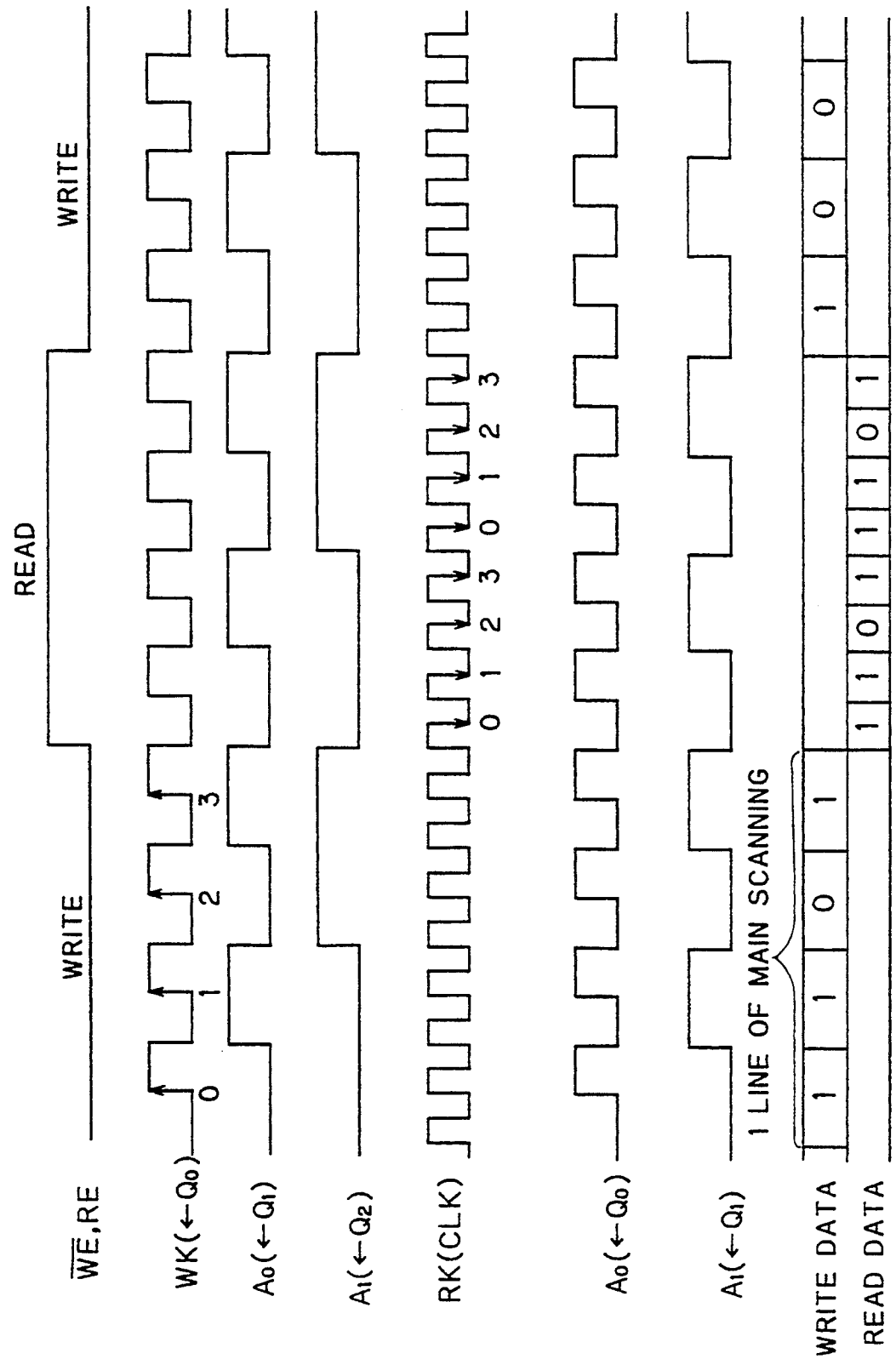
FIG. 46 is a waveform diagram showing an operation (enlargement) of the first-in first-out memory device according to the fifteenth embodiment of the present invention.
Figure 49:
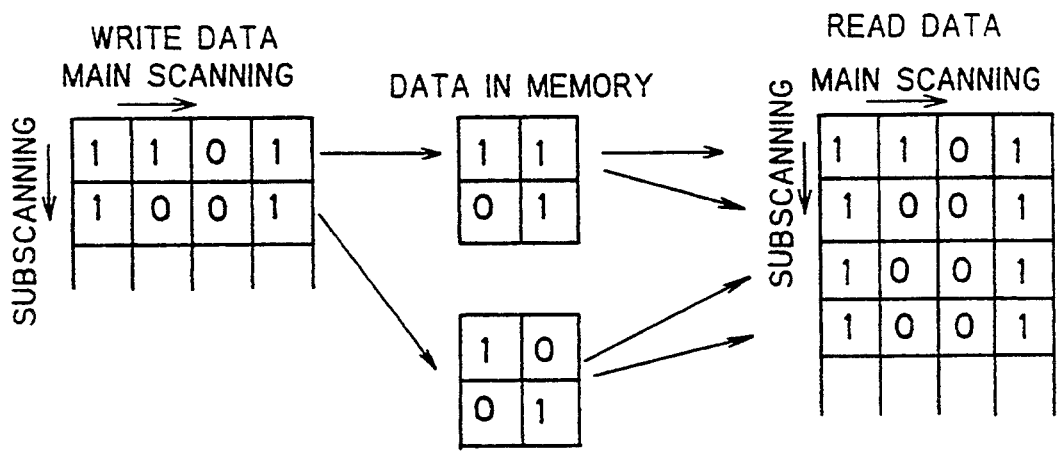
FIG. 49 is a model diagram illustrating another operation of the first-in first-out memory device according to the fifteenth embodiment of the present invention.

The case of enlargement (1.0 in the main scanning direction by 2.0 in the subscanning direction) is now described with reference to FIG. 46. From Table 15, the counter output control circuit 64 employs the output from the output terminal $Q_3$ of the clock counter 65 for the write and read enable signals /WE and RE while employing the output from the output terminal $Q_0$ for the write clocks WK. In writing, the counter output control circuit 64 connects the output terminals $Q_1$ and $Q_2$ of the clock counter 65 to the input terminals $A_0$ and $A_1$ of the address decoder 60 while employing the clocks CLK for the read clocks RK. In reading, the counter output control circuit 64 connects the input terminals $A_0$ and $A_1$ of the address decoder 60 to the output terminals $Q_0$ and $Q_1$ of the clock counter 65. As shown in the timing chart of FIG. 46 and write and read data of FIG. 49, data "1101" of the first line of main scanning are written in the memory cell matrix 12 (addresses zero to 3) in synchronization with the write docks WK ($Q_0$) in a write enable state (/WE="L"). In a read enable state (RE="H"), on the other hand, the data "1101" are repeatedly read twice from the memory cell matrix 12 in synchronization with the read clocks RL (CLK). Similar operations are carried out on the second and subsequent lines. At this time, the period of the read clocks RK is half that of the write clocks. Thus, the data read from the FIFO memory device 63 are enlarged to twice in the subscanning direction.

Figure 47:
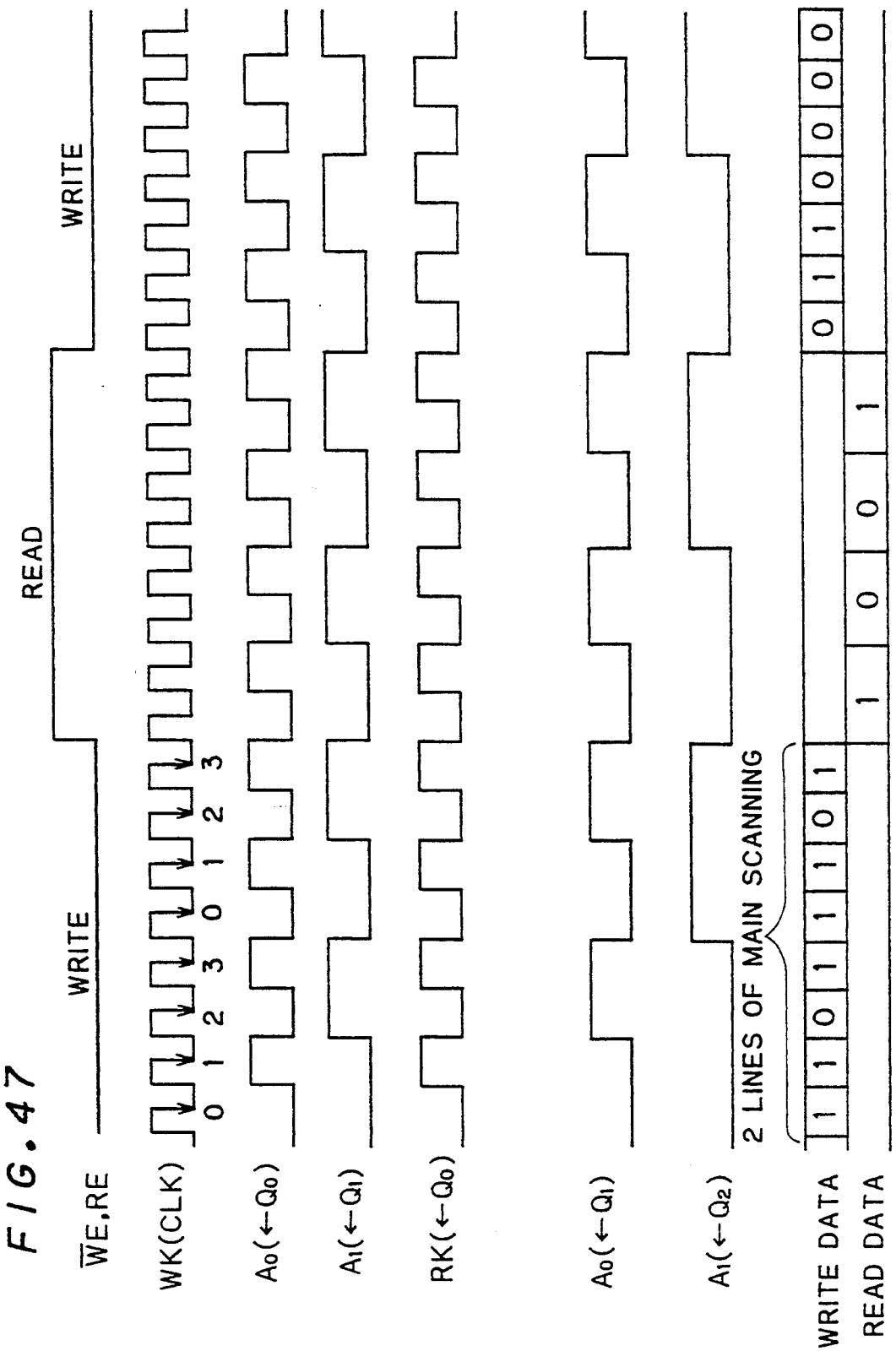
FIG. 47 is a waveform diagram showing an operation (reduction) of the first-in first-out memory device according to the fifteenth embodiment of the present invention.
Figure 50:
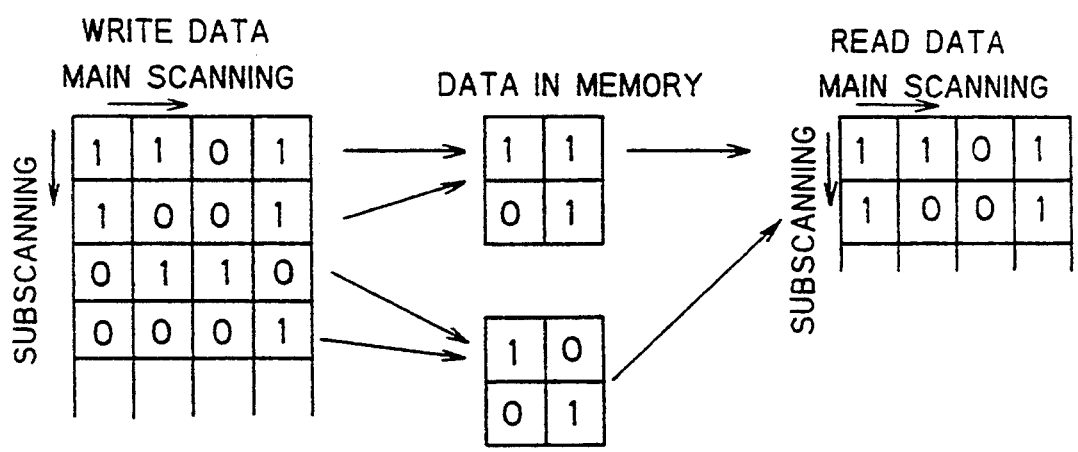
FIG. 50 is a model diagram illustrating still another operation of the first-in first-out memory device according to the fifteenth embodiment of the present invention.

The case of reduction (1.0 in the main scanning direction by 0.5 in the subscanning direction) is now described with reference to FIG. 47. From Table 15, the counter output control circuit 64 connects the write and read enable signals/WE and RE, the write clocks WK and the input terminals $A_0$ and $A_1$ of the address decoder 60 in writing to the output from the output terminal $Q_3$ of the clock counter 65, the clocks CLK and the output terminals $Q_0$ and $Q_1$ of the clock counter 65 respectively, uses the output from the output terminal $Q_0$ of the clock counter 65 as the read clocks RK and connects the input terminals $A_0$ and $A_1$ of the address decoder 60 in reading to the output terminals $Q_1$ and $Q_2$ of the clock counter 65 respectively. As shown in the timing chart of FIG. 47 and write and read data of FIG. 50, data "1101" on the first line of main scanning are written in the memory cell matrix 12 in synchronization with the write clocks WK (CLK) in a write enable state (/WE="L"), and data "1001" on the second line are further written in the same addresses. Namely, the data are overwritten. In a read enable state (RE="H"), on the other hand, the data "1001" are read from the memory cell matrix 12 in synchronization with the read clocks RK ($Q_0$). Similar operations are carried out on third and subsequent lines. Therefore, the data are read from only even lines of main scanning and halved in the subscanning direction.

Figure 51:
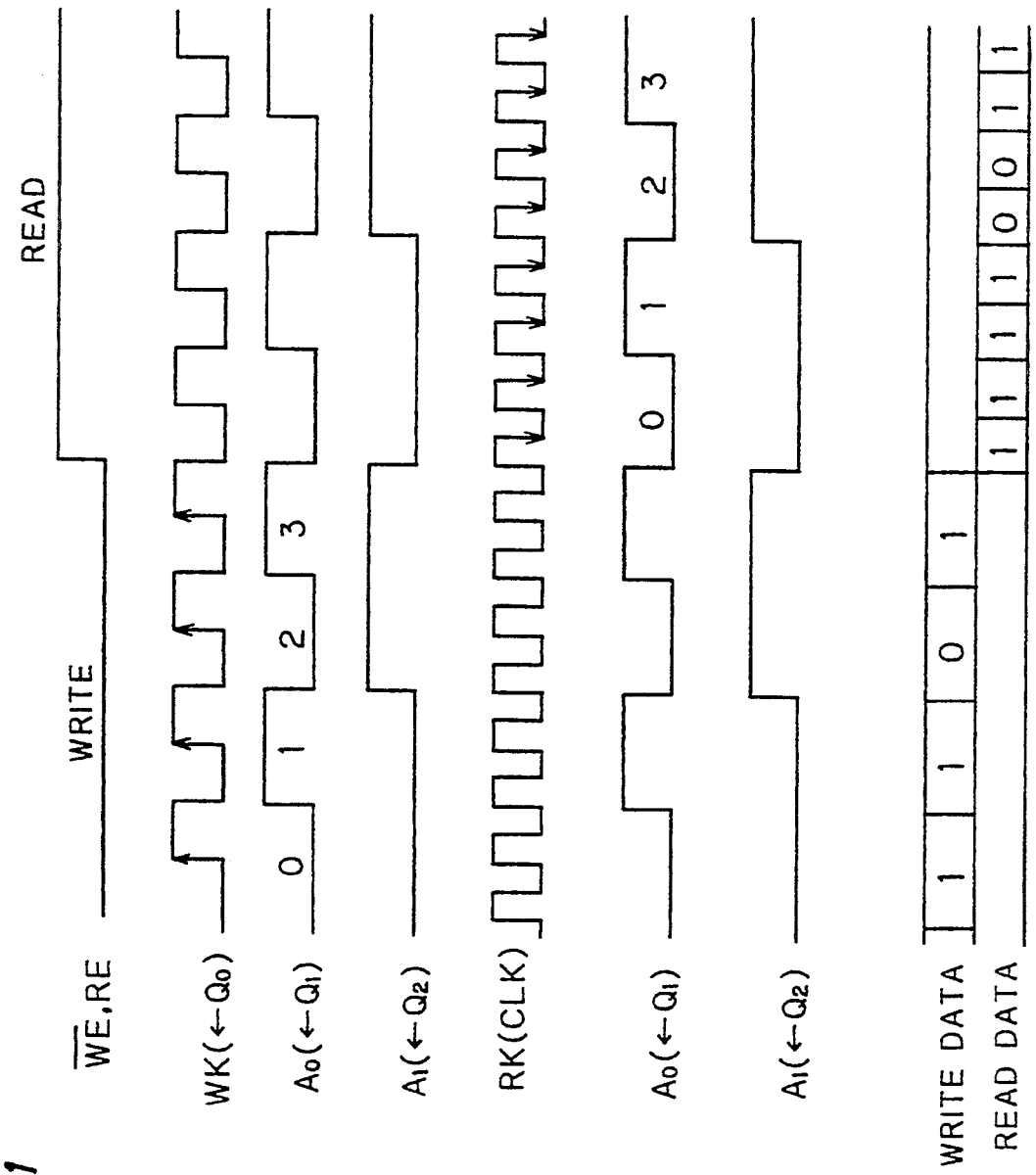
FIG. 51 is a waveform diagram showing an operation (enlargement) of the first-in first-out memory device according to the fifteenth embodiment of the present invention.

The case of enlargement (2.0 in the main scanning direction by 1.0 in the subscanning direction) is now described with reference to FIG. 51. In order to perform enlargement/reduction in the main scanning direction, the counter output control circuit 64 controls the signals outputted from the output terminals $Q_0$ to $Q_4$ by the enlargement/reduction control signal in accordance with Table 16.

TABLE 16

| Magnification | $\overline{WE/RE}$ | Write | | | Read | | |
|---|---|---|---|---|---|---|---|
| | | WK | $A_0$ | $A_1$ | RK | $A_0$ | $A_1$ |
| × 1 | $Q_2$ | CLK | $Q_0$ | $Q_1$ | CLK | $Q_0$ | $Q_1$ |
| × 0.5 | $Q_3$ | CLK | $Q_1$ | $Q_2$ | $Q_0$ | $Q_1$ | $Q_2$ |
| × 0.25 | $Q_4$ | CLK | $Q_1$ | $Q_2$ | $Q_1$ | $Q_2$ | $Q_3$ |
| × 2 | $Q_3$ | $Q_0$ | $Q_1$ | $Q_2$ | CLK | $Q_1$ | $Q_2$ |
| × 4 | $Q_4$ | $Q_1$ | $Q_2$ | $Q_3$ | CLK | $Q_1$ | $Q_2$ |

From Table 16, the counter output control circuit 64 uses the outputs from the output terminals $Q_3$ and $Q_0$ of the clock counter 65 for the write and read enable signals/WE and RE and the write clocks WK respectively, while connecting the output terminals $Q_1$ and $Q_2$ of the clock counter 65 to the input terminals $A_0$ and $A_1$ of the address decoder 60 and using the clocks CLK for the read clocks RK in writing. In reading, on the other hand, the counter output control circuit 64 connects the input terminals $A_0$ and $A_1$ of the address decoder 60 to the output terminals $Q_1$ and $Q_2$ of the clock counter 65 respectively. The data "1101" on the first line of main scanning are written in the memory cell matrix 12 (addresses zero to 3) in synchronization with the write clocks WK ($Q_0$) in a write enable state (/WE="L"), as shown in the timing chart of FIG. 51. In a read enable state (RE="H"), on the other hand, the data "1101" are read from the memory cell matrix 12 twice during single change of the addresses in synchronization with the read clocks RK (CLK). Similar operations are carried out on the second and subsequent lines. At this time, the period of the read clocks RK is half that of the write clocks WK. Thus, the data read from the FIFO memory device 63 are enlarged to twice in the main scanning direction.

Figure 45:
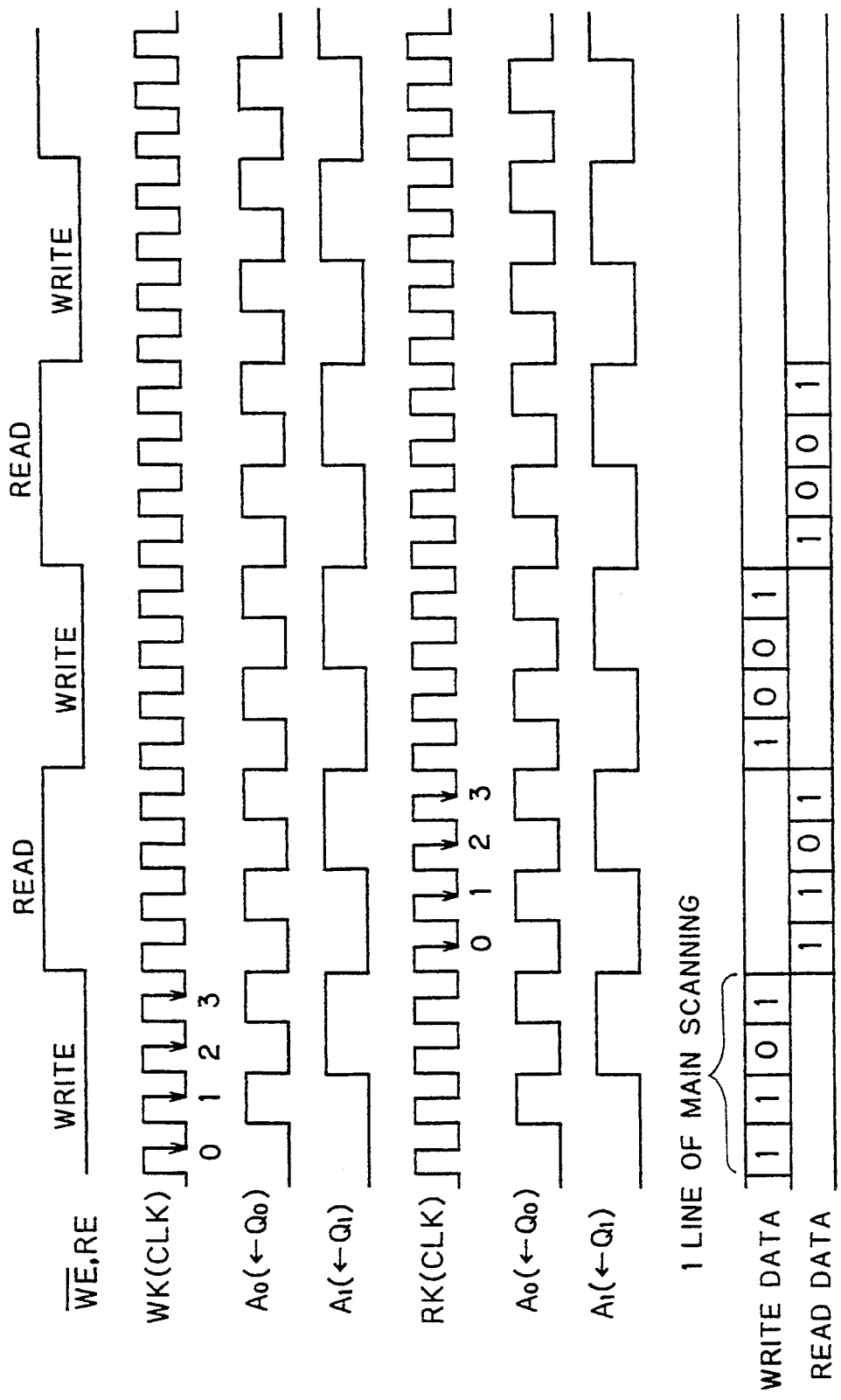
FIG. 45 is a waveform diagram showing an operation (equal-scale magnification) of the first-in first-out memory device according to the fifteenth embodiment of the present invention.
Figure 52:
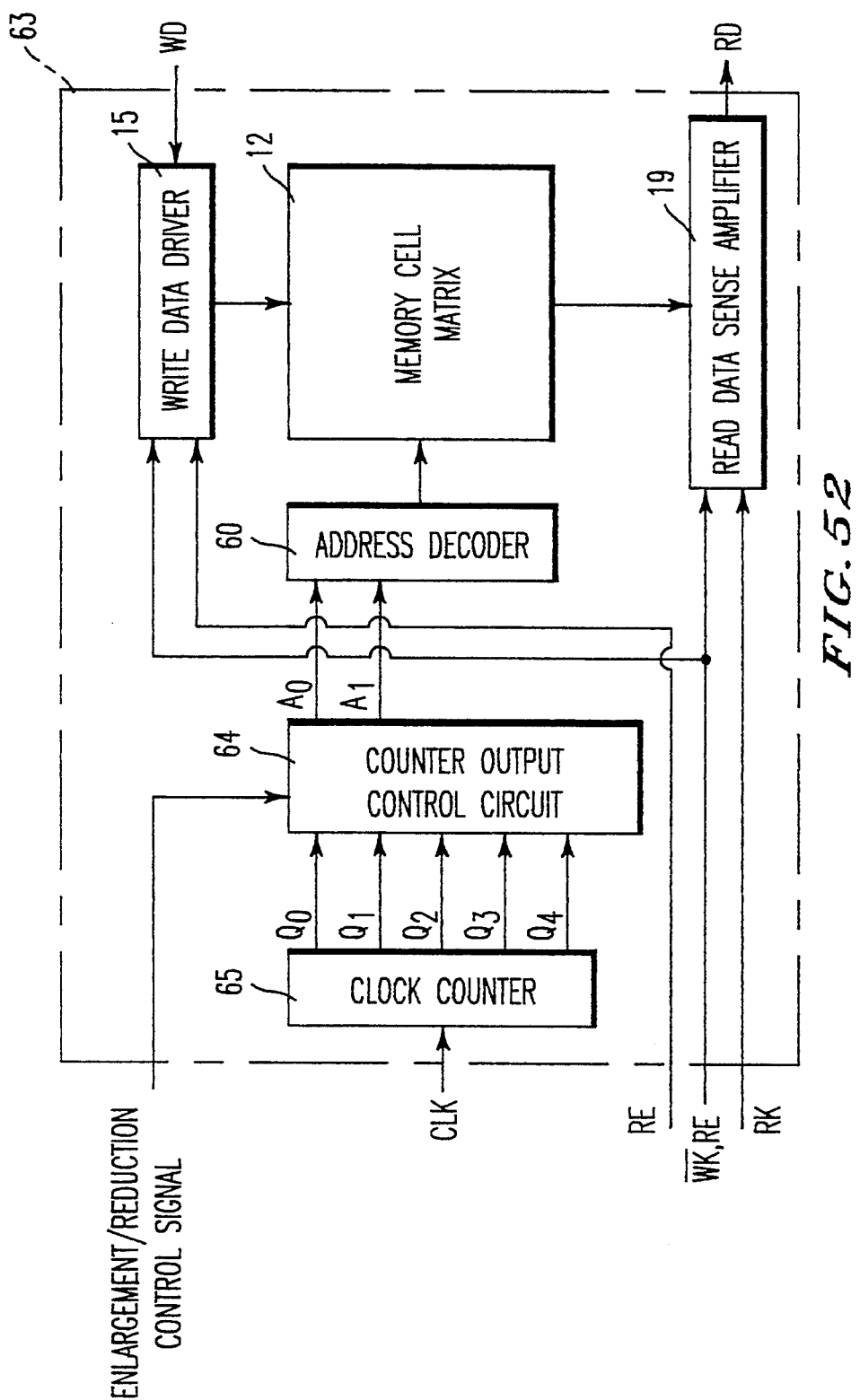
FIG. 52 is a block diagram showing another mode of the structure of the first-in first-out memory device according to the fifteenth embodiment of the present invention.

Although the write and read enable signals/WE and RE and the write and read clocks WK and RK are supplied to the write data driver 15 and the read data sense amplifier 19 by the counter output control circuit 64 in the fifteenth embodiment, such control signals and clocks may alternatively be supplied from the exterior as shown in FIG. 52, to attain an effect similar to that of the aforementioned embodiment so far as these satisfy relations of the timing charts shown in FIG. 45 and the like.

Further, although enlargement/reduction of the data in the subscanning direction is implemented by provision of the counter output control circuit 64 in the fifteenth embodiment, such data enlargement/reduction can also be implemented with a $2^{n-1}+1$-ary counter.

Figure 53:
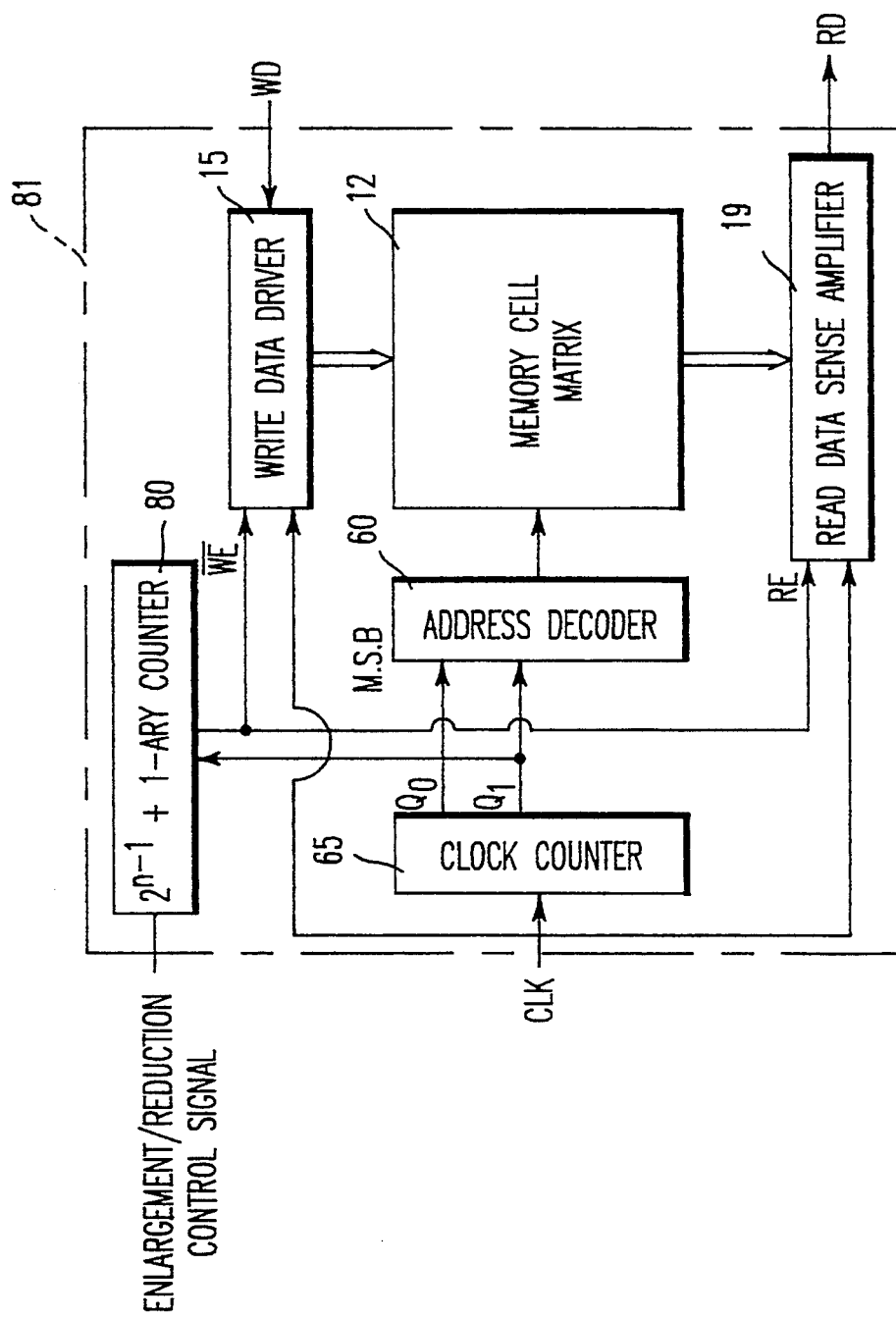
FIG. 53 is a block diagram showing the structure of a first-in first-out memory device according to a sixteenth embodiment of the present invention.

A sixteenth embodiment of the present invention is now described with reference to FIG. 53. Referring to FIG. 53, numeral 65 denotes a clock counter which is synchronized with a clock input, and numeral 80 denotes a $2^{n-1}+1$-ary counter, being controlled by an enlargement/reduction control signal, which is synchronized with an output from an output terminal $Q_1$ of the clock counter 65. Numeral 60 denotes an address decoder, which inputs outputs of the clock counter 65 as addresses of the memory cell matrix 12. Numerals 15 and 19 denote a write data driver and a read data sense amplifier, which are synchronized with clock inputs and receive the most significant bit of the $2^{n-1}+1$-ary counter 80 as write and read enable signals/WE and RE. Numerals identical to those in FIG. 41 denote the same or corresponding parts.

Figure 54:
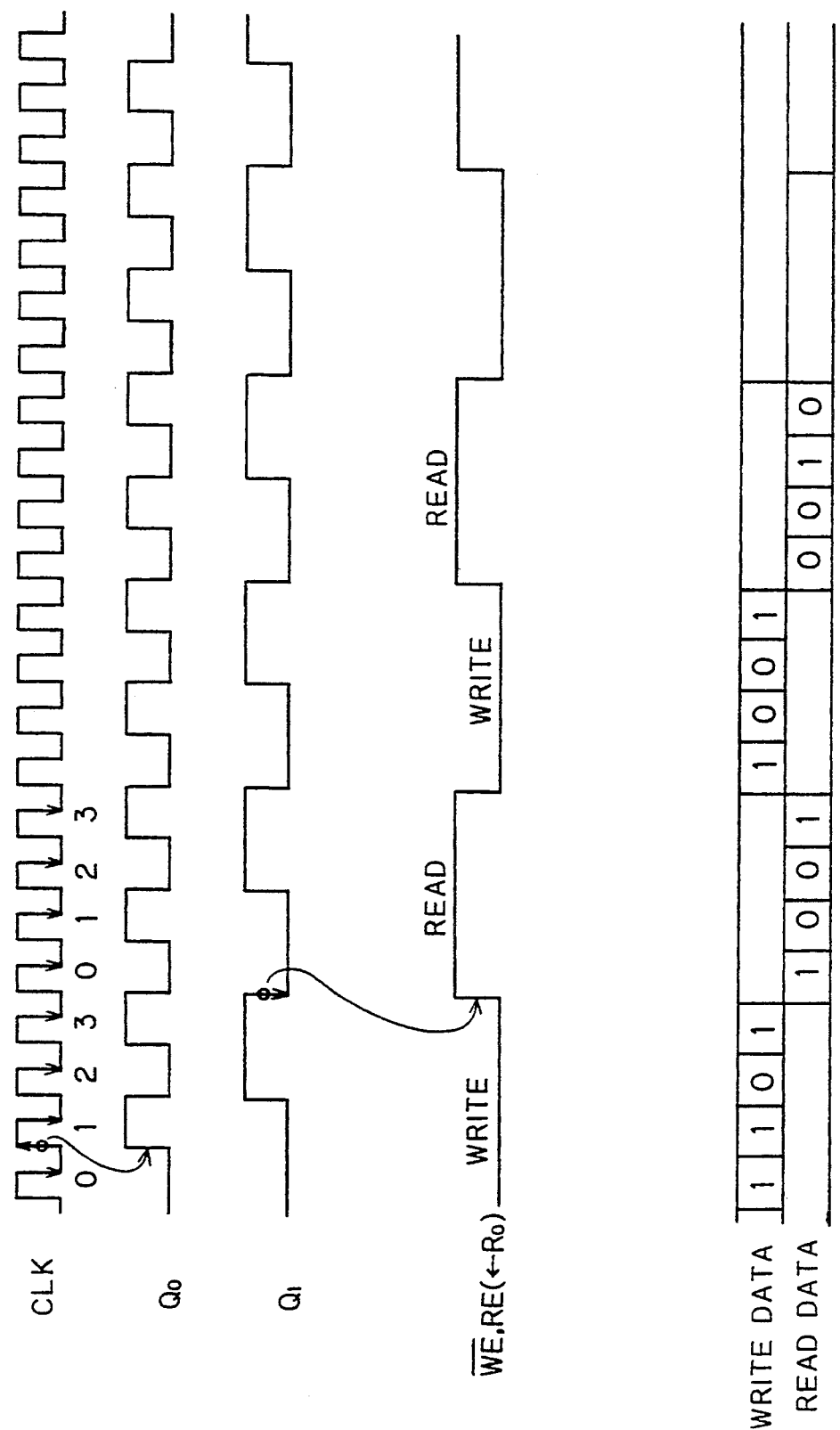
FIG. 54 is a waveform diagram showing an operation (equal-scale magnification) of the first-in first-out memory device according to the sixteenth embodiment of the present invention.

Operations of such an FIFO memory device 81 are now described. First, the case of equal-scale magnification (1.0 in the main scanning direction by 1.0 in the subscanning direction) is described with reference to FIG. 54. The $2^{n-1}+1$-ary counter 80 operates as a binary counter (n=1) by the enlargement/reduction control signal, to use its most significant bit $R_0$ as the write and read signals/WE and RE. As shown in FIG. 54 (written and read data are similar to those in FIG. 48), data "1101" on the first line in the main scanning direction are written in the memory cell matrix 12 in synchronization with clocks CLK in a write enable state (/WE="L"). In a read enable state (RE="H"), on the other hand, the data "1101" are read from the memory cell matrix 12 in synchronization with the clocks CLK. Similar operations are carried out on the second and subsequent lines.

Figure 55:
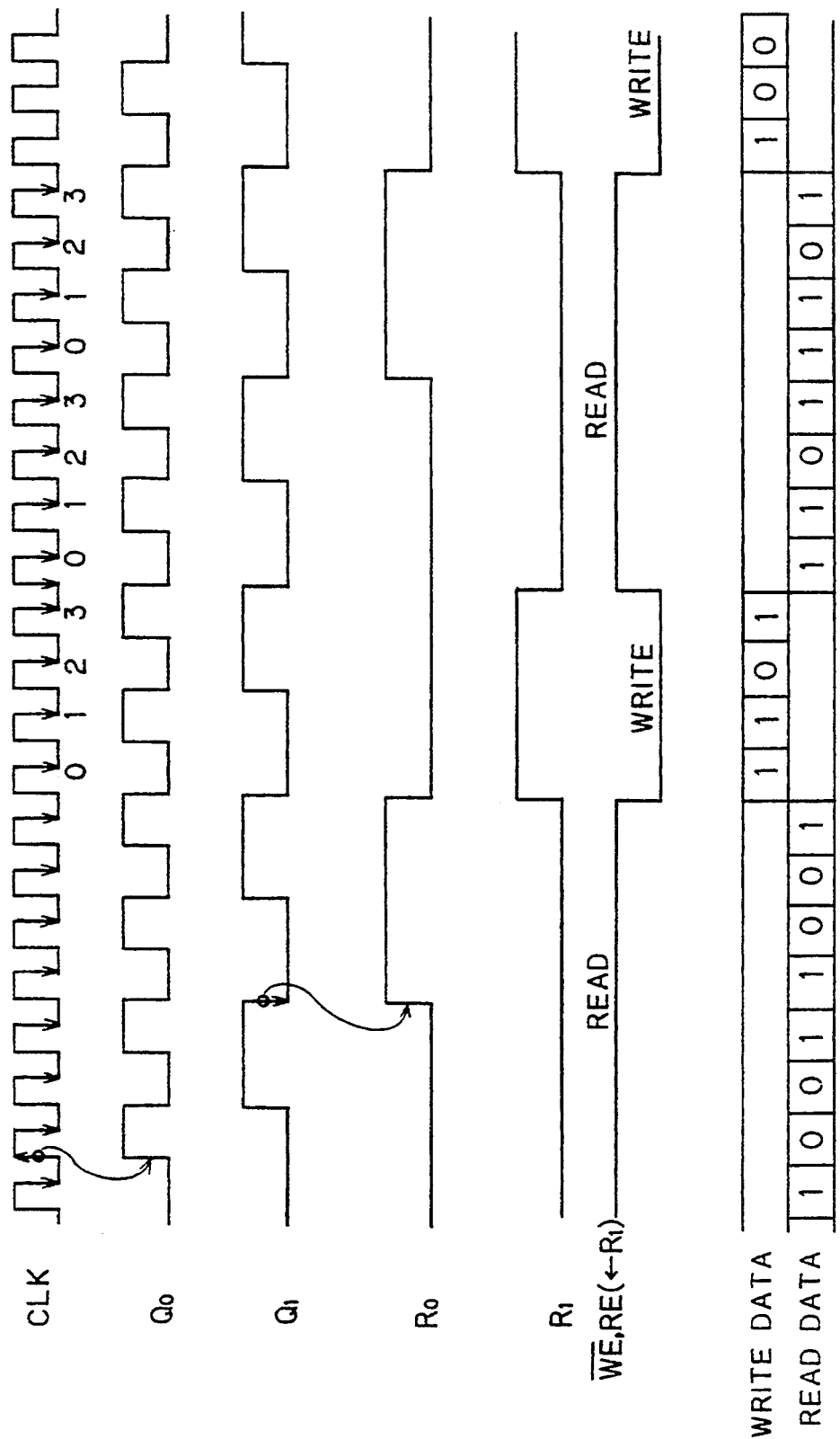
FIG. 55 is a waveform diagram showing another operation (enlargement) of the first-in first-out memory device according to the sixteenth embodiment of the present invention.

The case of enlargement (1.0 in the main scanning direction by 2.0 in the subscanning direction) is now described with reference to FIG. 55. The $2^{n-1}+1$-ary counter 80 operates as a ternary counter (n=2) by the enlargement/reduction control signal, to use an inverted bit of its most significant bit $R_1$ as the write and read enable signals/WE and RE. As shown in FIG. 55, the data "1101" on the first line in the main scanning direction are written in synchronization with the clocks CLK in a write enable state (/WE="L"). In a read enable state (RE="H"), on the other hand, the data "1101" are read twice from the memory cell matrix 12 in synchronization with the clocks CLK. The address decoder 60 specifies the addresses at constant time intervals since the clocks CLK for reading are not changed in length, while the periodic length of a readable state is twice that of a writable state, i.e., the period of the read enable signal RE outputted from the counter 80 serving as a ternary counter is twice that of the write enable signal/WE, whereby the data of the same addresses are repeatedly read twice so that the same are enlarged to twice in the subscanning direction. Similar operations are carried out on the second and subsequent lines.

Figure 56:
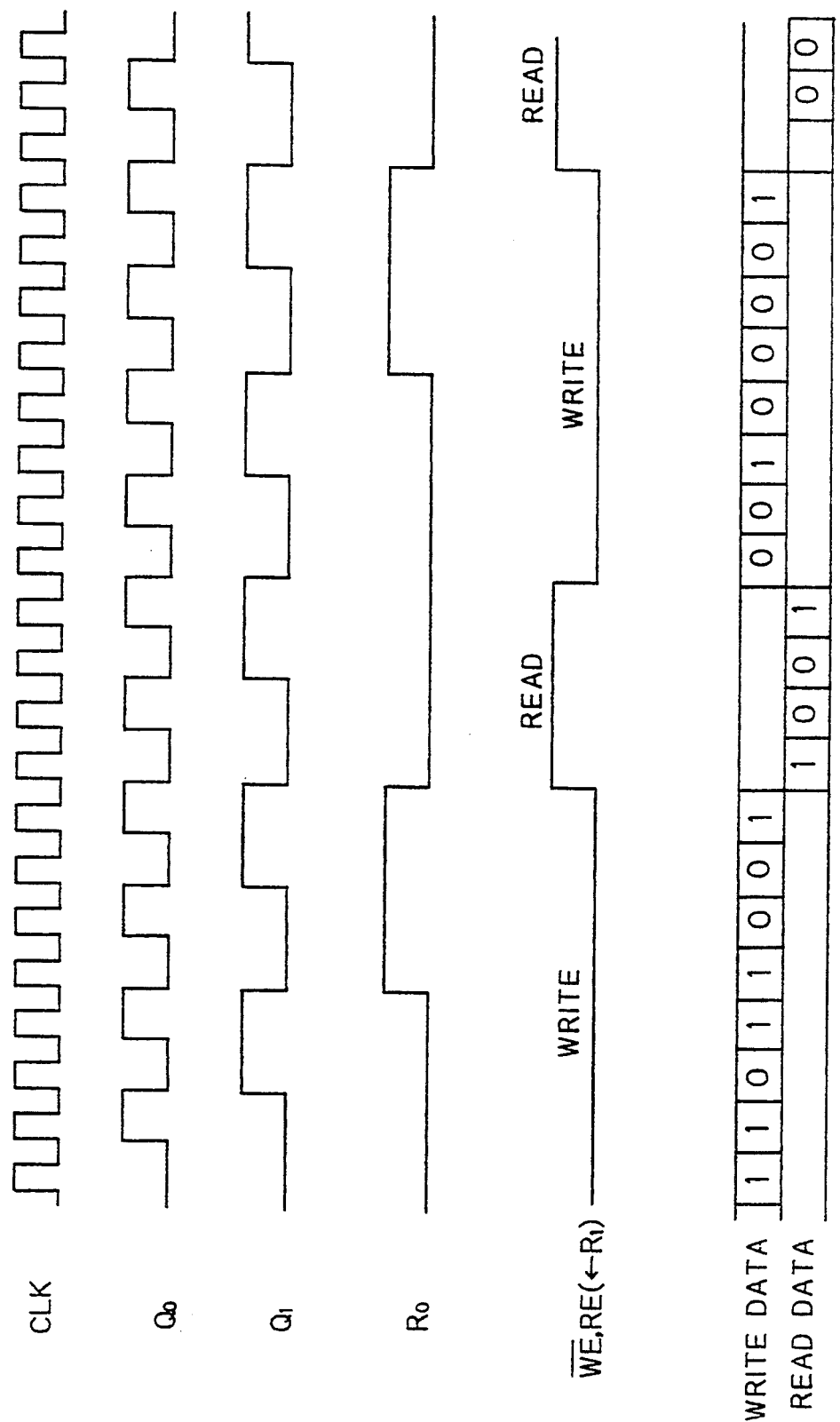
FIG. 56 is a waveform diagram showing still another operation (reduction) of the first-in first-out memory device according to the sixteenth embodiment of the present invention.

The case of reduction (1.0 in the main scanning direction by 0.5 in the subscanning direction) is now described. The $2^{n-1}+1$-ary counter 80 operates as a ternary counter (n=2) by the enlargement/reduction control signal, to use its most significant bit $R_1$ as the write and read enable signals/WE and RE. The data "1101" on the first line in the main scanning direction are written in the memory cell matrix 12 in synchronization with the clocks CLK in a write enable state (/WE="L"), as shown in FIG. 56. Data "1001" on the second line in the main scanning direction are further written. In a read enable state (RE ="H"), on the other hand, the data "1001" are read from the memory cell matrix 12 in synchronization with the clocks CLK. At this time, the periodic length of a readable state is half that of a writable state although the address decoder 60 specifies the addresses at constant time intervals since the lengths of the clocks CLK for reading are unchanged, and hence only half of the written data are read out. Therefore, only data for one line of main scanning are read out from the. FIFO memory device 81, and the read data can be reduced in the subscanning direction. Similar operations are carried out on the third and subsequent lines.

While enlargement/reduction of data is implemented by the counter output control circuit 64 in the fifteenth embodiment, an operation which is employed only for an ordinary operation (write operation for enlargement or read operation for reduction) in practice is disadvantageously doubled or tripled in time to cause time loss. Further, it is necessary to match data timing etc. using signals of the write and read clocks WK and RK in response to the doubled or tripled time. When a $2^{n-1}+1$-ary counter is employed, on the other hand, no problem is caused as to such time loss and matching of data timing.

Figure 57:
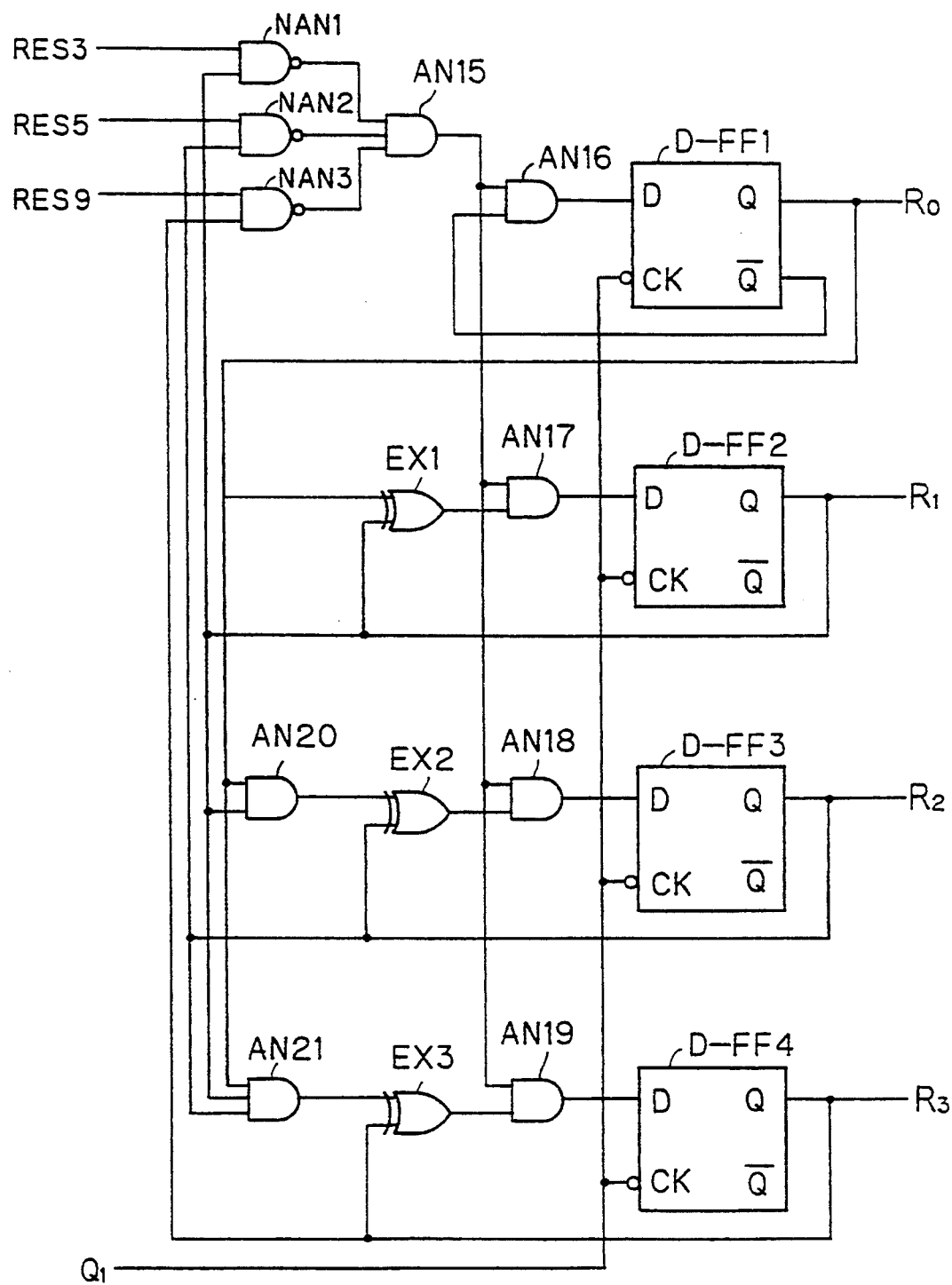
FIG. 57 is a circuit diagram showing the structure of a counter circuit in the sixteenth embodiment of the present invention.
Figure 58:
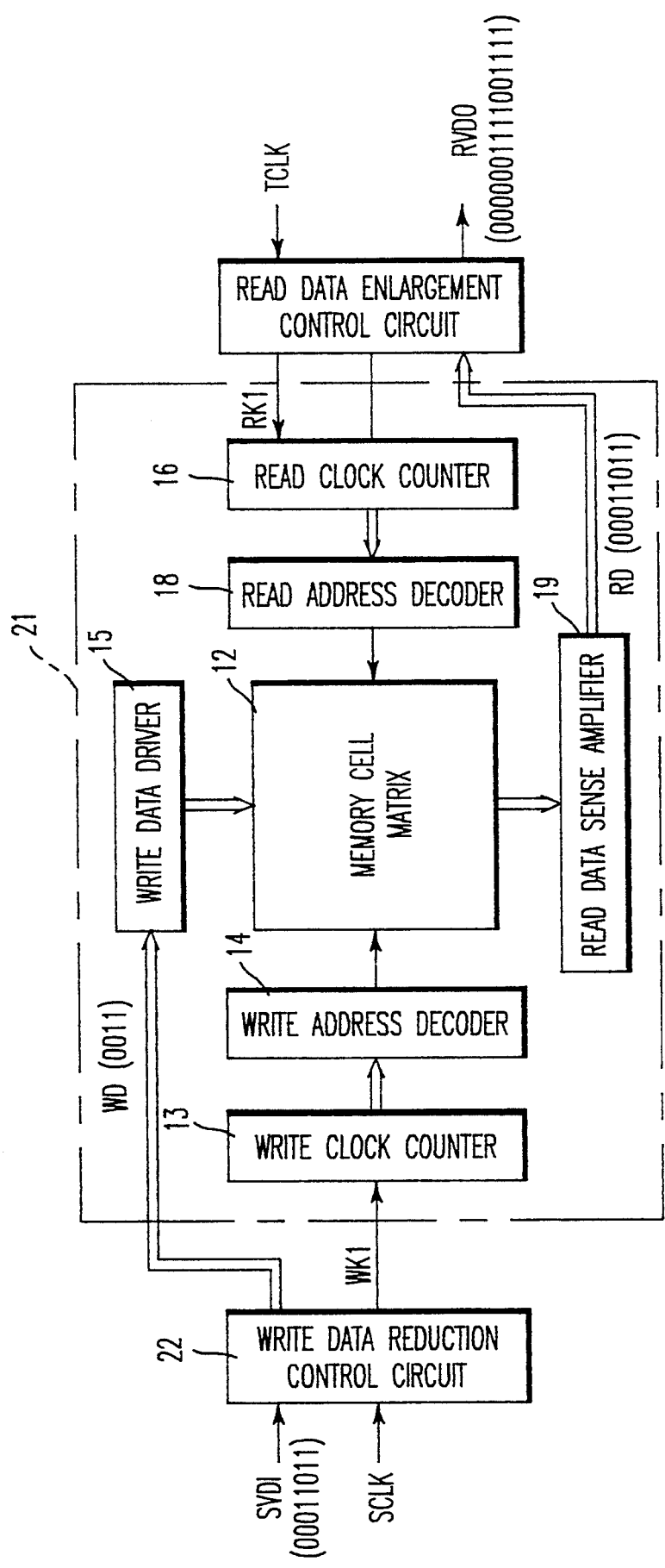
FIG. 58 is a block diagram showing the structure of a conventional first-in first-out memory device.
Figure 59A:
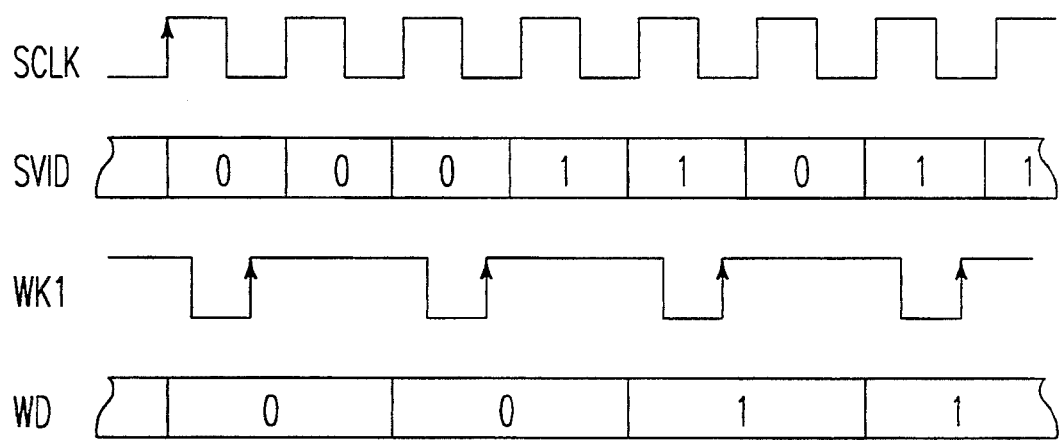
FIGS. 59(a) and 59(b) are waveform diagrams showing operations of the conventional first-in first-out memory device shown in FIG. 58.
Figure 59B:
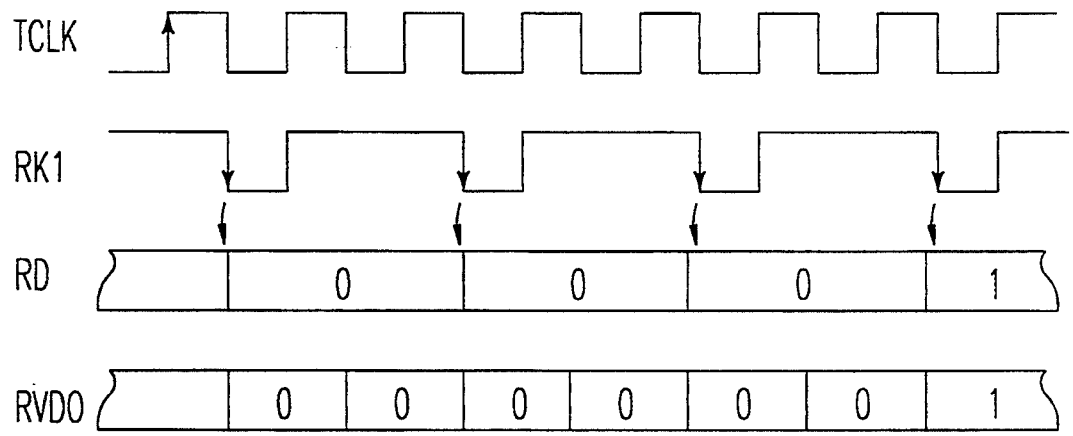
Figure 60:
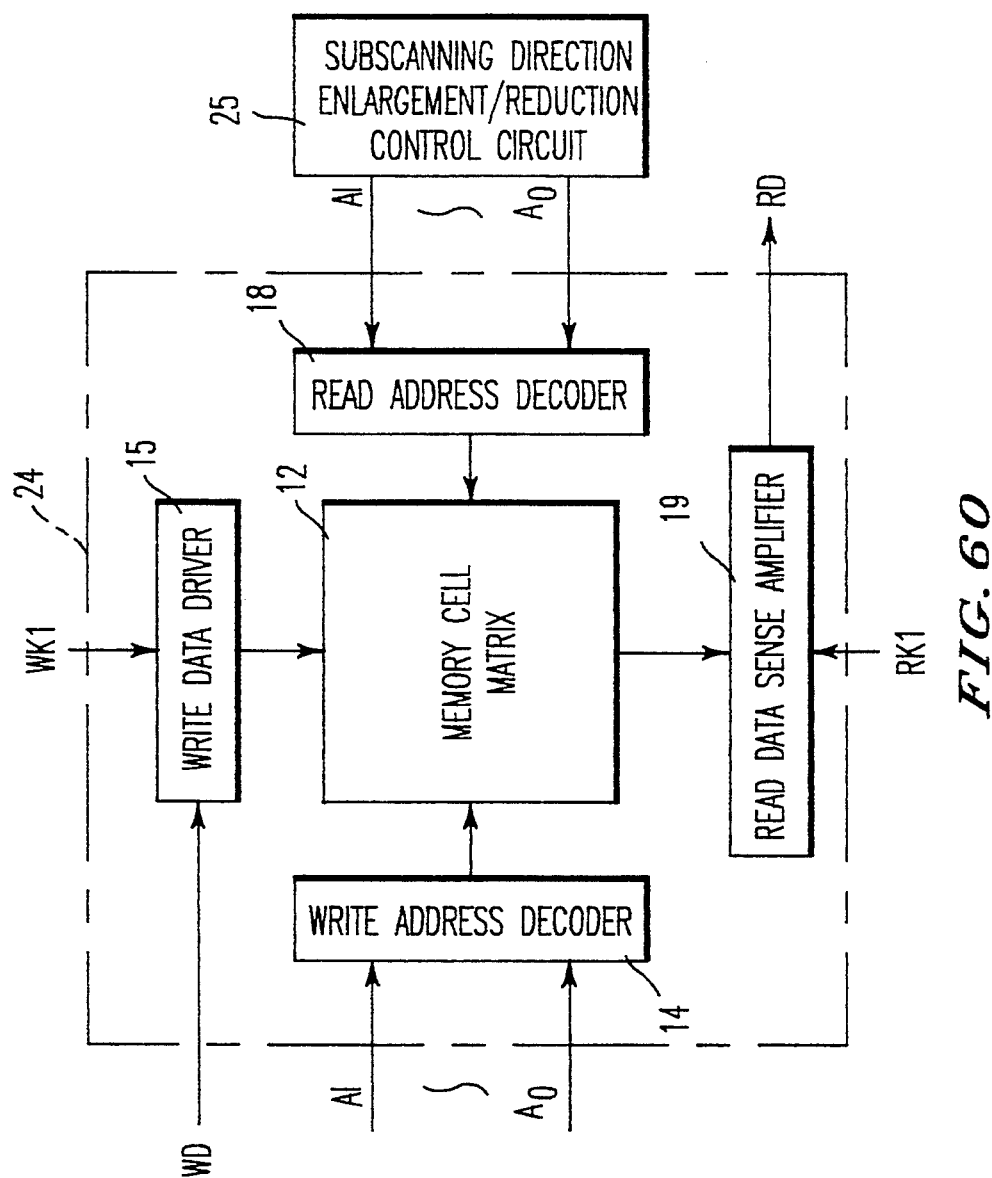
FIG. 60 is a block diagram showing the structure of another conventional first-in first-out memory device.
Figures 61A, 61B:
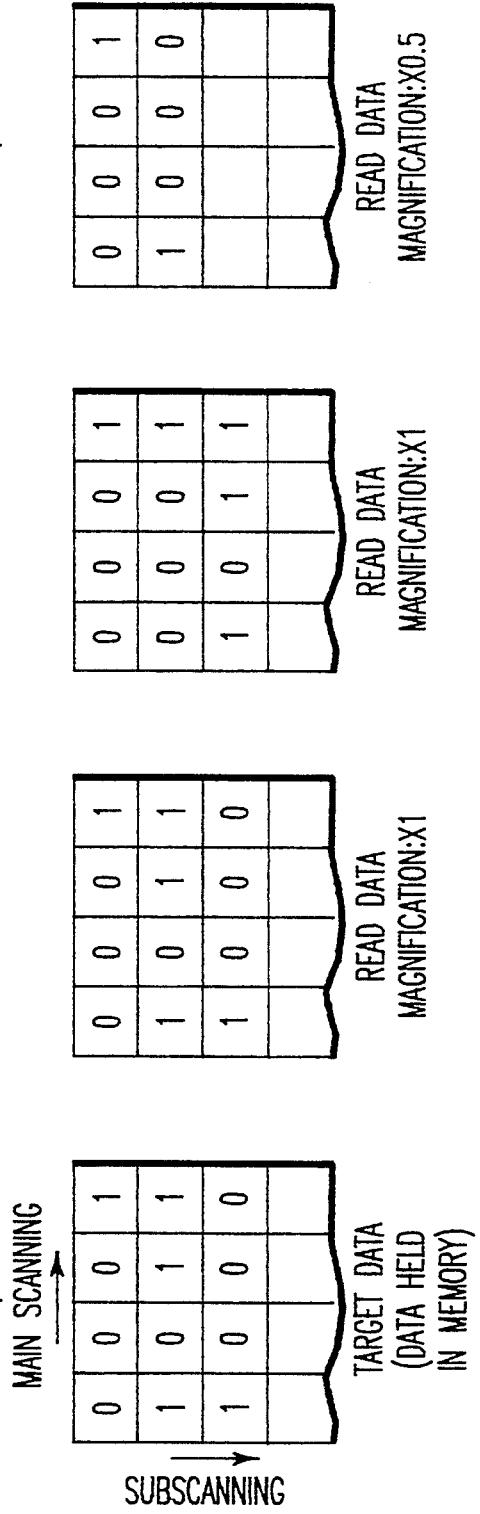
FIGS. 61(a) and 61(b) are waveform diagrams showing operations of the conventional first-in first-out memory device shown in FIG. 60.

FIG. 57 illustrates an exemplary structure of the $2^{n-1}+1$-ary counter 80 employed in the sixteenth embodiment. Referring to FIG. 57, symbols RES3 to RES9 denote control signals, symbol NAN1 denotes a NAND gate which receives the control signal RES3 in one input end thereof and takes the logical product of the same and a signal received in another input end for outputting an inverted logic of the result, symbol NAN2 denotes a NAND gate which receives the control signal RES5 in one input end thereof and takes the logical product of the same with a signal received in another input end for outputting an inverted logic of the result, symbol NAN3 denotes a NAND gate which receives the control signal RES9 in one input end thereof and takes the logical product of a signal received in another input end for outputting an inverted logic of the result, symbol AN15 denotes an AND gate which receives the output signals from the NAND gates NAN1 to NAN3 and takes the logical product thereof for outputting the result, symbols AN16 to AN19 denote AND gates which receive the output signal from the AND gate AN15 in first input ends and take the logical products of the same and signals received in second input ends for outputting the results, symbols D-FF1 to D-FF4 denote D flip-flop circuits which receive $Q_1$ in input ends CK as clocks while receiving the output signals from the AND gates AN16 to AN19 in input ends D thereof for latching logical values of signals received in the input ends D when the clocks $Q_1$ are at low levels, symbol EX1 denotes an EXOR gate which receives an output signal from an output end Q of the D flip-flop circuit D-FF1 in one input end while receiving an output signal from an output end Q of the D flip-flip circuit D-FF2 in another input end and takes the exclusive logical sum thereof for outputting the result to another input end of the AND gate AN17, symbol EX2 denotes an EXOR gate which receives the output signal from the output end Q of the D flip-flop circuit D-FF2 in one input end thereof and takes the exclusive logical sum of the same and a signal received in another input end for outputting the result to another input end of the AND gate AN18, symbol EX3 denotes an EXOR gate which receives the output signal from the output end Q of the D flip-flop circuit D-FF3 in one input end thereof and takes the exclusive logical sum of the same and a signal received in another input end for outputting the result to the other input end of the AND gate AN19, symbol AN20 denotes an AND gate which receives the output signal from the output end Q of the D flip-flop circuit D-FF1 in one input end thereof and takes the logical product of the same and an output signal from the output end Q of the D flip-flop circuit D-FF2 received in another input end for outputting the result to the other end of the EXOR gate EX2, and symbol AN21 denotes an AND gate which receives the output signal from the output end Q of the D flip-flop circuit D-FF1 in a first input end thereof while receiving the output signals from the output ends Q of the D flip-flop circuits D-FF2 and D-FF3 in second and third input ends thereof and takes the logical product thereof for outputting the result to the other end of the EXOR gate EX2.

The D flip-flop circuit D-FF1 outputs an inverted logic of latched data from its output end/Q, so that the same is inputted in the other input end of the AND gate AN16. The other input ends of the NAND gates NAN1 to NAN3 receive the output signals from the output ends Q of the D flip-flop circuits D-FF2 to D-FF4.

TABLE 17

| Magnification | Input / Output End | | | | | | |
|---|---|---|---|---|---|---|---|
| | CLK | RES 3 | RES 5 | RES 9 | $R_0$ | $R_1$ | $R_2$ | $R_3$ |
| × 1.0 | $Q_1$ | L | L | L | $\overline{WE}$/RE | — | — | — |
| × 2.0 × 0.5 | $Q_1$ | H | L | L | — | WE/RE | — | — |
| × 4.0 × 0.25 | $Q_1$ | L | H | L | — | — | WE/RE | — |

The counter circuit shown in FIG. 57 operates as a counter having binary, ternary, quinary and nonary output signals $R_0$ to $R_3$ by combinations of the control signals RES3, RES5 and RES9 received as shown in Table 17. In the case of equal-scale magnification, for example, the control signals RES3, RES5 and RES9 are brought into low, low and low levels respectively, while the output signal $R_0$ outputted from the output end Q of the D flip-flop circuit D-FF1 shown in FIG. 57 is used as the write and read enable signals /WE and RE. When the data are enlarged to twice in the subscanning direction, for example, the control signals RES3, RES5 and RES9 are brought into high, low and low levels respectively and the output signal $R_1$ outputted from the output end Q of the D flip-flop circuit D-FF2 shown in FIG. 57 is used as the write and read enable signals /WE and RE.

While FIG. 57 shows the counter circuit which operates as a binary, ternary, quinary or nonary counter, the same may have another structure, and an N-ary counter circuit may be employed in general.

While the invention has been shown and described in detail, the foregoing description is in all aspects illustrative and not restrictive. It is therefore understood that numerous modifications and variations can be devised without departing from the scope of the invention.

We claim:

1. A first-in first-out memory device comprising:
   a memory cell array being formed by a plurality of memory cells for storing inputted data by write operations responsive to clocks and outputting stored said data by read operations responsive to said clocks;
   a clock counter having a plurality of output terminals for outputting signals indicating values of respective digits of count values of said clocks in response to inputted said clocks from said output terminals respectively;
   an address decoder having a plurality of input terminals corresponding to said plurality of output terminals of said clock counter for specifying addresses indicating positions of said memory cells on said memory cell array in accordance with said count values of said clock counter; and
   a clock counter output shift circuit for shifting said signals of respective said digits received from said plurality of output terminals of said clock counter to high or low order digits and outputting the same to said input terminals of said address decoder on the basis of an inputted control signal, thereby changing timing of said address decoder for specifying said addresses.

2. A first-in first-out memory device in accordance with claim 1, wherein
   said clock counter output shift circuit comprises a plurality of switching circuits having input ends being connected to prescribed said output terminals of said clock counter and output ends being connected to prescribed said input terminals of said address decoder respectively for connecting or disconnecting said output terminals of said clock counter with or from said input terminals of said address decoder in accordance with said control signal.

3. A first-in first-out memory device in accordance with claim 1, wherein
   said clocks include read clocks for synchronizing said read operations,
   said clock counter includes a read clock counter being responsive to said read clocks, and
   said address decoder includes a read address decoder for receiving count values of said read clock counter through said clock counter output shift circuit and decoding said count values thereby specifying read addresses indicating positions of said memory cells to be subjected to said read operations on said memory cell array,
   said first-in first-out memory device further comprising a read data sense amplifier for detecting and reading said data from said memory cells being specified by said read addresses in response to said read clocks.

4. A first-in first-out memory device in accordance with claim 3, wherein
   said clock counter output shift circuit includes a clock counter output shift circuit for shifting signals of respective digits received from said plurality of output terminals of said clock counter to high or low order digits and outputting the same to said input terminals of said address decoder on the basis of an inputted control signal and outputting prescribed values to said input terminals of said read address decoder corresponding to said output terminals outputting low order digits of said count values counted by said read clock counter in response to said control signal thereby changing timing of said address decoder for specifying said addresses.

5. A first-in first-out memory device in accordance with claim 3, further comprising read clock conversion means for receiving said read clocks and changing the periods of said read clocks so that said memory cells in which said data are written in a prescribed time by said write operations in said memory cell array are coincident in number with said memory cells from which said data are read in said prescribed time by said read operations from said memory cell array and outputting said read clocks to said read data sense amplifier.

6. A first-in first-out memory device in accordance with claim 3, further comprising an enlargement/reduction control circuit being connected to said clock counter output shift circuit for outputting said control signal for controlling said clock counter output shift circuit and setting magnification of enlargement/reduction of said data.

7. A first-in first-out memory device in accordance with claim 3, further comprising an enlargement/reduction control circuit being connected to said write address decoder as well as said clock counter output shift circuit for outputting said magnification control signal to said write address decoder for setting magnification of enlargement or reduction for said data to said write address decoder and outputting said control signal for controlling said clock counter output shift circuit to said clock counter output shift circuit.

8. A first-in first-out memory device in accordance with claim 3, wherein
   said data include those of successively arranged data groups of main scanning being successively stored in said memory cell array along order of subscanning in said write operations,
   said clock counter output shift circuit including a clock counter output shift circuit for shifting signals of prescribed digits specifying said order of subscanning of said data groups of main scanning among said count values being outputted from said read clock counter in said read operations to high low order digits.

9. A first-in first-out memory device in accordance with claim 3, wherein
   said data include those of successively arranged data groups of main scanning being successively stored in said memory cell array along order of subscanning in said write operations, said clock counter output shift circuit shifting signals of prescribed digits specifying order of said data groups of main scanning in said read operations among said count values outputted from said read clock counter to high or low order digits.

10. A first-in first-out memory device in accordance with claim 1, wherein said clocks include write clocks for synchronizing said write operations, said clock counter includes a write clock counter being responsive to said write clocks, and said address decoder includes a write address decoder for receiving count values of said write clock counter through said clock counter output shift circuit and decoding said count values thereby specifying write addresses indicating said memory cells being subjected to said write operations on said memory cell array, said first-in first-out memory device further comprising a write data driver for writing inputted said data in said memory cells being specified by said write address decoder in response to said write clocks.

11. A first-in first-out memory device in accordance with claim 10, wherein said write data driver includes a write data driver for receiving a write enable signal as a control signal and being supplied with inhibition or allowance of writing by said write enable signal for writing inputted said data in said memory cells being specified by said write address decoder in response to said write clocks when allowed by said write enable signal.

12. A first-in first-out memory device in accordance with claim 10, further comprising write clock conversion means for receiving said write clocks and changing the periods of said write clocks so that said memory cells in which said data are written in a prescribed time by write operations in said memory cell array are coincident in number with said memory cells from which said data are read in said prescribed time by said read operations from said memory cell array and outputting said write clocks to said write data driver.

13. A first-in first-out memory device in accordance with claim 10, wherein said write address decoder includes a write address decoder for receiving said count values inputted from said write clock counter through said clock counter output shift circuit, receiving a magnification control signal specifying enlarging magnification for said data and decoding said count values with said magnification control signal thereby simultaneously specifying write addresses indicating positions of a plurality of said memory cells being subjected to said write operations on said memory cell array.

14. A first-in first-out memory device in accordance with claim 10, wherein said write data driver receives outputs of said write clock counter for controlling said write operations of writing said data in said memory cell array using said outputs of said write clock counter.

15. A first-in first-out memory device in accordance with claim 14, wherein said write data driver comprises at least one logical product circuit for receiving at least one of outputs being outputted from said output terminals of said write clock counter in its input end while receiving said write clocks in another input end for taking the logical product of inverted or non-inverted logics of said outputs of said write clock counter and said write clocks, said write data driver using an output of said logical product circuit as a write enable signal and being supplied with inhibition or allowance of writing by said write enable signal for writing inputted said data in said memory cells being specified by said write address decoder in response to said write clocks when allowed by said write enable signal.

16. A first-in first-out memory device in accordance with claim 15, being provided with a plurality of said logical product circuits, said write data driver further comprising a selector for receiving outputs of a plurality of said logical product circuits, receiving a magnification setting signal for setting reduction magnification, and selectively outputting outputs of said logical product circuits in response to said magnification setting signal.

17. A first-in first-out memory device in accordance with claim 10, wherein said data received in said write data driver include those of successively arranged data groups of main scanning being successively inputted along order of subscanning, said clock counter output shift circuit shifting signals of prescribed digits specifying said order of subscanning among said count values outputted by said write clock counter to high or low order digits.

18. A first-in first-out memory device in accordance with claim 10, wherein said data received in said write data driver include those of successively arranged data groups of main scanning being successively inputted along order of subscanning, said clock counter output shift circuit shifting signals of prescribed digits specifying order of main scanning among said count values outputted from said write clock counter to high or low order digits.

19. A first-in first-out memory device comprising:

a memory cell array being formed by a plurality of memory cells for storing received data by write operations and outputting stored said data by read operations;

a clock counter having a plurality of output terminals for outputting signals indicating values of respective digits of count values of inputted clocks in response to said clocks, and an address decoder having a plurality of input terminals corresponding to said plurality of output terminals of said clock counter for specifying addresses indicating positions of said memory cells on said memory cell array in accordance with values of said clock counter, said signals indicating respective said digits of said count values being outputted from respective said output terminals of said counter being outputted to said input terminals of said address decoder corresponding to high or low order digits thereof, thereby changing timing of said address decoder for specifying said addresses.

20. A first-in first-out memory device in accordance with claim 19, wherein said clocks include read clocks for synchronizing said read operations, said clock counter includes a read clock counter being responsive to said read clocks, and said address decoder includes a read address decoder having a plurality of input terminals corresponding to said plurality of output terminals of said clock counter for receiving said signals indicating respective digits of said count values being outputted from said output terminals of said read clock counter in said input terminals of said read address decoder corresponding to high or low order digits thereof and decoding said count values of said read clock counter thereby specifying read addresses indicating positions of said memory cells being subjected to said read operations on said memory cell array, said first-in first-out memory device further comprising a read data sense amplifier for detecting and reading said data from said memory cells being specified by said read addresses in response to said read clocks.

21. A first-in first-out memory device in accordance with claim 20, wherein said signals indicating respective digits of said count values being outputted from said output terminals of said read clock counter are outputted to said input terminals of said read address decoder corresponding to low order digits thereby lengthening intervals of address specification by said read address decoder.

22. A first-in first-out memory device in accordance with claim 21, wherein said data include those of successively arranged data groups of main scanning being successively stored in said memory cell array along order of subscanning in said write operations, signals of prescribed digits specifying said order of subscanning of said data groups of main scanning among said count values outputted from said output terminals of said read clock counter being outputted to said input terminals of said read address decoder corresponding to low order digits respectively thereby lengthening intervals for said read address decoder changing specification of said order of subscanning.

23. A first-in first-out memory device in accordance with claim 21, wherein said data include those of successively arranged data groups of main scanning being successively stored in said memory cell array along order of subscanning in said write operations, signals of prescribed digits specifying order of said data groups of main scanning among said count values outputted from said output terminals of said read clock counter being outputted to said input terminals of said read address decoder corresponding to low order digits respectively thereby lengthening intervals of address specification by said read address decoder.

24. A first-in first-out memory device in accordance with claim 20, wherein said signals indicating respective digits of said count values being outputted from said output terminals of said read clock counter being outputted to said input terminals of said read address decoder corresponding to high order digits respectively thereby shortening intervals of address specification by said read address decoder.

25. A first-in first-out memory device in accordance with claim 24, wherein said data include those of successively arranged data groups of main scanning being successively stored in said memory cell array along order of subscanning in said write operations, signals of at least prescribed digits specifying said order of subscanning of said data groups of main scanning among said count values outputted from said output terminals of said read clock counter being outputted to said input terminals of said read address decoder corresponding to high order digits respectively thereby shortening intervals for said read address decoder changing specification of said order of subscanning.

26. A first-in first-out memory device in accordance with claim 24, wherein said data include those of successively arranged data groups of main scanning being successively stored in said memory cell array in order of subscanning in said write operations, signals of at least prescribed digits specifying order of said data groups of main scanning among said count values outputted from said output terminals of said read clock counter being outputted to said input terminals of said read address decoder corresponding to high order digits respectively thereby shortening intervals of address specification by said read address decoder.

27. A first-in first-out memory device in accordance with claim 19, wherein said clocks include write clocks synchronizing said write operations, said clock counter includes a write clock counter being responsive to said write clocks, and said address decoder includes a write address decoder having a plurality of input terminals corresponding to said plurality of output terminals of said clock counter for inputting said signals indicating respective digits of said count values being outputted from said output terminals of said write clock counter in said input terminals of said write address decoder corresponding to high or low order digits thereof and decoding said count values of said write clock counter thereby specifying write addresses indicating positions of said memory cells being subjected to said write operations on said memory cell array, said first-in first-out memory device further comprising a write data driver for writing inputted said data in said memory cells being specified by said write address decoder in response to said write clocks.

28. A first-in first-out memory device in accordance with claim 27, wherein said write address decoder inputs said signals indicating respective digits of said count values being outputted from said output terminals of said write clock counter in said input terminals of said write address decoder corresponding to high order digits thereof respectively and decodes said count values of said write clock counter, thereby shortening intervals for specifying write addresses indicating positions of said memory cells being subjected to said write operations on said memory cell array.

29. A first-in first-out memory device in accordance with claim 28, wherein
said data inputted in said write data driver include those of successively arranged data groups of main scanning being successively inputted along order of subscanning, and
said write address decoder inputs signals of at least prescribed digits specifying said order of subscanning among said count values outputted from said output terminals of said write clock counter in said input terminals of said write address decoder for decoding said count values of said write clock counter, thereby shortening intervals for changing specification of said order of subscanning indicating positions of said memory cells being subjected to said write operations on said memory cell.

30. A first-in first-out memory device in accordance with claim 28, wherein
said data being inputted in said write data driver include those of successively arranged data groups of main scanning being successively inputted along order of subscanning, and
said write address decoder inputs signals of at least prescribed digits specifying order of said main scanning among said count values outputted from said output terminals of said write clock counter in said input terminals of said write address decoder corresponding to high order digits thereof respectively for decoding said count values of said write clock counter, thereby shortening intervals for specifying write addresses indicating positions of said memory cells being subjected to said write operations on said memory cell array.

31. A first-in first-out memory device in accordance with claim 28, wherein
said data being inputted in said write data driver include those of successively arranged data groups of main scanning being successively inputted along order of subscanning, and
said write address decoder inputs signals of at least prescribed digits specifying said order of subscanning among said count values outputted from said output terminals of said write clock counter in said input terminals of said write address decoder corresponding to low order digits thereof respectively for decoding said count values of said write clock counter, thereby lengthening intervals for changing specification of said order of subscanning indicating positions of said memory cells being subjected to said write operations on said memory cell array.

32. A first-in first-out memory device in accordance with claim 28, wherein
said data being inputted in said write data driver include those of successively arranged data groups of main scanning being successively inputted along order of subscanning, and
said write address decoder inputs signals of at least prescribed digits specifying order of said main scanning among said count values outputted from said output terminals of said write clock counter in said input terminals of said write address decoder corresponding to low order digits thereof respectively for decoding said count values of said write clock counter, thereby lengthening intervals for specifying write addressees indicating positions of said memory cells being subjected to said write operations on said memory cell array.

33. A first-in first-out memory device in accordance with claim 27, wherein
said write address decoder inputs said signals indicating respective digits of said count values outputted from said output terminals of said write clock counter in said input terminals of said write address decoder corresponding to low order digits thereof respectively and decodes said count values of said write clock counter thereby lengthening intervals for specifying write addresses indicating positions of said memory cells being subjected to said write operations on said memory cell array.

34. A first-in first-out memory device comprising:
a memory cell array being formed by a plurality of memory cells for storing inputted data by write operations and outputting stored said data by read operations;
a clock counter having a plurality of output terminals for outputting signals indicating values of respective digits of count values of inputted clocks in response to said clocks;
an address decoder having a plurality of input terminals corresponding to said plurality of output terminals of said clock counter for specifying addresses indicating positions of said memory cells on said memory cell array in accordance with said values of said clock counter;
a read data sense amplifier for detecting and reading said data being outputted from said memory cells corresponding to said addresses being specified by said address decoder in response to read clocks being synchronized with said clocks;
a write data driver for writing data in said memory cells corresponding to said addresses being specified by said address decoder in response to write clocks being synchronized with said clocks; and
a counter output control circuit for shifting said signals indicating respective digits being received from said plurality of output terminals of said clock counter to high or low order digits and outputting the same to said input terminals of said address decoder in coincidence with said write operations and said read operations being alternately performed by said write data driver and said read data sense amplifier on the basis of an inputted control signal.

35. A first-in first-out memory device comprising:
a memory cell array being formed by a plurality of memory cells for storing inputted data by write operations and outputting stored said data by read operations;
a clock counter having an output terminal for outputting a count value of an inputted clock in response to said clock;
an address decoder having an input terminal being connected to said output terminal of said clock counter for specifying addresses indicating positions of said memory cells on said memory cell array in accordance with the value of said clock counter;
a read data sense amplifier for detecting and reading said data being outputted from said memory cells corresponding to addresses being specified by said address decoder;
a write data driver for writing said data in said memory cells corresponding to said addresses being specified by said address decoder in response to a write clock being synchronized with said clock; and a timing control clock counter being connected to said read data sense amplifier and said write data driver for receiving said count value of said clock counter and controlling write timing and read timing of said write data driver and said read data sense amplifier being responsive to said count value in response to an inputted control signal.

36. A first-in first-out memory device in accordance with claim 35, wherein said timing control clock counter lengthens a readable period of said read data sense amplifier being responsive to said count value so that said read data sense amplifier reads the same data from said memory cell of the same address a plurality of times.

37. A first-in first-out memory device in accordance with claim 35, wherein said timing control clock counter lengthens a writable period of said write data driver being responsive to said count value so that said write driver writes different data in said memory cell of the same address a plurality of times.

38. A first-in first-out memory device in accordance with claim 35, wherein said timing control clock counter includes a counter whose mode of outputting the result of counting by said control signal is changed from an N-ary number (binary, ternary, quarternary, . . . ) to an M-ary number (binary, ternary, quarternary, . . . ).

* * * * *